United States Patent
Schoper et al.

(10) Patent No.: US 11,856,951 B2
(45) Date of Patent: Jan. 2, 2024

(54) METHOD FOR MANAGING RESISTANCE TO INSECTICIDAL TRAITS AND CHEMICALS USING PHEROMONES

(71) Applicant: Provivi, Inc., Santa Monica, CA (US)

(72) Inventors: John B. Schoper, Westlake Village, CA (US); Pedro Coelho, Santa Monica, CA (US); Christopher Wheeler, Santa Monica, CA (US)

(73) Assignee: Provivi, Inc., Santa Monica, CA (US)

( * ) Notice: Subject to any disclaimer, the term of this patent is extended or adjusted under 35 U.S.C. 154(b) by 681 days.

(21) Appl. No.: 16/064,024

(22) PCT Filed: Dec. 22, 2016

(86) PCT No.: PCT/US2016/068375
§ 371 (c)(1),
(2) Date: Jun. 20, 2018

(87) PCT Pub. No.: WO2017/112887
PCT Pub. Date: Jun. 29, 2017

(65) Prior Publication Data
US 2019/0082685 A1      Mar. 21, 2019

Related U.S. Application Data

(60) Provisional application No. 62/398,782, filed on Sep. 23, 2016, provisional application No. 62/380,304, filed on Aug. 26, 2016, provisional application No. 62/271,050, filed on Dec. 22, 2015.

(51) Int. Cl.
*A01N 37/02*      (2006.01)

(52) U.S. Cl.
CPC .................................. *A01N 37/02* (2013.01)

(58) Field of Classification Search
None
See application file for complete search history.

(56) References Cited

U.S. PATENT DOCUMENTS

| 8,759,306 B2 | 6/2014 | Kaletta |
| 2010/0029725 A1 | 2/2010 | Cosgrove et al. |
| 2012/0316235 A1 | 12/2012 | Ogawa et al. |

FOREIGN PATENT DOCUMENTS

| WO | WO 2001/075164 A2 | 10/2001 |
| WO | WO 2017/112887 A1 | 6/2017 |

OTHER PUBLICATIONS

Tabashnik, Suppressing resistance to Bt cotton with sterile insect releases, Nature Biotechnology, 2010, 28(12), pp. 1304-1307 (Year: 2010).*

(Continued)

*Primary Examiner* — Savitha M Rao
*Assistant Examiner* — Andrew P Lee
(74) *Attorney, Agent, or Firm* — Cooley LLP

(57) ABSTRACT

Systems and methods for managing resistance to insecticidal traits and chemicals are provided. In one aspect, systems and methods are provided that: 1) delay the development of resistance to transgenic insecticidal crops and/or chemical insecticides (preemptive strategies), and 2) rescue one or more pests' susceptibility to transgenic insecticidal crops and/or chemical insecticides once pest resistance has developed (responsive strategies).

21 Claims, 11 Drawing Sheets

(56) References Cited

OTHER PUBLICATIONS

Andow and Ives, "Monitoring and adaptive resistance management." Ecological Applications (2002); 12 (5): 1378-1390.

Andow, D. "The risk of resistance evolution in insects to transgenic insecticidal crops." Collection of Biosafety Reviews (2008); 4: 142-199.

Angeli, et al., "Mating disruption of codling moth cydia pomonella with high densities of ecodian sex pheromone dispensers." Journal of Applied Entomology (2007); 131 (5): 311-318.

Arias, et al., "Ecology, behavior and bionomics first genotyping of spodopterafrugiperda (J.E. Smith) (Lepidoptera: Noctuidae) progeny from crosses between Et-Resistant and Et-susceptible populations, and 65-Locus discrimination of isofamilies." Research & Reviews: Journal of Botanical Sciences (2015); 4 (1): 18-29.

Armes and Cooter, "Effects of age and mated status on flight potential of helicoverpa armigera (Lepidoptera: Noctuidae)" Physiological Entomology (1991); 16 (2): 131-144.

Baxter, et al., "Novel genetic basis of field-evolved resistance to Bt toxins in plutella xylostella." Insect Mol Biol. (2005); 14 (3): 327-334.

Baxter, et al., "Parallel evolution of bacillus thuringiensis toxin resistance in lepidoptera." Genetics (2011); 189 (2): 675-679.

Bernardi, et al., "Assessment of the high-dose concept and level of control provided by MON 87701 x MON 89788 soybean against anticarsia gemmatalis and pseudoplusia includens (Lepidoptera: Noctuidae) in Brazil." Pest Manag Sci. (2012); 68 (7): 1083-1091.

Bernardi, et al., "Cross-Resistance between Cry1 Proteins in Fall Armyworm (*Spodoptera frugiperda*) May Affect the Durability of Current Pyramided Bt Maize Hybrids in Brazil." PLoS One (2015); 10 (10): e0140130. eCollection 2015.

Birch, M.C. "Response of both sexes of Trichoplusia ni (Lepidoptera: Noctuidae) to virgin females and to synthetic pheromone." Ecological Entomology (1977); 2 (2): 99-104.

Boykin and Campbell, "Wind dispersal of the twospotted spider mite (Acari: Tetranychidae) in North Carolina Peanut Fields." Environmental Entomology (1984); 3 (1): 221-227.

Butter and Singh "Ovipositional response of Helicoverpa armigera to different cotton genotypes." Phytoparasitica (1996); 24 (2): 97-102.

Caprio and Suckling, "Mating disruption reduces the risk of resistance development to transgenic apple orchards: simulations of the lightbrown apple moth." Proc. 48th N. Z. Plant Protection Conf: (1995); 52-58.

Caprio and Suckling, "Resistance Management in the 21st Century: An Entomologists Point of View." Proc 50th NZ Plant Protection Conf: (1997); 307-313.

Caprio, M. "Source-sink dynamics between transgenic and non-transgenic habitats and their role in the evolution of resistance." J Econ Entomol. (2001); 94 (3): 698-705.

Carriere, et al., "Predicting spring moth emergence in the pink bollworm (Lepidoptera: Gelechiidae): implications for managing resistance to transgenic cotton." J Econ Entomol. (2001); 94 (5): 1012-21.

Carvalho, et al., "Investigating the molecular mechanisms of organophosphate and pyrethroid resistance in the fall armyworm *Spodoptera frugiperda*." PLoS One (2013); 8 (4): e62268, 1-11.

Chamberlain, et al., "Field evaluation of a slow release pheromone formulation to control the american bollworm, *Helicoverpa armigera* (Lepidoptera: Noctuidae) in Pakistan." Bull Entomol Res. (2000); 90 (3): 183-90.

Del Socorro, et al., "Development of a synthetic plant volatile-based attracticide for female noctuid moths. I. Potential sources of volatiles attractive to helicoverpa armigera (Hübner) (Lepidoptera: Noctuidae)" Australian Journal of Entomology Banner (2010); 49 (1): 10-20.

Deng, et al., "Enhancement of attraction to sex pheromones of spodoptera exigua by volatile compounds produced by host plants." J Chem Ecol. (2004); 30 (10): 2037-2045.

Dicke, M. "Volatile spider-mite pheromone and host-plant kairomone, involved in spaced-out gregariousness in the spider mite *tetranychus urticae*." Physiological Entomology (1986); 11 (3): 251-262.

Fang and Zhang, "Influence of host-plant volatile components on oviposition behavior and sex pheromone attractiveness to helicoverpa armigera" Kun Chong xue Bao. Acta Entomologica Sinica (2002); 45 (1): 63-67 (with English Abstract).

Farias, et al., "Field-evolved resistance to Cry1F maize by spodoptera frugiperda (Lepidoptera: Noctuidae) in Brazil." Crop Protection (2014); 64: 150-158.

Gregg, et al., "Development of a synthetic plant volatile-based attracticide for female noctuid moths. II. Bioassays of synthetic plant volatiles as attractants for the adults of the cotton bollworm, *helicoverpa armigera* (Hübner) (Lepidoptera: Noctuidae)." Australian Journal of Entomology Banner (2010); 49 (1): 21-30.

Guerrero, et al., "Semiochemical and natural product-based approaches to control spodoptera spp. (Lepidoptera: Noctuidae)." J Pest Sci (2014); 87 (2): 231-247.

Halfhill and Mcdonough, "Heliothis Zea (Boddie): Formulation parameters for its sex pheromone in rubber septa." The Southwestern Entomologist (USA) (1985); 10(3): 176-180.

Hassell, et al., "Patterns of dynamical behaviour in single-species populations." Journal of Animal Ecology (1976); 45 (2): 471-486.

Hillier and Vickers, "The role of heliothine hairpencil compounds in female heliothis virescens (Lepidoptera: Noctuidae) behavior and mate acceptance." Chem Senses. (2004); 29 (6): 499-511.

Huang, et al., "Male orientation inhibitor of cotton bollworm: Identification of compounds produced by male hairpencil glands1." Insect Science (1996); 3 (2): 172-182.

Hussey and Parr, "Dispersal of the glasshouse red spider mite *tetranychus urticae koch* (Acarina, Tetranychidae)." Entomologia Experimentalis et Applicata (2011); 6(3): 207-214.

Hutchinson, et al., "Evidence for decreasing helicoverpa zea susceptibility to pyrethroid insecticides in the midwestern United States." Plant Management Network (2007); 8 (1): 1-9.

Jessup, et al., "Genetic mapping of fall armyworm resistance in zoysiagrass." Crop Science (2011); 51 (4): 1774-1783.

Kain, et al., "Odour receptors and neurons for DEET and new insect repellents." Nature (2013); 502 (7472): 507-512.

Kehat and Dunkelblum, "Sex pheromones: Achievements in monitoring and mating disruption of cotton pests in Israel." Archives of Insect Biochemistry and Physiology (1993); 22 (3-4): 425-431.

Kingan, et al., "The loss of female sex pheromone after mating in the corn earworm moth *Helicoverpa zea*: identification of a male pheromonostatic peptide." Proceedings of the National Academy of Sciences (1995); 92 (11): 5082-5086.

Klun, et al., "Sex pheromone chemistry of female corn earworm moth, *Heliothis zea*." Journal of Chemical Ecology (1980); 6 (1): 165-175.

Kumar and Shivakumara, "Variable response of male helicoverpa armigera moth to sex pheromone blends: A case of behavioural polymorphism?" Current Science Assoc./ Indian Academy of Sciences (2003); 84: 705-708.

Li and Margolies, "Responses to direct and indirect selection on aerial dispersal behaviour in tetranychus urticae." Heredity (1994); 72: 10-22.

Liu, et al., "Oviposition deterrents from eggs of the cotton bollworm, *Helicoverpa armigera* (Lepidoptera: Noctuidae): chemical identification and analysis by electroantennogram." J Insect Physiol. (2008); 54(4): 656-62.

Malo, et al., "A Inhibition of the responses to sex pheromone of the fall armyworm, *Spodoptera frugiperda*." Journal of Insect Science (2013); 13: 134.

Miller, et al., "Differentiation of competitive vs. non-competitive mechanisms mediating disruption of moth sexual communication by point sources of sex pheromone (part I): Theory." J Chem Ecol. (2006); 32 (10): 2089-2114.

Mitchell, et al., "Capture of male and female cabbage loopers in field traps baited with synthetic sex pheromone" Environmental Entomology (1972); 1 (4), 525-526.

Mitchell, et al., "Reduction of mating potential of *Malle heliothis* spp. and spodoptera frugiperda in field plots treated with disruptants." Environmental Entomology (1976); 5 (3): 484-486.

(56) References Cited

OTHER PUBLICATIONS

Mitchell and Mclaughin, "Suppression of mating and oviposition by fall armyworm and mating by corn earworm in corn, using the air permeation technique." Journal of Economic Entomology (1982); 75 (2): 270-274.
Morin, et al., "Three cadherin alleles associated with resistance to bacillus thuringiensis in pink bollworm." Proc Natl Acad Sci U.S.A. (2003); 100(9): 5004-5009.
Murua and Virla, "Population parameters of spodoptera frugiperda (Smith)(Lep.: Noctuidae) fed on corn and two predominant gases in Tucuman (Argentina)." Acta Zoologica Mexicana (2004); 20 (1): 199-210.
PCT/US2016/068375, International Preliminary Report on Patentability, dated Jun. 26, 2018, 10 pages.
PCT/US2016/068375, International Search Report and Written Opinion, dated Apr. 14, 2017, 11 pages.
Raina, et al., "A pheromonotropic peptide of helicoverpa zea, with melanizing activity, interaction with PBAN, and distribution of immunoreactivity." Arch Insect Biochem Physiol. (2003); 53 (4): 147-157.
Ramaswamy, S. "Periodicity of oviposition, feeding, and calling by mated female heliothis virescens in a field cage." Journal of Insect Behavior (1990); 3 (3): 417-427.
Rios-Diez and Saldamando-Benjumea, "Susceptibility of spodoptera frugiperda (Lepidoptera: Noctuidae) strains from central Colombia to two insecticides, methomyl and lambda-cyhalothrin: a study of the genetic basis of resistance." J Econ Entomol. (2011); 104(5): 1698-705.
Rothschild and Schoonhoven, "Assessment of egg load by Pieris Brassicae (Lepidoptera: Pieridae)" Nature (1977); 266: 352-355.
Saad and Scott, "Repellency of pheromones released by females of Heliothis Armigera and H. Zea to females of both species." Entomol. Exp. Appl. (1981); 30: 123-127.
Schumacher, et al., "Long flights in *Cydia pomonella* L. (Lepidoptera: Tortricidae) measured by a flight mill: influence of sex, mated status and age." Physiological Entomology (1997); 22 (2): 149-160.
Smitley and Kennedy, "Photo-oriented Aerial-dispersal behavior of tetranychus urticae (Acari: Tetranychidae) Enhances escape from the leaf surface." Annals of the Entomological Society of America (1985); 78 (5): 609-614.
Smitley and Kennedy, "Aerial dispersal of the two-spotted spider mite (*Tetranychu surticae*) from field corn." Experimental & Applied Acarology (1988); 5 (1): 33-46.
Su, et al., "Female moths of cotton bollworm (Lepidoptera: Noctuidae) captured by waterbasin traps baited with synthetic female sex pheromone." Insect Science (2006); 13: 293-299.
Suckling, et al., "Resistance management of lightbrown apple moth, *Epiphyas postvittana* (Lepidoptera: Tortricidae) by mating disruption" New Zealand Journal of Crop and Horticultural Science (1990); 18: 89-98.
Sun, et al., "Expression in antennae and reproductive organs suggests a dual role of an odorant-binding protein in two sibling *helicoverpa* species." PLoS One (2012); 7(1): e3004 1-11.
Tabashnik and Croft, "Managing pesticide resistance in crop-arthropod complexes: Interactions between biological and operational factors." Environmental Entomology (1982); 11 (6): 1137-1144.
Tabashnik, et al., "Field-evolved insect resistance to Bt crops: definition, theory, and data." J Econ Entomol. (2009); 102 (6): 2011-2025.
Tabashnik, et al., "Suppressing resistance to Bt cotton with sterile insect releases." Nat Biotechnol. (2010); 28 (12): 1304-1307. Epub Nov. 7, 2010.
Teal and Tumlinson, "Isolation, identification, and biosynthesis of compounds produced by male hairpencil glands of *Heliothis virescens* (F.) (Lepidoptera: Noctuidae). "J Chem Ecol. (1989); 15 (1):413-27.
Torres and Ruberson, "Spatial and temporal dynamics of oviposition behavior of bollworm and three of its predators in Bt and non-Bt cotton fields." Entomologia Experimentalis et Applicata (2006); 120 (1): 11-22.
Unbehend, et al., "Geographic Variation in Sexual Attraction of Spodoptera frugiperda Corn- and Rice-Strain Males to Pheromone Lures." PLoS One (2014); 9 (2): e89255.
Varella, et al., "Mortality dynamics of spodoptera frugiperda (Lepidoptera: Noctuidae) Immatures in Maize." PLoS One (2015); 10 (6): e0130437.
Vetter and Baker, "Behavioral responses of male heliothis zea moths in sustained-flight tunnel to combinations of 4 compounds identified from female sex pheromone gland." Journal of Chemical Ecology (1984); 10 (2): 193-202.
Witzgall, et al., "Codling moth management and chemical ecology." Annu Rev Entomol. (2008); 53: 503-522.
Young and McMillian, "Differential feeding by two strains of fall armyworm larvae on carbaryl treated surfaces." Journal of Economic Entomology (1979); 72 (2): 202-203.
Yu, SJ. "Detection and biochemical characterization ofinsecticide resistance in fall armyworm (Lepidoptera: Noctuidae)." J Econ Entomol. (1992); 85 (3): 675-682.
Yu, SJ. "Insecticide resistance in the fall armyworm, *Spodoptera frugiperda* (J.E. Smith)." Pestic Biochem Physiol. (1991); 39(1): 84-91.
Zhang, et al., "An overlooked component:(Z)-9-tetradecenal as a sex pheromone in Helicoverpa armigera." J Insect Physiol. (2012); 58 (9): 1209-1216.
Zy and Gong, "Male accessory gland derived factors can stimulate oogenesis and enhance oviposition in helicoverpa armigera (Lepidoptera: Noctuidae)." Arch Insect Biochem Physiol. (2001); 46(4): 175-85.
Miller et al., "Differentiation of Competitive vs. Non-competitive Mechanisms Mediating Disruption of Moth Sexual Communication by Point Sources of Sex Pheromone (Part 2): Case Studies". Journal of Chemical Ecology (2006); 32(10): 2115-2143.
Klassen, W. et al., "History of the Sterile Insect Technique." In V.A. Dyck, J. Hendrichs & A.S. Robinson (Eds.), Sterile Insect Technique: Principles And Practice In Area-Wide Integrated Pest Management (2nd ed.) (2021); Chapter 1.1, pp. 1-44. CRC Press. https://doi.org/10.1201/9781003035572.
Naranjo, Steven and Ellsworth, Peter, "Fourteen Years of Bt Cotton Advances IPM in Arizona". Southwest Entomol. (Sep. 2010.); vol. 35, No. 310, pp. 437-444.

* cited by examiner

METHOD FOR MANAGING RESISTANCE TO INSECTICIDAL TRAITS AND CHEMICALS USING PHEROMONES

CROSS-REFERENCE TO RELATED APPLICATIONS

This application is a U. S. National Phase of PCT Application No. PCT/US2016/068375 filed on Dec. 22, 2016, which itself claims the benefit of priority to: U.S. Provisional Application No. 62/271,050, filed Dec. 22, 2015, U.S. Provisional Application No. 62/380,304, filed Aug. 26, 2016, and U.S. Provisional Application No. 62/398,782, filed Sep. 23, 2016, each of which is hereby incorporated by reference in its entirety.

FIELD OF THE DISCLOSURE

The present disclosure relates to systems and methods for managing resistance to transgenic insecticidal traits and/or chemical insecticides.

BACKGROUND OF THE DISCLOSURE

Pesticide use, monoculture and uniform production practices associated with modern intensive agriculture has led to a rise in insect resistance to pest controls. Insect resistance is costly to society, leading to increased insecticide use, compromise of other pest control products and destabilization of pest control and pesticide regulation.

Pests have been controlled by both chemical and biological methods. One leading biorational pesticide comes from *Bacillus thuringiensis* (Bt), a gram-positive, spore forming bacterium. Bt bacteria were identified as insect pathogens and their insecticidal activity was attributed to the parasporal crystals encoded by the Cry genes, of which there are over 100 known isoforms. This observation led to the development of bioinsecticides based on Bt bacteria for the control of certain insect species. Plants have now been genetically engineered to express the Bt insecticidal proteins. Similar to the situation where insect resistance develops due to continuous use of chemical insecticides, the continuous expression of these insecticidal proteins in plants also imposes strong selection for resistance in target pest populations. Management of resistance would not only be in the interest of companies developing these transgenic insecticidal crops but also benefit farmers who rely on Bt insecticides (such as Bt sprays approved for use in organic agricultural production) to control pests. Additionally, resistance management would preserve a biopesticide that has a narrow range of non-target species effects, low mammalian toxicity and no record of carcinogenicity.

Factors that delay the development of resistance include recessive inheritance of resistance; low initial frequency of resistance alleles; abundant refuges of non-Bt host plants; high dose of transgenic insecticidal traits to cause both the death of all homozygous susceptible target pests and most heterozygous resistant pests; and Bt crops expressing multiple toxins. Thus, the development of methods that focus on these factors may inform better resistance management strategies.

Thus there is a need to provide systems and methods to 1) delay the development of resistance to transgenic insecticidal crops and/or chemical insecticides (preemptive strategies), and 2) rescue one or more pests' susceptibility to transgenic insecticidal crops and/or chemical insecticides once pest resistance has developed (responsive strategies).

SUMMARY OF THE DISCLOSURE

The present invention provides systems and methods for managing resistance to transgenic insecticidal traits and/or chemical insecticides.

In some embodiments, the disclosure provides methods of utilizing mating disruption strategies (via pheromone application) to increase the durability of a genetic trait in a transgenic plant. That is, in certain aspects, the taught methods utilize a mating disruption strategy to delay the development of genetic resistance to Bt toxins, in an insect population.

In some aspects, the taught methods are able to utilize mating disruption to protect a new transgenic trait being introduced. In this embodiment, a transgenic plant (e.g. a plant with a new Bt trait or new stack of existing Bt traits) would be deployed to the field in conjunction with a suitable insect pheromone/mating disruption plan. The pheromone utilization in conjunction with the new trait release would prevent a rapid onset of genetic resistance from developing and would extend the useable life of the new trait.

In some embodiments, the taught methods are able to reduce the size of refuge needed when utilizing a plant possessing a transgenic trait (e.g. Bt trait), while at the same time maintaining and/or extending the durability (i.e. longevity) of said trait. In some aspects, a refuge size could be decreased by 95%, 90%, 80%, 70%, 60%, 50%, 40%, 30%, 20%, 10%, 5%, or less. In some aspects, the present disclosure eliminates the need for a refuge. In aspects, the taught methods enable farmers to switch from a sprayed refuge to an unsprayed refuge (i.e. no insecticide in refuge), while maintaining and/or extending the durability of said trait.

In particular embodiments, the disclosure provides for a 5% unsprayed refuge utilized in conjunction with mating disruption, which would extend the durability of a trait by 5 years or more, or 10 years or more, or 15 years or more, or 20 years or more, or 25 years or more. That is, in some aspects, the application of appropriate pheromones, in conjunction with unsprayed refuge of at least 5%, enables the extension of Bt trait durability by at least 5, 10, 15, 20, or 25 years.

Further, in some embodiments, a larger sprayed refuge (e.g. 10%, 15%, or 20%) could be utilized in conjunction with the taught mating disruption strategy to extend the durability of a trait by at least 5, 10, 15, 20, or 25 years.

Thus, the taught methods enable the modulation of refuge size needed to maintain and extend the life of a transgenic trait such as a Bt trait.

In some embodiments, the mating disruption enables the utilization of low dose traits, while still maintaining or extending the durability of said low dose traits.

In aspects, the utilization of mating disruption can be used as a substitute for a trait in a Bt stack that may have been lost or is facing a high degree of resistant insects. For example, if a current transgenic plant expresses two Bt traits, but one of said traits faces a high degree of resistant insects (i.e. the trait has been "lost," due to the development of resistance in the insect population), then a suitable pheromone composition directed to the resistant insect population could be deployed simultaneously with the transgenic crop. The resulting mating disruption of the resistant insects would help achieve insect control, while still enabling the use of the stacked trait crop.

One aspect of the invention provides for a method of delaying emergence of or reducing the number of one or more pests that may become resistant to one or more transgenic insecticidal traits and/or chemical insecticides in a field plot system which comprises plants of a plant population, wherein the plants may comprise one or more transgenic insecticidal traits, wherein a portion of or the entire field plot may comprise one or more chemical insecticides, wherein the entire field plot comprises a core region and a border region, wherein the field plot system further comprises one or more refuges, said method comprising: a) applying a mating disruption tactic to the core region, wherein said mating disruption tactic is capable of disrupting the mating of the one or more pests; and b) applying one or more semiochemicals or factors in the one or more refuges, wherein said one or more semiochemicals or factors are capable of reducing or preventing the movement of one or more susceptible pests, and/or attracting resistant pests to the refuge, wherein said method delays emergence of or reduces the number of one or more pests as a result of the applications when compared to a control field plot which only had one or none of the applications.

In one embodiment, the reduction in number of one or more pests comprises a decrease in mating of a resistant pest with another resistant pest. In another embodiment, said one or more susceptible pests in said one or more refuges mate with one or more resistant pests from the field plot. In another embodiment, the plants comprising one or more transgenic insecticidal traits express one or more *Bacillus thuringiensis* (Bt) proteins.

In one embodiment, applying a mating disruption tactic comprises applying one or more pheromones. In another embodiment, the one or more pheromones comprise sprayable formulations or are in aerosol emitters or hand applied dispensers. In another embodiment, the one or more pheromones are applied at a high concentration and at high coverage.

In one embodiment, said one or more refuges are adjacent to the field plot. In another embodiment, the one or more refuges comprise separate blocks. In another embodiment, said one or more refuges are in the border region. In another embodiment, the one or more refuges promotes migration of one or more susceptible pests to the core region to mate with one or more resistant pests. In another embodiment, the border region is planted earlier than the core region.

In one embodiment, the one or more semiochemicals or factors applied in the method of delaying emergence of or reducing the number of one or more pests that may become resistant to one or more transgenic insecticidal traits and/or chemical insecticides in a field plot system comprise oogenesis and oviposition factors (OOSFs). In another embodiment, the OOSFs are applied by vaporization. In another embodiment, the one or more semiochemicals or factors comprise one or more attractants. In another embodiment, the one or more attractants comprise one or more host plant chemical, non-host plant chemical, synthetic volatile chemical, or natural volatile chemical. In another embodiment, the one or more attractants are identified through binding to one or more pest odorant binding proteins. In another embodiment, the one or more attractants comprise one or more host plant volatile chemical. In another embodiment, the one or more host plant volatile chemical comprise heptanal or benzaldehyde. In another embodiment, the one or more attractants comprise one or more male pheromones. In another embodiment, the one or more attractants comprise one or more ovipositioning pheromones. In another embodiment, the one or more attractants comprise one or more female attractants. In another embodiment, the one or more female attractants comprise ethylene.

In one embodiment, the one or more semiochemicals or factors applied in the method of delaying emergence of or reducing the number of one or more pests that may become resistant to one or more transgenic insecticidal traits and/or chemical insecticides in a field plot system reduces the movement of susceptible female pests from the one or more refuges. In another embodiment, the one or more semiochemicals or factors increases the number of matings occurring in the one or more refuges among susceptible female pests and resistant male pests. In another embodiment, selective advantage of resistance is reduced in the one or more refuges.

In one embodiment, the mating disruption in the method of delaying emergence of or reducing the number of one or more pests that may become resistant to one or more transgenic insecticidal traits and/or chemical insecticides in a field plot system further comprises applying one or more pheromonostatic peptides (PSPs). In one embodiment, the one or more PSPs are applied by vaporization. In another embodiment, each PSP is from a highly dispersive pest of the same species as each pest damaging the plants. In another embodiment, applying one or more PSPs enhances the mating disruption.

In one embodiment, the mating disruption in the method of delaying emergence of or reducing the number of one or more pests that may become resistant to one or more transgenic insecticidal traits and/or chemical insecticides in a field plot system further comprises disrupting one or more pheromone biosynthesis-activating neuropeptides (PBANs) in the one or more pests. In another embodiment, disrupting one or more PBANs enhances the mating disruption. In another embodiment, disrupting one or more PBANs comprises disrupting by RNA interference. In another embodiment, each PBAN is from a highly dispersive pest of the same species as each pest damaging the plants.

In one embodiment, the mating disruption in the method of delaying emergence of or reducing the number of one or more pests that may become resistant to one or more transgenic insecticidal traits and/or chemical insecticides in a field plot system further comprises applying one or more PSPs and disrupting one or more PBANs in the one or more pests.

In one embodiment, the method of delaying emergence of or reducing the number of one or more pests that may become resistant to one or more transgenic insecticidal traits and/or chemical insecticides in a field plot system further comprises applying one or more chemical insecticides comprising independent modes of action to different areas of the field plot. In another embodiment, the method of delaying emergence of or reducing the number of one or more resistant pests in a field plot further comprises applying an attract-and-kill tactic in the field plot, wherein said tactic reduces the number of one or more pests in the field plot. In another embodiment, applying an attract-and-kill tactic comprises applying one or more semiochemicals or factors and one or more insecticides. In another embodiment, the one or more semiochemicals or factors comprise one or more attractants. In another embodiment, the one or more attractants comprise one or more host plant chemical, non-host plant chemical, synthetic volatile chemical, or natural volatile chemical. In another embodiment, the one or more resistant pests are male or female.

Another aspect of the invention provides for a method of rescuing one or more pests' susceptibility to one or more transgenic insecticidal traits and/or chemical insecticides in a field plot system which comprises plants of a plant population, wherein the plants may comprise one or more transgenic insecticidal traits, wherein a portion of or the entire field plot may comprise one or more chemical insecticides, wherein the entire field plot comprises a core region and a border region, wherein the field plot system further comprises one or more refuges, said method comprising: a) applying a mating disruption tactic to the core region, wherein said mating disruption tactic is capable of disrupting the mating of the one or more pests; b) having a pheromone-free zone in the border region; and c) applying a low concentration of one or more semiochemicals or factors in one or more of the refuges, wherein said method rescues the one or more pests' susceptibility to one or more transgenic insecticidal traits and/or chemical insecticides as a result of the applications when compared to a control field plot which only had one or none of the applications.

In one embodiment, the reduction in number of one or more pests comprises a decrease in mating of a resistant pest with another resistant pest. In another embodiment, said one or more susceptible pests in said one or more refuges mate with one or more resistant pests from the field plot. In another embodiment, the plants comprising one or more transgenic insecticidal traits express one or more *Bacillus thuringiensis* (Bt) proteins.

In one embodiment, applying a mating disruption tactic comprises applying one or more pheromones. In another embodiment, the one or more pheromones comprise sprayable formulations or are in aerosol emitters or hand applied dispensers. In another embodiment, the one or more pheromones are applied at a high concentration and at high coverage.

In one embodiment, said one or more refuges are adjacent to the field plot. In another embodiment, the one or more refuges comprise separate blocks. In another embodiment, the one or more refuges promotes migration of one or more susceptible pests to the core region to mate with one or more resistant pests. In another embodiment, the border region is planted earlier than the core region.

In one embodiment, the one or more semiochemicals or factors applied in the method of rescuing one or more pests' susceptibility to one or more transgenic insecticidal traits and/or chemical insecticides in a field plot system comprise male attractants.

In one embodiment, the one or more semiochemicals or factors increases the number of matings occurring in the one or more refuges among susceptible female pests and resistant male pests. In another embodiment, selective advantage of resistance is reduced in the one or more refuges.

In one embodiment, the mating disruption in the method of rescuing one or more pests' susceptibility to one or more transgenic insecticidal traits and/or chemical insecticides in a field plot system further comprises applying one or more pheromonostatic peptides (PSPs). In one embodiment, the one or more PSPs are applied by vaporization. In another embodiment, each PSP is from a highly dispersive pest of the same species as each pest damaging the plants. In another embodiment, applying one or more PSPs enhances the mating disruption.

In one embodiment, the mating disruption in the method of rescuing one or more pests' susceptibility to one or more transgenic insecticidal traits and/or chemical insecticides in a field plot system further comprises disrupting one or more pheromone biosynthesis-activating neuropeptides (PBANs) in the one or more pests. In another embodiment, disrupting one or more PBANs enhances the mating disruption. In another embodiment, disrupting one or more PBANs comprises disrupting by RNA interference. In another embodiment, each PBAN is from a highly dispersive pest of the same species as each pest damaging the plants.

In one embodiment, the mating disruption in the method of rescuing one or more pests' susceptibility to one or more transgenic insecticidal traits and/or chemical insecticides in a field plot system further comprises applying one or more PSPs and disrupting one or more PBANs in the one or more pests.

Another aspect of the invention provides for a field plot system comprising plants of a plant population, wherein the plants may comprise one or more transgenic insecticidal traits, wherein a portion of or the entire field plot may comprise one or more chemical insecticides, wherein the entire field plot comprises a core region and a border region, wherein the field plot system further comprises one or more refuges, wherein the entire field plot further comprises one or more pests capable of damaging the plants, wherein said one or more pests can become resistant to one or more transgenic insecticidal traits and/or chemical insecticides, said field plot comprising: a) one or more semiochemicals applied to the core region, wherein said one or more semiochemicals are capable of disrupting the mating of the one or more pests; and b) one or more semiochemicals or factors applied in the one or more refuges, wherein said one or more semiochemicals or factors are capable of reducing or preventing the movement of one or more susceptible pests, and/or attracting resistant pests to the refuge, wherein said field plot system has a delay in the emergence of or a reduction in the number of one or more pests as a result of the applications when compared to a control field plot system which only had one or none of the applications.

In one embodiment, the one or more semiochemicals applied to the core region comprises one or more pheromones. In another embodiment, the one or more pheromones are applied at a high concentration and at high coverage. In another embodiment, the one or more semiochemicals or factors comprise oogenesis and oviposition factors (OOSFs). In another embodiment, the one or more semiochemicals or factors comprise one or more attractants.

Another aspect of the invention provides for a field plot system comprising plants of a plant population, wherein the plants may comprise one or more transgenic insecticidal traits, wherein a portion of or the entire field plot may comprise one or more chemical insecticides, wherein the entire field plot comprises a core region and a border region, wherein the field plot system further comprises one or more refuges, wherein the field plot system further comprises one or more pests capable of damaging the plants, wherein said one or more pests have become resistant to one or more transgenic insecticidal traits and/or chemical insecticides, said field plot comprising: a) one or more semiochemicals applied to the core region, wherein said one or more semiochemicals are capable of disrupting the mating of the one or more pests, b) a pheromone-free zone in the border region; and c) a low concentration of one or more semiochemicals or factors applied in one or more of the refuges, wherein said field plot system has the one or more pests' susceptibility to one or more transgenic insecticidal trait and/or chemical insecticide rescued as a result of the applications when compared to a control field plot system which only had one or none of the applications.

In one embodiment, the one or more semiochemicals applied to the core region comprises one or more pheromones. In another embodiment, the one or more pheromones are applied at a high concentration and at high coverage. In another embodiment, the low concentration of one or more semiochemicals or factors comprises male attractants.

Another aspect of the invention provides for a method of delaying emergence of or reducing the number of one or more pests that may become resistant to one or more transgenic insecticidal traits and/or chemical insecticides in a field plot system which comprises plants of a plant population, wherein the plants may comprise one or more transgenic insecticidal traits, wherein said one or more traits are low-dose, wherein a portion of or the entire field plot may comprise one or more chemical insecticides, said method comprising: a) applying a mating disruption tactic to the core region, wherein said mating disruption tactic is capable of disrupting the mating of the one or more pests; and wherein said method delays emergence of or reduces the number of one or more pests as a result of the application when compared to a control field plot which did not have the application.

In one aspect, the disclosure teaches a model wherein a farmer provides a two Bt transgene crop that controls 2 Lepidopterans (each Bt transgene is directed against a target Lepidopteran). If one of the Bt transgenes is lost to resistance, but the other Bt transgene is still viable, one could package a targeted pheromone (as taught herein) that will generate mating disruption and damage control against the insect for the trait that was lost. The crop would then be protected against both insects (first Bt trait still protecting against one insect and pheromone enduced mating disruption protecting against the insect that developed resistance to the second Bt trait), despite the fact that one of the two Bt traits had been lost. This concept could be applied for any number of traits in a given crop. As an example, consider MON89034 (corn containing cry2Ab2 and cry1A.105) If fall army worm (FAW, *Spodopetera frugiperda*) overcomes the Bt toxins and becomes resistant, certainly farmers would remain interested in the corn earworm (CEW, *Helcoverpa zea*) component of damage control provided by the MON89034. Consequently, *Spodopetera frugiperda* (FAW) pheromones could be used to fill the damage control gap as outlined above. Thus, the corn would be protected against *Helcoverpa zea* (CEW) by the Bt toxin and would be protected against *S. frugiperda* by the pheromone.

In addition to the exemplary aspects and embodiments described above, further aspects and embodiments will become apparent by study of the following descriptions.

DETAILED DESCRIPTION OF THE DISCLOSURE

Figure 1:
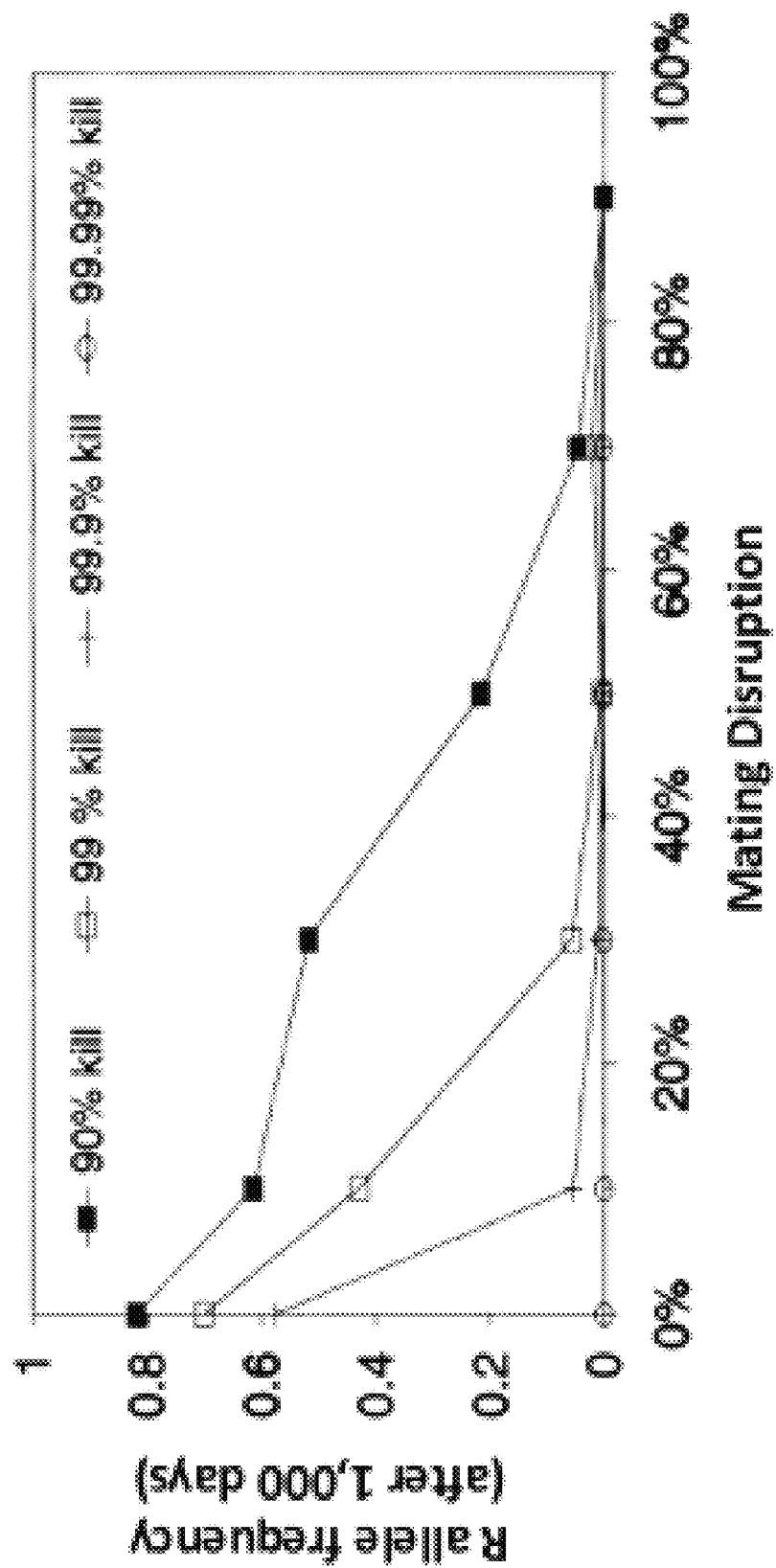
FIG. 1 shows the simulated synergy between Bt dose and mating disruption. The lower the Bt dose the higher mating disruption needs to be to lead to the same frequency of resistance allele after 1,000 days (from Caprio and Suckling 1995).

All publications, patents and patent applications, including any drawings and appendices, herein are incorporated by reference to the same extent as if each individual publication or patent application was specifically and individually indicated to be incorporated by reference.

The following description includes information that may be useful in understanding the present invention. It is not an admission that any of the information provided herein is prior art or relevant to the presently claimed inventions, or that any publication specifically or implicitly referenced is prior art.

In the description and tables which follow, a number of terms are used. In order to provide a clear and consistent understanding of the specification and claims, including the scope to be given such terms, the following definitions are provided:

As used herein, the term "a" refers to a noun and can refer to the singular or the plural version. Thus, a reference to a pheromone can refer to one pheromone or more than one pheromone.

As used herein, "consisting essentially of" refers to a composition "consisting essentially of" certain elements is limited to the inclusion of those elements, as well as to those elements that do not materially affect the basic and novel characteristics of the inventive composition.

As used herein, the terms "comprises," "comprising," "includes," "including," "has," "having," "contains," "containing," or any other variation thereof, are intended to cover a non-exclusive inclusion. A composition, mixture, process, method, article, or apparatus that comprises a list of elements is not necessarily limited to only those elements but may include other elements not expressly listed or inherent to such composition, mixture, process, method, article, or apparatus. Further, unless expressly stated to the contrary, "or" refers to an inclusive "or" and not to an exclusive "or."

As used herein, the term "about" in reference to a numerical value refers to the range of values somewhat lesser or greater than the stated value, as understood by one of skill in the art. For example, the term "about" could mean a value ranging from plus or minus a percentage (e.g., ±1%, ±2%, ±5%, or ±10%) of the stated value. Furthermore, since all numbers, values, and expressions referring to quantities used herein are subject to the various uncertainties of measurement encountered in the art, then unless otherwise indicated, all presented values may be understood as modified by the term "about."

As used herein, the term "effective proximity" refers to a distance at which one or more semiochemicals (e.g. a pheromone) are able to mediate interactions between one or more organisms of a given species. In one embodiment, the effective proximity allows one or more semiochemicals to be as effective as a natural semiochemical secreted or emitted by an organism that produces the one or more semiochemicals. As an example, one or more pheromones of *Spodoptera frugiperda* may be applied via spraying or dispenser to a locus that is in effective proximity to an agricultural area, and this distance allows emission of the one or more applied pheromones of *Spodoptera frugiperda* that resembles an emission of the corresponding one or more natural pheromones from *S. frugiperda* at that locus. In one embodiment, the volatilization of one or more applied pheromones of *Spodoptera frugiperda* at that locus is about equal to or better than the volatilization of one or more natural pheromones from *S. frugiperda* at that locus. In another embodiment, the mating disruption due to one or more applied pheromones of *Spodoptera frugiperda* at that locus is about equal to or better than the mating disruption of one or more natural pheromones from *S. frugiperda* at that locus.

As used herein, the term "plant" refers to any living organism belonging to the kingdom Plantae (i.e., any genus/species in the Plant Kingdom).

As used herein, the term "monocotyledon" or "monocot" refer to any of a subclass (Monocotyledoneae) of flowering plants having an embryo containing only one seed leaf and usually having parallel-veined leaves, flower parts in multiples of three, and no secondary growth in stems and roots. Examples include lilies; orchids; rice; corn, grasses, such as tall fescue, goat grass, and Kentucky bluegrass; grains, such as wheat, oats and barley; irises; onions and palms.

As used herein, the terms "dicotyledon" and "dicot" refer to a flowering plant having an embryo containing two seed halves or cotyledons. Examples include tobacco; tomato; the legumes, including peas, alfalfa, clover and soybeans; oaks; maples; roses; mints; squashes; daisies; walnuts; cacti; violets and buttercups.

As used herein, the term "population" means a genetically homogeneous or heterogeneous collection of organisms sharing a common genetic derivation.

As used herein, the term "phenotype" refers to the observable characters of an individual cell, cell culture, organism (e.g., a plant), or group of organisms which results from the interaction between that individual's genetic makeup (i.e., genotype) and the environment.

As used herein, the term "variety" or "cultivar" means a group of similar plants that by structural features and performance can be identified from other varieties within the same species. The term "variety" as used herein has identical meaning to the corresponding definition in the International Convention for the Protection of New Varieties of Plants (UPOV treaty), of Dec. 2, 1961, as Revised at Geneva on Nov. 10, 1972, on Oct. 23, 1978, and on Mar. 19, 1991. Thus, "variety" means a plant grouping within a single botanical taxon of the lowest known rank, which grouping, irrespective of whether the conditions for the grant of a breeder's right are fully met, can be i) defined by the expression of the characteristics resulting from a given genotype or combination of genotypes, ii) distinguished from any other plant grouping by the expression of at least one of the said characteristics and iii) considered as a unit with regard to its suitability for being propagated unchanged.

As used herein, the term "gene" refers to any segment of DNA associated with a biological function. Thus, genes include, but are not limited to, coding sequences and/or the regulatory sequences required for their expression. Genes can also include nonexpressed DNA segments that, for example, form recognition sequences for other proteins. Genes can be obtained from a variety of sources, including cloning from a source of interest or synthesizing from known or predicted sequence information, and may include sequences designed to have desired parameters.

As used herein, the term "genotype" refers to the genetic makeup of an individual cell, cell culture, tissue, organism (e.g., a plant), or group of organisms.

As used herein, the term "hybrid" refers to any individual cell, tissue or plant resulting from a cross between parents that differ in one or more genes.

As used herein, the term "inbred" or "inbred line" refers to a relatively true-breeding strain.

As used herein, the term "line" is used broadly to include, but is not limited to, a group of plants vegetatively propagated from a single parent plant, via tissue culture techniques or a group of inbred plants which are genetically very similar due to descent from a common parent(s). A plant is said to "belong" to a particular line if it (a) is a primary transformant (T0) plant regenerated from material of that line; (b) has a pedigree comprised of a TO plant of that line; or (c) is genetically very similar due to common ancestry (e.g., via inbreeding or selfing). In this context, the term "pedigree" denotes the lineage of a plant, e.g. in terms of the sexual crosses affected such that a gene or a combination of genes, in heterozygous (hemizygous) or homozygous condition, imparts a desired trait to the plant.

As used herein, the term "plant part" refers to any part of a plant including but not limited to the shoot, root, stem, seeds, fruits, stipules, leaves, petals, flowers, ovules, bracts, branches, petioles, internodes, bark, pubescence, tillers, rhizomes, fronds, blades, pollen, stamen, rootstock, scion and the like. The two main parts of plants grown in some sort of media, such as soil, are often referred to as the "above-ground" part, also often referred to as the "shoots", and the "below-ground" part, also often referred to as the "roots".

As used herein, the term "nucleic acid" refers to a polymeric form of nucleotides of any length, either ribonucleotides or deoxyribonucleotides, or analogs thereof. This term refers to the primary structure of the molecule, and thus includes double- and single-stranded DNA, as well as double- and single-stranded RNA. It also includes modified nucleic acids such as methylated and/or capped nucleic acids, nucleic acids containing modified bases, backbone modifications, and the like. The terms "nucleic acid" and "nucleotide sequence" are used interchangeably.

As used herein, the terms "polypeptide," "peptide," and "protein" are used interchangeably herein to refer to polymers of amino acids of any length. These terms also include proteins that are post-translationally modified through reactions that include glycosylation, acetylation and phosphorylation.

As used herein, "attract-and-kill" refers to a technique or tactic in pest management where one or more semiochemicals or factors and one or more killing or sterilizing agents are applied in a concentrated area at the pest source to provide pest control. In one embodiment, the one or more semiochemicals comprise attractants or crude baits. In another embodiment, the one or more factors comprise factors that stimulate earlier egg maturation/oogenesis and/or ovipositioning. In one embodiment the factors that stimulate earlier egg maturation/oogenesis and/or ovipositioning are oogenesis and oviposition factors (OOSFs). In another embodiment, the OOSFs are from crude extracts of male accessory glands (MAG). In another embodiment, the OOSFs are purified by fractionation or sub-fractionation from crude extracts of male accessory glands (MAG). In one embodiment, the killing agent can comprise an insecticide. In another embodiment, the insecticide can comprise a biological insecticide, a chemical insecticide, a plant incorporated insecticide, or any combination thereof. In one embodiment, the pest can be lured to a pest control device which comprises a substance that can quickly or eventually kill the pest, e.g., a pesticide, poison, biological agent, etc. In one embodiment, a segment of a capsule can contain a substance (e.g., an adhesive, powder, coating, etc.) that contains a contact pesticide that kills an insect that contacts the substance. The pesticide could work by any mechanism, such as by poison, e.g., a stomach poison, a biological agent such as Codling moth granulosis virus, a Molt accelerator, diatomaceous earth, or any other kind of ingestible poison. In another embodiment, semiochemical attractants used to lure the pest can be chemical signals, visual cues, acoustic cues, or a combination of any of these signals and cues. This pest management technique is also known as lure and kill.

As used herein, "attractant" refers to a natural or synthetic agent that attracts or lures, for example, animals, insects, birds, etc. Attractants can include: sexual attractants which affect mating behavior; food attractants; attractants that affect egg-laying, or ovipositioning.

As used herein, "repellent" or "deterrent" refers to a substance applied to a surface which discourages pests from landing or climbing on that surface. In one embodiment, the surface can be a whole plant or plant part.

As used herein, a "dispenser" or "dispensing device" refers to an automated device that provides a pheromone reservoir and a controlled release of the content. Examples of the controlled release include, but not limited to, atomize, dispense, diffuse, evaporate, spray, vaporize, or the like. The rate of controlled release may be continuous, periodic, or timed intervals.

As used herein, "durability", "trait durability", "genetic trait durability", "durability of one or more transgenic insecticidal traits", "durability of trait", or "durability of genetic trait" refers to the time until resistance to a genetic trait evolves or emerges. In one embodiment, delaying emergence of resistance to a genetic trait increases the durability of the trait.

As used herein, "highly dispersive insect", "highly dispersive insect pest" or "highly dispersive pest" refers to any pest that cannot be controlled by mating disruption over an area less than about four hectares. Highly dispersive insect pests are difficult to control via mating disruption at small scales, usually due to the immigration of gravid females. Mating disruption for these types of pests is more effective with an area-wide management program.

As used herein, "host", "host plant" or "host crop" refers to a crop or plant that a given pest feeds or otherwise subsists upon. As used herein, "non-host", "non-host plant" or "non-host crop" refers to a crop or plant that a given pest usually does not feed or otherwise subsist upon under normal field conditions.

As used herein, "monophagous" refers to feeding on or utilizing a single kind of food. In one embodiment, the feeding is on a single kind of plant.

As used herein, "polyphagous" refers to feeding on or utilizing many kinds of food. In one embodiment, the feeding is on many kinds of plants.

As used herein, "corn" can refer to sweet corn and also field corn. "Sweet corn" (*Zea mays* convar. *saccharata* var. *rugosa*; also called sugar corn and pole corn) is a variety of maize with a high sugar content. Sweet corn is the result of a naturally occurring recessive mutation in the genes which control conversion of sugar to starch inside the endosperm of the corn kernel. Unlike field corn varieties, which are harvested when the kernels are dry and mature (dent stage), sweet corn is picked when immature (milk stage) and prepared and eaten as a vegetable, rather than a grain. Since the process of maturation involves converting sugar to starch, sweet corn stores poorly and must be eaten fresh, canned, or frozen, before the kernels become tough and starchy. "Field corn" is a general term used in North America for corn varieties other than sweet corn, popcorn, yellow food grade corn used for yellow corn meal or flour and corn starch, and white food-grade corn used for white meal or flour and corn starch. Field corn is primarily grown for livestock feed and ethanol production when allowed to mature fully before being shelled off the cob before being stored in silos, pits, bins or grain "flats". Field corn can also be harvested as high-moisture corn, shelled off the cob and piled and packed like sileage for fermentation; or the entire plant may be chopped while still very high in moisture with the resulting silage either loaded and packed in plastic bags, piled and packed in pits, or blown into and stored in vertical silos. Although not grown primarily for human consumption, people do pick ears of field corn when its sugar content has peaked and cook it on the cob or eat it raw. Ears of field corn picked and consumed in this manner are commonly called "roasting ears" due to the most commonly used method of cooking them. Thus, field corn is generally every variety of maize that is not grown primarily for consumption as human food in the form of fresh kernels. In contrast sweet corn is grown primary as edible crop. The methods taught herein can be applied to both sweet corn and field corn.

As used herein, "insecticide" refers to pesticides that are formulated to kill, harm, repel or mitigate one or more species of insect. Insecticides can be of chemical or biological origin. Insecticides include peptides, proteins and nucleic acids such as double-stranded DNA, single-stranded DNA, double-stranded RNA, single-stranded RNA and hairpin DNA or RNA. Examples of peptide insecticides include Spear™-T for the treatment of *thrips* in vegetables and ornamentals in greenhouses, Spear™-P to control the Colorado Potato Beetle, and Spear™-C to protect crops from lepidopteran pests (Vestaron Corporation, Kalamazoo, MI). Insecticides can be viruses such as Gemstar® (Certis USA) that kills larvae of *Heliothis* and *Helicoverpa* species. Insecticides can be packaged in various forms including sprays, dusts, gels, and baits. Insecticides can work through different modes of action (MoAs). Table A lists insecticides associated with various MoAs and Table B is a list of exemplary pesticides.

TABLE A

Exemplary insecticides associated with various modes of action

| Mode of Action | Compound class | Exemplary insecticides | Physiological function(s) affected |
|---|---|---|---|
| acetylcholinesterase (AChE) inhibitors | carbamates | Alanycarb, Aldicarb, Bendiocarb, Benfuracarb, Butocarboxim, Butoxycarboxim, Carbaryl, Carbofuran, Carbosulfan Ethiofencarb, Fenobucarb, Formetanate, Furathiocarb, Isoprocarb, Methiocarb, Methomyl, Metolcarb, Oxamyl, Pirimicarb, Propoxur, Thiodicarb, Thiofanox, Triazamate, Trimethacarb, XMC, Xylylcarb | Nerve and muscle |
| acetylcholinesterase (AChE) inhibitors | organophosphates | Acephate, Azamethiphos, Azinphos-ethyl, Azinphos-methyl, Cadusafos, Chlorethoxyfos, Chlorfenvinphos, Chlormephos, Chlorpyrifos, Chlorpyrifos-methyl, Coumaphos, Cyanophos, Demeton-S-methyl, Diazinon, Dichlorvos/DDVP, Dicrotophos, Dimethoate, Dimethylvinphos, Disulfoton, EPN, Ethion, Ethoprophos, Famphur, Fenamiphos, Fenitrothion, Fenthion, Fosthiazate, Heptenophos, Imicyafos, Isofenphos, Isopropyl O-(methoxyaminothio-phosphoryl) salicylate, Isoxathion, Malathion, Mecarbam, Methamidophos, Methidathion, Mevinphos, Monocrotophos, Naled, Omethoate, Oxydemeton-methyl, Parathion, Parathion-methyl, Phenthoate, Phorate, Phosalone, Phosmet, Phosphamidon, Phoxim, Pirimiphos-methyl, Profenofos, Propetamphos, Prothiofos, Pyraclofos, Pyridaphenthion, Quinalphos, Sulfotep, Tebupirimfos, Temephos, Terbufos, Tetrachlorvinphos, Thiometon, Triazophos, Trichlorfon, Vamidothion | Nerve and muscle |
| GABA-gated chloride channel blockers | cyclodiene organochlorines | Chlordane, Endosulfan | Nerve and muscle |
| GABA-gated chloride channel blockers | phenylpyrazoles (Fiproles) | Ethiprole, Fipronil | Nerve and muscle |
| sodium channel modulators | pyrethroids, pyrethrins | Acrinathrin, Allethrin, Bifenthrin, Bioallethrin, Bioallethrin S-cyclopentenyl, Bioresmethrin, Cycloprothrin, Cyfluthrin, Cyhalothrin, Cypermethrin, Cyphenothrin [(1R)-trans- isomers], Deltamethrin, Empenthrin [(EZ)-(1R)- isomers], Esfenvalerate, Etofenprox, Fenpropathrin, Fenvalerate, Flucythrinate, Flumethrin, Halfenprox, Kadathrin, Phenothrin [(1R)-trans- isomer], Prallethrin, Pyrethrins (pyrethrum), Resmethrin, Silafluofen, Tefluthrin, Tetramethrin, Tetramethrin [(1R)- isomers], Tralomethrin, Transfluthrin, alpha-Cypermethrin, beta-Cyfluthrin, beta-Cypermethrin, d-cis-trans Allethrin, d-trans Allethrin, gamma-Cyhalothrin, | Nerve and muscle |

TABLE A-continued

Exemplary insecticides associated with various modes of action

| Mode of Action | Compound class | Exemplary insecticides | Physiological function(s) affected |
| --- | --- | --- | --- |
| sodium channel modulators | DDT, methoxychlor | lambda-Cyhalothrin, tau-Fluvalinate, theta-Cypermethrin, zeta-Cypermethrin DDT, methoxychlor | Nerve and muscle |
| nicotinic acetylcholine receptor (nAChR) competitive modulators | neonicotinoids | Acetamiprid, Clothianidin, Dinotefuran, Imidacloprid, Nitenpyram, Thiacloprid, Thiamethoxam | Nerve and muscle |
| nicotinic acetylcholine receptor (nAChR) competitive modulators | nicotine | nicotine | Nerve and muscle |
| nicotinic acetylcholine receptor (nAChR) competitive modulators | sulfoximines | sulfoxaflor | Nerve and muscle |
| nicotinic acetylcholine receptor (nAChR) competitive modulators | butenolides | Flupyradifurone | Nerve and muscle |
| nicotinic acetylcholine receptor (nAChR) allosteric modulators | spinosyns | Spinetoram, Spinosad | Nerve and muscle |
| Glutamate-gated chloride channel (GluCl) allosteric modulators | avermectins, milbemycins | Abamectin, Emamectin benzoate, Lepimectin, Milbemectin | Nerve and muscle |
| juvenile hormone mimics | juvenile hormone analogues | Hydroprene, Kinoprene, Methoprene | Growth |
| juvenile hormone mimics | Fenoxycarb | Fenoxycarb | Growth |
| juvenile hormone mimics | Pyriproxyfen | Pyriproxyfen | Growth |
| miscellaneous non-specific (multi-site) inhibitors | alkyl halides | Methyl bromide and other alkyl halides | Unknown or non-specific |
| miscellaneous non-specific (multi-site) inhibitors | Chloropicrin | Chloropicrin | Unknown or non-specific |
| miscellaneous non-specific (multi-site) inhibitors | fluorides | Cryolite, sulfuryl fluoride | Unknown or non-specific |
| miscellaneous non-specific (multi-site) inhibitors | borates | Borax, Boric acid, Disodium octaborate, Sodium borate, Sodium metaborate | Unknown or non-specific |
| miscellaneous non-specific (multi-site) inhibitors | tartar emetic | tartar emetic | Unknown or non-specific |
| miscellaneous non-specific (multi-site) inhibitors | methyl isothiocyanate generators | Dazomet, Metam | Unknown or non-specific |
| modulators of chordotonal organs | Pyridine azomethine derivatives | Pymetrozine, Pyrifluquinazon | Nerve and muscle |
| mite growth inhibitors | Clofentezine, Diflovidazin, Hexythiazox | Clofentezine, Diflovidazin, Hexythiazox | Growth |
| mite growth inhibitors | Etoxazole | Etoxazole | Growth |
| microbial disruptors of insect midgut membranes | *Bacillus thuringiensis* and the insecticidal proteins they produce | Bt var. *aizawai*, Bt var. *israelensis*, Bt var. *kurstaki*, Bt var. *tenebrionensis* | Midgut |
| microbial disruptors of insect midgut membranes | *Bacillus sphaericus* | *Bacillus sphaericus* | Midgut |
| inhibitors of mitochondrial ATP synthase | Diafenthiuron | Diafenthiuron | Respiration |
| inhibitors of mitochondrial ATP synthase | organotin miticides | Azocyclotin, Cyhexatin, Fenbutatin oxide | Respiration |

TABLE A-continued

Exemplary insecticides associated with various modes of action

| Mode of Action | Compound class | Exemplary insecticides | Physiological function(s) affected |
|---|---|---|---|
| inhibitors of mitochondrial ATP synthase | Propargite | Propargite | Respiration |
| inhibitors of mitochondrial ATP synthase | Tetradifon | Tetradifon | Respiration |
| uncouplers of oxidative phosphorylation via disruption of the proton gradient | Chlorfenapyr, DNOC, Sulfuramid | Chlorfenapyr, DNOC, Sulfuramid | Respiration |
| Nicotinic acetylcholine receptor (nAChR) channel blockers | nereistoxin analogues | Bensultap, Cartap hydrochloride, Thiocyclam, Thiosultap-sodium | Nerve and muscle |
| inhibitors of chitin biosynthesis, type 0 | benzoylureas | Bistrifluron, Chlorfluazuron, Diflubenzuron, Flucycloxuron, Flufenoxuron, Hexaflumuron, Lufenuron, Novaluron, Noviflumuron, Teflubenzuron, Triflumuron | Growth |
| inhibitors of chitin biosynthesis, type 1 | Buprofezin | Buprofezin | Growth |
| moulting disruptor, Dipteran | Cyromazine | Cyromazine | Growth |
| ecdysone receptor agonists | diacylhydrazines | Chromafenozide, Halofenozide, Methoxyfenozide, Tebufenozide | Growth |
| octopamine receptor agonists | Amitraz | Amitraz | Nerve and muscle |
| mitochondrial complex III electron transport inhibitors | Hydramethylnon | Hydramethylnon | Respiration |
| mitochondrial complex III electron transport inhibitors | Acequinocyl | Acequinocyl | Respiration |
| mitochondrial complex III electron transport inhibitors | Fluacrypyrim | Fluacrypyrim | Respiration |
| mitochondrial complex III electron transport inhibitors | Bifenazate | Bifenazate | Respiration |
| mitochondrial complex I electron transport inhibitors | Meti acaricides and insecticides | Fenazaquin, Fenpyroximate, Pyridaben, Pyrimidifen, Tebufenpyrad, Tolfenpyrad | Respiration |
| mitochondrial complex I electron transport inhibitors | Rotenone | Rotenone | Respiration |
| voltage-dependent sodium channel blockers | oxadiazines | Indoxacarb | Nerve and muscle |
| voltage-dependent sodium channel blockers | semicarbazones | Metaflumizone | Nerve and muscle |
| inhibitors of acetyl CoA carboxylase | tetronic and tetramic acid derivatives | Spirodiclofen, Spiromesifen, Spirotetramat | Growth |
| mitochondrial complex IV electron transport inhibitors | phosphides | Aluminium phosphide, Calcium phosphide, Phosphine, Zinc phosphide | Respiration |
| mitochondrial complex IV electron transport inhibitors | cyanides | Calcium cyanide, Potassium cyanide, Sodium cyanide | Respiration |
| mitochondrial complex II electron transport inhibitors | beta-ketonitrile derivatives | Cyenopyrafen, Cyflumetofen | Respiration |
| mitochondrial complex II electron transport inhibitors | carboxanilides | Pyflubumide | Respiration |
| ryanodine receptor modulators | diamides | Chlorantraniliprole, Cyantraniliprole, Flubendiamide | Nerve and muscle |
| Chordotonal organ modulators—undefined target site | Flonicamid | Flonicamid | Nerve and muscle |

TABLE A-continued

Exemplary insecticides associated with various modes of action

| Mode of Action | Compound class | Exemplary insecticides | Physiological function(s) affected |
|---|---|---|---|
| compounds of unknown or uncertain mode of action | Azadirachtin | Azadirachtin | Unknown |
| compounds of unknown or uncertain mode of action | Benzoximate | Benzoximate | Unknown |
| compounds of unknown or uncertain mode of action | Bromopropylate | Bromopropylate | Unknown |
| compounds of unknown or uncertain mode of action | Chinomethionat | Chinomethionat | Unknown |
| compounds of unknown or uncertain mode of action | Dicofol | Dicofol | Unknown |
| compounds of unknown or uncertain mode of action | lime sulfur | lime sulfur | Unknown |
| compounds of unknown or uncertain mode of action | Pyridalyl | Pyridalyl | Unknown |
| compounds of unknown or uncertain mode of action | sulfur | sulfur | Unknown |

Adapted from www.irac-online.org

TABLE B

Exemplary list of pesticides

| Category | Compounds |
|---|---|
| INSECTICIDES | |
| arsenical insecticides | calcium arsenate |
| | copper acetoarsenite |
| | copper arsenate |
| | lead arsenate |
| | potassium arsenite |
| | sodium arsenite |
| botanical insecticides | allicin |
| | anabasine |
| | azadirachtin |
| | carvacrol |
| | d-limonene |
| | matrine |
| | nicotine |
| | nornicotine |
| | oxymatrine |
| | pyrethrins |
| | cinerins |
| | cinerin I |
| | cinerin II |
| | jasmolin I |
| | jasmolin II |
| | pyrethrin I |
| | pyrethrin II |
| | quassia |
| | rhodojaponin-III |
| | rotenone |
| | ryania |
| | sabadilla |
| | sanguinarine |
| | triptolide |
| carbamate insecticides | bendiocarb |
| | carbaryl |
| benzofuranyl methylcarbamate insecticides | benfuracarb |
| | carbofuran |
| | carbosulfan |
| | decarbofuran |
| | furathiocarb |
| dimethylcarbamate insecticides | dimetan |
| | dimetilan |
| | hyquincarb |
| | isolan |
| | pirimicarb |
| | pyramat |
| | pyrolan |
| oxime carbamate insecticides | alanycarb |
| | aldicarb |
| | aldoxycarb |
| | butocarboxim |
| | butoxycarboxim |
| | methomyl |
| | nitrilacarb |
| | oxamyl |
| | tazimcarb |
| | thiocarboxime |
| | thiodicarb |
| | thiofanox |
| phenyl methylcarbamate insecticides | allyxycarb |
| | aminocarb |
| | bufencarb |
| | butacarb |
| | carbanolate |
| | cloethocarb |
| | CPMC |
| | dicresyl |
| | dimethacarb |
| | dioxacarb |
| | EMPC |
| | ethiofencarb |
| | fenethacarb |
| | fenobucarb |
| | isoprocarb |
| | methiocarb |
| | metolcarb |
| | mexacarbate |
| | promacyl |
| | promecarb |

TABLE B-continued

Exemplary list of pesticides

| Category | Compounds |
|---|---|
| | propoxur |
| | trimethacarb |
| | XMC |
| | xylylcarb |
| diamide insecticides | broflanilide |
| | chlorantraniliprole |
| | cyantraniliprole |
| | cyclaniliprole |
| | cyhalodiamide |
| | flubendiamide |
| | tetraniliprole |
| dinitrophenol insecticides | dinex |
| | dinoprop |
| | dinosam |
| | DNOC |
| fluorine insecticides | barium hexafluorosilicate |
| | cryolite |
| | flursulamid |
| | sodium fluoride |
| | sodium hexafluorosilicate |
| | sulfluramid |
| formamidine insecticides | amitraz |
| | chlordimeform |
| | formetanate |
| | formparanate |
| | medimeform |
| | semiamitraz |
| fumigant insecticides | acrylonitrile |
| | carbon disulfide |
| | carbon tetrachloride |
| | carbonyl sulfide |
| | chloroform |
| | chloropicrin |
| | cyanogen |
| | para-dichlorobenzene |
| | 1,2-dichloropropane |
| | dithioether |
| | ethyl formate |
| | ethylene dibromide |
| | ethylene dichloride |
| | ethylene oxide |
| | hydrogen cyanide |
| | methyl bromide |
| | methyl iodide |
| | methylchloroform |
| | methylene chloride |
| | naphthalene |
| | phosphine |
| | sodium tetrathiocarbonate |
| | sulfuryl fluoride |
| | tetrachloroethane |
| inorganic insecticides | borax |
| | boric acid |
| | calcium polysulfide |
| | copper oleate |
| | diatomaceous earth |
| | mercurous chloride |
| | potassium thiocyanate |
| | silica gel |
| | sodium thiocyanate |
| insect growth regulators | |
| chitin synthesis inhibitors | buprofezin |
| | cyromazine |
| benzoylphenylurea chitin synthesis inhibitors | bistrifluron |
| | chlorbenzuron |
| | chlorfluazuron |
| | dichlorbenzuron |
| | diflubenzuron |
| | flucycloxuron |
| | flufenoxuron |
| | hexaflumuron |
| | lufenuron |
| | novaluron |
| | noviflumuron |
| | penfluron |

TABLE B-continued

Exemplary list of pesticides

| Category | Compounds |
|---|---|
| | teflubenzuron |
| | triflumuron |
| juvenile hormone mimics | dayoutong |
| | epofenonane |
| | fenoxycarb |
| | hydroprene |
| | kinoprene |
| | methoprene |
| | pyriproxyfen |
| | triprene |
| juvenile hormones | juvenile hormone I |
| | juvenile hormone II |
| | juvenile hormone III |
| moulting hormone agonists | chromafenozide |
| | furan tebufenozide |
| | halofenozide |
| | methoxyfenozide |
| | tebufenozide |
| | yishijing |
| moulting hormones | α-ecdysone |
| | ecdysterone |
| moulting inhibitors | diofenolan |
| precocenes | precocene I |
| | precocene II |
| | precocene III |
| unclassified insect growth regulators | dicyclanil |
| macrocyclic lactone insecticides | |
| avermectin insecticides | abamectin |
| | doramectin |
| | emamectin |
| | eprinomectin |
| | ivermectin |
| | selamectin |
| milbemycin insecticides | lepimectin |
| | milbemectin |
| | milbemycin oxime |
| | moxidectin |
| spinosyn insecticides | spinetoram |
| | spinosad |
| neonicotinoid insecticides | |
| nitroguanidine neonicotinoid insecticides | clothianidin |
| | dinotefuran |
| | imidacloprid |
| | imidaclothiz |
| | thiamethoxam |
| nitromethylene neonicotinoid insecticides | nitenpyram |
| | nithiazine |
| pyridylmethylamine neonicotinoid insecticides | acetamiprid |
| | imidacloprid |
| | nitenpyram |
| | paichongding |
| | thiacloprid |
| nereistoxin analogue insecticides | bensultap |
| | cartap |
| | polythialan |
| | thiocyclam |
| | thiosultap |
| organochlorine insecticides | bromo-DDT |
| | camphechlor |
| | DDT |
| | pp'-DDT |
| | ethyl-DDD |
| | HCH |
| | gamma-HCH |
| | lindane |
| | methoxychlor |
| | pentachlorophenol |
| | TDE |
| cyclodiene insecticides | aldrin |
| | bromocyclen |
| | chlorbicyclen |
| | chlordane |
| | chlordecone |
| | dieldrin |

TABLE B-continued

Exemplary list of pesticides

| Category | Compounds |
|---|---|
| | dilor |
| | endosulfan |
| | alpha-endosulfan |
| | endrin |
| | HEOD |
| | heptachlor |
| | HHDN |
| | isobenzan |
| | isodrin |
| | kelevan |
| | mirex |
| organophosphorus insecticides | |
| organophosphate insecticides | bromfenvinfos |
| | calvinphos |
| | chlorfenvinphos |
| | crotoxyphos |
| | dichlorvos |
| | dicrotophos |
| | dimethylvinphos |
| | fospirate |
| | heptenophos |
| | methocrotophos |
| | mevinphos |
| | monocrotophos |
| | naled |
| | naftalofos |
| | phosphamidon |
| | propaphos |
| | TEPP |
| | tetrachlorvinphos |
| organothiophosphate insecticides | dioxabenzofos |
| | fosmethilan |
| | phenthoate |
| aliphatic organothiophosphate insecticides | acethion |
| | acetophos |
| | amiton |
| | cadusafos |
| | chlorethoxyfos |
| | chlormephos |
| | demephion |
| | demephion-O |
| | demephion-S |
| | demeton |
| | demeton-O |
| | demeton-S |
| | demeton-methyl |
| | demeton-O-methyl |
| | demeton-S-methyl |
| | demeton-S-methylsulphon |
| | disulfoton |
| | ethion |
| | ethoprophos |
| | IPSP |
| | isothioate |
| | malathion |
| | methacrifos |
| | methylacetophos |
| | oxydemeton-methyl |
| | oxydeprofos |
| | oxydisulfoton |
| | phorate |
| | sulfotep |
| | terbufos |
| | thiometon |
| aliphatic amide organothiophosphate insecticides | amidithion |
| | cyanthoate |
| | dimethoate |
| | ethoate-methyl |
| | formothion |
| | mecarbam |
| | omethoate |
| | prothoate |
| | sophamide |
| | vamidothion |

TABLE B-continued

Exemplary list of pesticides

| Category | Compounds |
|---|---|
| oxime organothiophosphate insecticides | chlorphoxim |
| | phoxim |
| | phoxim-methyl |
| heterocyclic organothiophosphate insecticides | azamethiphos |
| | colophonate |
| | coumaphos |
| | coumithoate |
| | dioxathion |
| | endothion |
| | menazon |
| | morphothion |
| | phosalone |
| | pyraclofos |
| | pyrazothion |
| | pyridaphenthion |
| | quinothion |
| benzothiopyran organothiophosphate insecticides | dithicrofos |
| | thicrofos |
| benzotriazine organothiophosphate insecticides | azinphos-ethyl |
| | azinphos-methyl |
| isoindole organothiophosphate insecticides | dialifos |
| | phosmet |
| isoxazole organothiophosphate insecticides | isoxathion |
| | zolaprofos |
| pyrazolopyrimidine organothiophosphate insecticides | chlorprazophos |
| | pyrazophos |
| pyridine organothiophosphate insecticides | chlorpyrifos |
| | chlorpyrifos-methyl |
| pyrimidine organothiophosphate insecticides | butathiofos |
| | diazinon |
| | etrimfos |
| | lirimfos |
| | pirimioxyphos |
| | pirimiphos-ethyl |
| | pirimiphos-methyl |
| | primidophos |
| | pyrimitate |
| | tebupirimfos |
| quinoxaline organothiophosphate insecticides | quinalphos |
| | quinalphos-methyl |
| thiadiazole organothiophosphate insecticides | athidathion |
| | lythidathion |
| | methidathion |
| | prothidathion |
| triazole organothiophosphate insecticides | isazofos |
| | triazophos |
| phenyl organothiophosphate insecticides | azothoate |
| | bromophos |
| | bromophos-ethyl |
| | carbophenothion |
| | chlorthiophos |
| | cyanophos |
| | cythioate |
| | dicapthon |
| | dichlofenthion |
| | etaphos |
| | famphur |
| | fenchlorphos |
| | fenitrothion |
| | fensulfothion |
| | fenthion |
| | fenthion-ethyl |
| | heterophos |
| | jodfenphos |
| | mesulfenfos |
| | parathion |
| | parathion-methyl |
| | phenkapton |
| | phosnichlor |
| | profenofos |
| | prothiofos |
| | sulprofos |
| | temephos |
| | trichlormetaphos-3 |
| | trifenofos |
| | xiaochongliulin |

TABLE B-continued

Exemplary list of pesticides

| Category | Compounds |
|---|---|
| phosphonate insecticides | butonate |
|  | trichlorfon |
| phosphonothioate insecticides | mecarphon |
| phenyl ethylphosphonothioate insecticides | fonofos |
|  | trichloronat |
| phenyl phenylphosphonothioate insecticides | cyanofenphos |
|  | EPN |
|  | leptophos |
| phosphoramidate insecticides | crufomate |
|  | fenamiphos |
|  | fosthietan |
|  | mephosfolan |
|  | phosfolan |
|  | phosfolan-methyl |
|  | pirimetaphos |
| phosphoramidothioate insecticides | acephate |
|  | chloramine phosphorus |
|  | isocarbophos |
|  | isofenphos |
|  | isofenphos-methyl |
|  | methamidophos |
|  | phosglycin |
|  | propetamphos |
| phosphorodiamide insecticides | dimefox |
|  | mazidox |
|  | mipafox |
|  | schradan |
| oxadiazine insecticides | indoxacarb |
| oxadiazolone insecticides | metoxadiazone |
| phthalimide insecticides | dialifos |
|  | phosmet |
|  | tetramethrin |
| physical insecticides | maltodextrin |
| desiccant insecticides | boric acid |
|  | diatomaceous earth |
|  | silica gel |
| pyrazole insecticides | chlorantraniliprole |
|  | cyantraniliprole |
|  | cyclaniliprole |
|  | dimetilan |
|  | isolan |
|  | tebufenpyrad |
|  | tetraniliprole |
|  | tolfenpyrad |
| phenylpyrazole insecticides | acetoprole |
|  | ethiprole |
|  | fipronil |
|  | flufiprole |
|  | pyraclofos |
|  | pyrafluprole |
|  | pyriprole |
|  | pyrolan |
|  | vaniliprole |
| pyrethroid insecticides |  |
| pyrethroid ester insecticides | acrinathrin |
|  | allethrin |
|  | bioallethrin |
|  | esdepallethrine |
|  | barthrin |
|  | bifenthrin |
|  | kappa-bifenthrin |
|  | bioethanomethrin |
|  | brofenvalerate |
|  | brofluthrinate |
|  | bromethrin |
|  | butethrin |
|  | chlorempenthrin |
|  | cyclethrin |
|  | cycloprothrin |
|  | cyfluthrin |
|  | beta-cyfluthrin |
|  | cyhalothrin |
|  | gamma-cyhalothrin |
|  | lambda-cyhalothrin |
|  | cypermethrin |
|  | alpha-cypermethrin |
|  | beta-cypermethrin |
|  | theta-cypermethrin |
|  | zeta-cypermethrin |
|  | cyphenothrin |
|  | deltamethrin |
|  | dimefluthrin |
|  | dimethrin |
|  | empenthrin |
|  | d-fanshiluquebingjuzhi |
|  | chloroprallethrin |
|  | fenfluthrin |
|  | fenpirithrin |
|  | fenpropathrin |
|  | fenvalerate |
|  | esfenvalerate |
|  | flucythrinate |
|  | fluvalinate |
|  | tau-fluvalinate |
|  | furamethrin |
|  | furethrin |
|  | heptafluthrin |
|  | imiprothrin |
|  | japothrins |
|  | kadethrin |
|  | methothrin |
|  | metofluthrin |
|  | epsilon-metofluthrin |
|  | momfluorothrin |
|  | epsilon-momfluorothrin |
|  | pentmethrin |
|  | permethrin |
|  | biopermethrin |
|  | transpermethrin |
|  | phenothrin |
|  | prallethrin |
|  | profluthrin |
|  | proparthrin |
|  | pyresmethrin |
|  | renofluthrin |
|  | meperfluthrin |
|  | resmethrin |
|  | bioresmethrin |
|  | cismethrin |
|  | tefluthrin |
|  | kappa-tefluthrin |
|  | terallethrin |
|  | tetramethrin |
|  | tetramethylfluthrin |
|  | tralocythrin |
|  | tralomethrin |
|  | transfluthrin |
|  | valerate |
| pyrethroid ether insecticides | etofenprox |
|  | flufenprox |
|  | halfenprox |
|  | protrifenbute |
|  | silafluofen |
| pyrethroid oxime insecticides | sulfoxime |
|  | thiofluoximate |
| pyrimidinamine insecticides | flufenerim |
|  | pyrimidifen |
| pyrrole insecticides | chlorfenapyr |
| quaternary ammonium insecticides | sanguinarine |
| sulfoximine insecticides | sulfoxaflor |
| tetramic acid insecticides | spirotetramat |
| tetronic acid insecticides | spiromesifen |
| thiazole insecticides | clothianidin |
|  | imidaclothiz |
|  | thiamethoxam |
|  | thiapronil |
| thiazolidine insecticides | tazimcarb |
|  | thiacloprid |
| thiourea insecticides | diafenthiuron |
| urea insecticides | flucofuron |
|  | sulcofuron |

TABLE B-continued

Exemplary list of pesticides

| Category | Compounds |
|---|---|
| zwitterionic insecticides | dicloromezotiaz |
| | triflumezopyrim |
| unclassified insecticides | afidopyropen |
| | afoxolaner |
| | allosamidin |
| | closantel |
| | copper naphthenate |
| | crotamiton |
| | EXD |
| | fenazaflor |
| | fenoxacrim |
| | flometoquin |
| | flonicamid |
| | fluhexafon |
| | flupyradifurone |
| | fluralaner |
| | fluxametamide |
| | hydramethylnon |
| | isoprothiolane |
| | jiahuangchongzong |
| | malonoben |
| | metaflumizone |
| | nifluridide |
| | plifenate |
| | pyridaben |
| | pyridalyl |
| | pyrifluquinazon |
| | rafoxanide |
| | thuringiensin |
| | triarathene |
| | triazamate |
| ACARICIDES | |
| botanical acaricides | carvacrol |
| | sanguinarine |
| bridged diphenyl acaricides | azobenzene |
| | benzoximate |
| | benzyl benzoate |
| | bromopropylate |
| | chlorbenside |
| | chlorfenethol |
| | chlorfenson |
| | chlorfensulphide |
| | chlorobenzilate |
| | chloropropylate |
| | cyflumetofen |
| | DDT |
| | dicofol |
| | diphenyl sulfone |
| | dofenapyn |
| | fenson |
| | fentrifanil |
| | fluorbenside |
| | genit |
| | hexachlorophene |
| | phenproxide |
| | proclonol |
| | tetradifon |
| | tetrasul |
| carbamate acaricides | benomyl |
| | carbanolate |
| | carbaryl |
| | carbofuran |
| | methiocarb |
| | metolcarb |
| | promacyl |
| | propoxur |
| oxime carbamate acaricides | aldicarb |
| | butocarboxim |
| | oxamyl |
| | thiocarboxime |
| | thiofanox |
| carbazate acaricides | bifenazate |
| dinitrophenol acaricides | binapacryl |
| | dinex |
| | dinobuton |
| | dinocap |
| | dinocap-4 |
| | dinocap-6 |
| | dinocton |
| | dinopenton |
| | dinosulfon |
| | dinoterbon |
| | DNOC |
| formamidine acaricides | amitraz |
| | chlordimeform |
| | chloromebuform |
| | formetanate |
| | formparanate |
| | medimeform |
| | semi amitraz |
| macrocyclic lactone acaricides | tetranactin |
| avermectin acaricides | abamectin |
| | doramectin |
| | eprinomectin |
| | ivermectin |
| | selamectin |
| milbemycin acaricides | milbemectin |
| | milbemycin oxime |
| | moxidectin |
| mite growth regulators | clofentezine |
| | cyromazine |
| | diflovidazin |
| | dofenapyn |
| | fluazuron |
| | flubenzimine |
| | flucycloxuron |
| | flufenoxuron |
| | hexythiazox |
| organochlorine acaricides | bromocyclen |
| | camphechlor |
| | DDT |
| | dienochlor |
| | endosulfan |
| | lindane |
| organophosphorus acaricides | |
| organophosphate acaricides | chlorfenvinphos |
| | crotoxyphos |
| | dichlorvos |
| | heptenophos |
| | mevinphos |
| | monocrotophos |
| | naled |
| | TEPP |
| | tetrachlorvinphos |
| organothiophosphate acaricides | amidithion |
| | amiton |
| | azinphos-ethyl |
| | azinphos-methyl |
| | azothoate |
| | benoxafos |
| | bromophos |
| | bromophos-ethyl |
| | carbophenothion |
| | chlorpyrifos |
| | chlorthiophos |
| | coumaphos |
| | cyanthoate |
| | demeton |
| | demeton-O |
| | demeton-S |
| | demeton-methyl |
| | demeton-O-methyl |
| | demeton-S-methyl |
| | demeton-S-methylsulphon |
| | dialifos |
| | diazinon |
| | dimethoate |
| | dioxathion |
| | disulfoton |
| | endothion |

TABLE B-continued

Exemplary list of pesticides

| Category | Compounds |
|---|---|
| | ethion |
| | ethoate-methyl |
| | formothion |
| | malathion |
| | mecarbam |
| | methacrifos |
| | omethoate |
| | oxydeprofos |
| | oxydisulfoton |
| | parathion |
| | phenkapton |
| | phorate |
| | phosalone |
| | phosmet |
| | phostin |
| | phoxim |
| | pirimiphos-methyl |
| | prothidathion |
| | prothoate |
| | pyrimitate |
| | quinalphos |
| | quintiofos |
| | sophamide |
| | sulfotep |
| | thiometon |
| | triazophos |
| | trifenofos |
| | vamidothion |
| phosphonate acaricides | trichlorfon |
| phosphoramidothioate acaricides | isocarbophos |
| | methamidophos |
| | propetamphos |
| phosphorodiamide acaricides | dimefox |
| | mipafox |
| | schradan |
| organotin acaricides | azocyclotin |
| | cyhexatin |
| | fenbutatin oxide |
| | phostin |
| phenylsulfamide acaricides | dichlofluanid |
| phthalimide acaricides | dialifos |
| | phosmet |
| pyrazole acaricides | cyenopyrafen |
| | fenpyroximate |
| | pyflubumide |
| | tebufenpyrad |
| phenylpyrazole acaricides | acetoprole |
| | fipronil |
| | vaniliprole |
| pyrethroid acaricides | |
| pyrethroid ester acaricides | acrinathrin |
| | bifenthrin |
| | brofluthrinate |
| | cyhalothrin |
| | cypermethrin |
| | alpha-cypermethrin |
| | fenpropathrin |
| | fenvalerate |
| | flucythrinate |
| | flumethrin |
| | fluvalinate |
| | tau-fluvalinate |
| | permethrin |
| pyrethroid ether acaricides | halfenprox |
| pyrimidinamine acaricides | pyrimidifen |
| pyrrole acaricides | chlorfenapyr |
| quaternary ammonium acaricides | sanguinarine |
| quinoxaline acaricides | chinomethionat |
| | thioquinox |
| strobilurin acaricides | |
| methoxyacrylate strobilurin acaricides | bifujunzhi |
| | fluacrypyrim |
| | flufenoxystrobin |
| | pyriminostrobin |

TABLE B-continued

Exemplary list of pesticides

| Category | Compounds |
|---|---|
| sulfite ester acaricides | aramite |
| | propargite |
| tetronic acid acaricides | spirodiclofen |
| tetrazine acaricides | clofentezine |
| | diflovidazin |
| thiazolidine acaricides | flubenzimine |
| | hexythiazox |
| thiocarbamate acaricides | fenothiocarb |
| thiourea acaricides | chloromethiuron |
| | diafenthiuron |
| unclassified acaricides | acequinocyl |
| | afoxolaner |
| | amidoflumet |
| | arsenous oxide |
| | clenpirin |
| | closantel |
| | crotamiton |
| | cycloprate |
| | cymiazole |
| | disulfiram |
| | etoxazole |
| | fenazaflor |
| | fenazaquin |
| | fluenetil |
| | fluralaner |
| | mesulfen |
| | MNAF |
| | nifluridide |
| | nikkomycins |
| | pyridaben |
| | sulfiram |
| | sulfluramid |
| | sulfur |
| | thuringiensin |
| | triarathene |
| CHEMOSTERILANTS | |
| | apholate |
| | bisazir |
| | busulfan |
| | diflubenzuron |
| | dimatif |
| | hemel |
| | hempa |
| | metepa |
| | methiotepa |
| | methyl apholate |
| | morzid |
| | penfluron |
| | tepa |
| | thiohempa |
| | thiotepa |
| | tretamine |
| | uredepa |
| INSECT REPELLENTS | |
| | acrep |
| | butopyronoxyl |
| | camphor |
| | d-camphor |
| | carboxide |
| | dibutyl phthalate |
| | diethyltoluamide |
| | dimethyl carbate |
| | dimethyl phthalate |
| | dibutyl succinate |
| | ethohexadiol |
| | hexamide |
| | icaridin |
| | methoquin-butyl |
| | methylneodecanamide |
| | 2-(octylthio)ethanol |
| | oxamate |
| | quwenzhi |

TABLE B-continued

Exemplary list of pesticides

| Category | Compounds |
|---|---|
| | quyingding |
| | rebemide |
| | zengxiaoan |
| NEMATICIDES | |
| avermectin nematicides | abamectin |
| botanical nematicides | carvacrol |
| carbamate nematicides | benomyl |
| | carbofuran |
| | carbosulfan |
| | cloethocarb |
| oxime carbamate nematicides | alanycarb |
| | aldicarb |
| | aldoxycarb |
| | oxamyl |
| | tirpate |
| fumigant nematicides | carbon disulfide |
| | cyanogen |
| | 1,2-dichloropropane |
| | 1,3-dichloropropene |
| | dithioether |
| | methyl bromide |
| | methyl iodide |
| | sodium tetrathiocarbonate |
| organophosphorus nematicides | |
| organophosphate nematicides | diamidafos |
| | fenamiphos |
| | fosthietan |
| | phosphamidon |
| organothiophosphate nematicides | cadusafos |
| | chlorpyrifos |
| | dichlofenthion |
| | dimethoate |
| | ethoprophos |
| | fensulfothion |
| | fosthiazate |
| | heterophos |
| | isamidofos |
| | isazofos |
| | phorate |
| | phosphocarb |
| | terbufos |
| | thionazin |
| | triazophos |
| phosphonothioate nematicides | imicyafos |
| | mecarphon |
| unclassified nematicides | acetoprole |
| | benclothiaz |
| | chloropicrin |
| | dazomet |
| | DBCP |
| | DCIP |
| | fluazaindolizine |
| | fluensulfone |
| | furfural |
| | metam |
| | methyl isothiocyanate |
| | tioxazafen |
| | xylenols |

From www.alanwood.net

Insecticides also include synergists or activators that are not in themselves considered toxic or insecticidal, but are materials used with insecticides to synergize or enhance the activity of the insecticides. Synergists or activators include piperonyl butoxide. Insecticides can be biorational, or can also be known as biopesticides or biological pesticides. Biorational refers to any substance of natural origin (or man-made substances resembling those of natural origin) that has a detrimental or lethal effect on specific target pest(s), e.g., insects, weeds, plant diseases (including nematodes), and vertebrate pests, possess a unique mode of action, are non-toxic to man, domestic plants and animals, and have little or no adverse effects on wildlife and the environment. Biorational insecticides (or biopesticides or biological pesticides) can be grouped as: (1) biochemicals (hormones, enzymes, pheromones and natural agents, such as insect and plant growth regulators), (2) microbial (viruses, bacteria, fungi, protozoa, and nematodes), or (3) Plant-Incorporated protectants (PIPs)—primarily transgenic plants, e.g., Bt corn.

As used herein, the term "locus" (plural: "loci") refers to any site that has been defined genetically. A locus may be a gene, or part of a gene, or a DNA sequence that has some regulatory role, and may be occupied by different sequences.

As used herein, the term "locus" can also refer to a physical location, position, point or place. As an example, applying a pheromone to a locus comprises applying the pheromone in a location, position, point or place in or near an agricultural area.

As used herein, the term "allele" or "alleles" means any of one or more alternative forms of a gene, all of which alleles relate to at least one trait or characteristic. In a diploid cell, the two alleles of a given gene occupy corresponding loci on a pair of homologous chromosomes. Alleles are considered identical when they express a similar phenotype. For example, an "R" allele can be a form of a given gene in a pest that confers resistance to an insecticidal trait or chemical insecticide. An "S" allele can be a form of the same given gene in a pest that confers susceptibility to an insecticidal trait or chemical insecticide.

As used herein, the term "heterozygote" refers to a diploid or polyploid individual cell, plant or pest having different alleles (forms of a given gene) present at least at one locus.

As used herein, the term "heterozygous" refers to the presence of different alleles (forms of a given gene) at a particular gene locus. For example, a pest heterozygous for resistance to an insecticidal trait or chemical insecticide can be "RS" or "SR", that is, comprising both a resistant "R" allele and a susceptible "S" allele.

As used herein, the term "homozygote" refers to an individual cell, plant or pest having the same alleles at one or more loci.

As used herein, the term "homozygous" refers to the presence of identical alleles at one or more loci in homologous chromosomal segments. For example, a pest homozygous for resistance to an insecticidal trait or chemical insecticide comprises "RR" alleles, while a pest homozygous for susceptibility to an insecticidal trait or chemical insecticide comprises "SS" alleles.

As used herein, the term "high-dose" refers to an insecticide (chemical or transgenic) concentration that is sufficiently high such that the resistance allele is rendered recessive. That is, only the homozygote RR members of the population are resistant.

As used herein, the term "low-dose" refers to an insecticide (chemical or transgenic) concentration that is reasonably low such that the resistance allele is rendered dominant. That is, both RS and SR heterozygotes are resistant.

As used herein, the term "fitness" refers to a property of the individual and comprises the ability of an individual to survive and reproduce in a given environment.

As used herein, the phrase "fitness differential under selection pressure by the insecticide" refers to the fitness advantage of resistant phenotypes over susceptible phenotypes when both are exposed to the insecticide (Andow 2008).

As used herein, the phrase "fitness cost of resistance (in the absence of the insecticide)" refers to the fitness advantage of susceptible phenotypes over resistant phenotypes in the absence of the insecticide.

As used herein, the phrase "preemptive resistance management strategies" refers to strategies that attempt to avoid or delay a field resistance event by keeping the numbers of resistant members of a population sufficiently low.

As used herein, the phrase "responsive resistance management strategies" refers to strategies that react to the occurrence of control failures from resistance. Because resistance almost always comes with a fitness cost, it is a given that in the absence of a selection pressure, an insecticide can be rescued as the population will tend to revert to susceptibility. The present invention allows an insecticide to be rescued while still using that insecticide in a responsive strategy.

As used herein, "Integrated Pest Management" or "IPM" refers to a comprehensive approach to pest control that uses combined means to reduce the status of pests to tolerable levels while maintaining a quality environment.

As used herein, "Integrated Resistance Management" or "IRM" refers to using strategies that minimize the selection for resistance to any one type of insecticide or acaricide. The objective of IRM is to prevent or delay development of resistance to insecticides, or to help regain susceptibility in insect pest populations in which resistance has already arisen. In one embodiment, the goal of IRM is to delay or prevent the occurrence of control failures from resistance by delaying or preventing the evolution of resistance. Prevention requires active management or evolutionary selection pressures against resistance alleles in a population. IRM strategies can be broadly characterized as either responsive or preemptive. Responsive strategies react to the occurrence of control failures from resistance, while preemptive strategies attempt to avoid or delay resistance before a field failure occurs. Understanding the mode of action (MoA) of an insecticide or acaricide is key to having an effective management program. Insecticide applications are often arranged into MoA spray windows or blocks that are defined by the stage of crop development, the biology of the pest(s) of concern and local conditions where IRM is implemented. Several sprays of a compound may be possible within each spray window but it is generally essential to ensure that successive generations of the pest are not treated with compounds from the same MoA group. Understanding the life cycle of the pest is important.

As used herein, "mode of action" or "MoA" refers to the basis for which a given insecticide or acaricide operates to injure or kill a pest. Compounds within a specific chemical group usually share a common target site within the pest, and thus share a common Mode of Action. Orthogonal MoAs share little or no overlap in target sites.

As used herein, "kairomone" refers to a compound that is an interspecific chemical message that benefits the receiving species and disadvantages the emitting species. In one embodiment, kairomones can act between two insect species for location of host insects by parasitoids. In another embodiment, kairomones can act between an insect and a plant for location of host plants by herbivores or for location of herbivore-damaged plants by parasitoids.

As used herein, "mating disruption" refers to a pest management technique or tactic that involves the use of sex pheromones to disrupt the reproductive cycle of insects. For example, mating disruption exploits the male cotton bollworm's natural response to follow the pheromone plume by introducing pheromone unconnected to a female cotton bollworm into the insects' habitat. The general effect of mating disruption may possibly be to impair the male cotton bollworm's normal semiochemically-mediated behavior by masking the natural pheromone plumes, causing the males to follow "false pheromone trails" at the expense of finding mates, and affecting the males' ability to respond to "calling" females. Mating disruption may alternatively raise the response threshold or saturate the male's senses with the high pheromone concentration, so that the male can no longer sense the small amount of pheromone released by the female. Consequently, the male population experiences a reduced probability of successfully locating and mating with female cotton bollworms.

As used herein, "percentage of mating disruption", "percent mating disruption" or "% mating disruption" refers to market penetration or extent of adoption of mating disruption practice.

As used herein, "mating disruption efficacy" or "efficacy of mating disruption" refers to the proportion of the females that would normally mate on a given night due to implementation of mating disruption. Mating disruption efficacy can be expressed as (100%—% of females that mate per night). Thus, for example, if the mating disruption efficacy was 90%, only 10% of the females would mate on the first night. On the next night, 10% of the 90% that didn't mate on the first night would mate, and so on.

As used herein, "pest" or "pests" refer to organisms possessing characteristics that are considered damaging or unwanted. Pests can include insects, animals, plants, molds, fungi, bacteria and viruses. For example, the Grape Berry Moth (GBM) (*Endopiza viteana* Clemens) is one of the principal insect pests of grape. As another example, the primary pest of cherry is a fruit fly, but several Lepidoptera, including obliquebanded leafroller (OBLR) (*Choristoneura rosacean* Harris), can cause significant crop loss as well. As another example, the larvae of the fall armyworm moth (*Spodoptera frugiperda*, part of the order Lepidoptera) eat grasses and small grain crops. As a further example, moths such as the cotton bollworm and the corn earworm in the Noctuidae family (*Helicoverpa armigera* and *Helicoverpa zea*) are major pests for crops such as corn, tomatoes and soybean. As another example, mites such as *Tetranychus urticae* attack a wide range of plants including peppers, tomatoes, potatoes, beans, corn, *cannabis* and strawberries. As a further example, the navel orangeworm (*Amyelois transitella*) is a moth of the Pyralidae family native to the southwestern United States and Mexico and is a commercial pest to a number of crops including walnut trees (*Juglans regia*), common fig (*Ficus carica*), almond trees (*Prunus dulcis*), and pistachio trees (*Pistacia vera*). As another example, the *Citrus* leafminer (*Phyllocnistis citrella*), or CLM, is a moth of the Gracillariidae family found all over the world. The CLM larvae infest *Citrus* species such as bael tree (*Aegle marmelos*), Atalantia tree species, calamondin (*Citrofortunella microcarpa*), lemon tree (*Citrus limon*), grapefruit (*Citrus paradisi*), pomelo (*Citrus maxima*), kumquat (*Fortunella margarita*), Murraya *paniculata* ornamental tree or hedge, and trifoliate orange (*Poncirus* trifoliate), by mining their leaves, creating epidermal corridors with well-marked central frass lines. Effective control of these and other pests is a primary goal of agriculture.

As used herein, "growth rate" of an organism refers to the number of female offspring that survive to adulthood per generation under natural conditions and relatively small population levels. For example, if females produce on average 20 eggs/female, and only 10% survive to become adults, and half of the eggs are males, then that population has a growth rate of 1.0 and does not grow over time. If 20% survive, then the growth rate would be 2. An increase in the growth rate could be due to an increase in the birth rate and no decrease in mortality. "Extreme Reproductive Growth Rate" may arise when the growth rate approaches 100 fold per generation. This may result from about a 10-fold increase in fecundity with no increase in growth rate. In this case, Malthusian principles may apply and something must hold the population in check. Transgenic insecticidal traits, pesticides, and/or mating disruption may all hold the population in check, but with a growth rate this high, much of the mortality is due to density dependence, particularly in refuges (where the populations are the largest). In one example, cannibalism could be one common form of density-dependent mortality in *Spodoptera frugiperda* larvae. In one embodiment, density-dependent mortality decreases the population of susceptible insects in refuges, and this results in the rapid evolution of resistance. *S. frugiperda* mortality rates for egg and larvae have been studied by Varella et al. (2015) and Murua and Virla (2004) (Varella et al. Mortality Dynamics of *Spodoptera frugiperda* (Lepidoptera: Noctuidae) Immatures in Maize. PloS one. 10: e0130437 (2015); Murúa and Virla. Population parameters of *Spodoptera frugiperda* (Smith) (Lep.: Noctuidae) fed on corn and two predominant grasess in Tucuman (Argentina). Acta zoológica mexicana. 20: 199-210 (2004)). As seen in FIG. 10, a balanced reproductive growth rate can be about 4.8 fold per generation, and a rapid reproductive growth rate can be about 9.7 fold per generation.

As used herein, "pest control" refers to inhibition of pest development (including mortality, feeding reduction, and/or mating disruption).

As used herein, "pesticide" refers to a compound or substance that repels, incapacitates or kills a pest, such as an insect, weed or pathogen. Thus pesticides can encompass, but are not limited to, acaricides, algicides, antifeedants, avicides, bactericides, bird repellents, chemosterilants, fungicides, herbicide safeners, herbicides, insect repellents, insecticides, mammal repellents, mating disrupters, molluscicides, nematicides, plant activators, plant growth regulators, rodenticides, synergists and virucides.

As used herein, "acaricide" refers to pesticides that kill members of the arachnid subclass Acari, which includes ticks and mites.

As used herein, "arachnid" refers to a class of joint-legged invertebrate animals, also known as arthropods, in the subphylum Chelicerata. Arachnids have eight legs as opposed to the six legs found on insects. Also in contrast to insects, arachnids do not have antennae or wings. Arachnids also have two further pairs of appendages that are adapted for feeding, defense, and sensory perception. The first pair, the chelicerae, serves in feeding and defense. The second pair of appendages, the pedipalps, has been adapted for feeding, locomotion, and/or reproductive functions. The body is organized into the cephalothorax, a fusion of the head and thorax, and the abdomen. There are over 100,000 species of arachnids and include spiders, scorpions, harvestmen, ticks, mites and solifuges.

As used herein, "mite" refers to a small arthropod belonging to the subclass Acari (or Acarina) and the class Arachnida. About 48, 200 species of mites have been described. Mites actively engage in the fragmentation and mixing of organic matter in soil ecosystems. Mites occur in many habitats and eat a wide variety of material including living and dead plant and fungal matter, lichens and carrion. Many mites are parasitic on plants and animals. For example, mites of the family Pyroglyphidae, or nest mites, live primarily in the nests of birds and animals and consume blood, skin and keratin. Dust mites, which feed on dead skin and hair shed from humans, evolved from these parasitic ancestors. Examples of parasitic mites that infest insects include *Varroa destructor*, which attaches to the body of the honey bee, and *Acarapis woodi* (family Tarsonemidae), which lives in the tracheae of honey bees. Mites that are considered plant pests include spider mites (family Tetranychidae), thread-footed mites (family Tarsonemidae), and the gall mites (family Eriophyidae). Among the species that attack animals are members of the sarcoptic mange mites (family Sarcoptidae), which burrow under the skin. *Demodex* mites (family Demodicidae) are parasites that live in or near the hair follicles of mammals, including humans.

As used herein, the terms "pheromone" or "natural pheromone," when used in reference to an insect pheromone, is intended to mean the volatile chemical or particular volatile chemical blend having a chemical structure corresponding to the chemical structure of a pheromone that is released by a particular insect for the function of chemical communication within the species. For example, a female moth releases pheromones, which are detected by sensors on the antennae of a male moth and enable the male moth to locate the female moth for mating. As another example, the pheromone blend for *Spodoptera frugiperda* comprises (Z)-9-tetradecenyl acetate (Z9-14Ac): (Z)-11-hexadecenyl acetate (Z11-16Ac) or (Z)-9-tetradecenyl acetate (Z9-14Ac): (Z)-11-hexadecenyl acetate (Z11-16Ac): (Z)-7-dodecenyl acetate (Z7-12Ac). In one embodiment, the ratio of (Z)-9-tetradecenyl acetate (Z9-14Ac): (Z)-11-hexadecenyl acetate (Z11-16Ac) pheromone blend is about 87:13. In another embodiment, the ratio of (Z)-9-tetradecenyl acetate (Z9-14Ac): (Z)-11-hexadecenyl acetate (Z11-16Ac): (Z)-7-dodecenyl acetate (Z7-12Ac) pheromone blend is about 87:12:1. As a further example, the pheromone blend for *Helicoverpa zea* comprises (Z)-11-hexadecenal (Z11-16Ald): (Z)-9-hexadecenal (Z9-16:Ald). In one embodiment, the ratio of (Z)-11-hexadecenal (Z11-16Ald): (Z)-9-hexadecenal (Z9-16:Ald) pheromone blend is about 97:3. As used herein, the term "non-natural" or "non-naturally occurring," when used in reference to a synthetic pheromone, is intended to mean a molecule that is not produced by the particular insect species whose behavior is modified using said molecule. A list of representative pheromones is given in Table 7.

As used herein, "high coverage" of a field with one or more pheromone refers to application of one or more pheromones in a field plot such that about the entire field is treated with the pheromone.

As used herein, a "high concentration" of pheromone refers to a concentration of pheromone sufficient to disrupt mating of pests.

As used herein, a "low concentration" of pheromone refers to a concentration of pheromone that is used to attract pests to an area with the purpose of influencing the dispersal patterns of the pests to affect where mating occurs.

As used herein, "pheromonostatic peptide" or "PSP" refer to a peptide found in the seminal fluid of male moths that cause a depletion of sex pheromone in the female moth after mating.

As used herein, "pheromone biosynthesis-activating neuropeptide" or "PBAN" refer to a neurohormone produced by a cephalic organ, the subesophageal ganglion. PBAN stimulates sex pheromone biosynthesis in the pheromone gland via an influx of extracellular $Ca^{2+}$.

As used herein, "plant incorporated" refers to being in or a part of the plant by genetic modification. In one embodiment, a plant incorporated insecticide comprises an insecticide that is produced by a plant which has been engineered with a recombinant transgene coding for the insecticide. In a particular embodiment, a plant can be engineered to express a crystal protein (cry protein) from the spore forming bacterium *Bacillus thuringiensis* (Bt). The cry protein is toxic to many species of insects. In another embodiment, a plant can be engineered to express a nucleic acid-based insecticide, which when ingested by the insect, causes downregulation of a target gene in the insect essential for growth, reproduction or survival (see, e.g., U.S. Pat. No. 8,759,306).

As used herein, "plant species" refers to a group of plants belonging to various officially named plant species that display at least some sexual compatibility amongst themselves.

As used herein, "recombinant" broadly describes various technologies whereby genes can be cloned, DNA can be sequenced, and protein products can be produced. As used herein, the term also describes proteins that have been produced following the transfer of genes into the cells of plant host systems.

As used herein, "semiochemicals" refer to chemicals (scents, odors, tastes, pheromones, pheromone-like compounds, or other chemosensory compounds) that mediate interactions between organisms. These chemicals can modify behavior of the organisms.

As used herein, "synthetic pheromone" or "synthetic pheromone composition" refers to a chemical composition of one or more specific isolated pheromone compounds. Typically, such compounds are produced synthetically and mimic the response of natural pheromones. In some embodiments, the behavioral response to the pheromone is attraction. In other embodiments, the species to be influenced is repelled by the pheromone.

As used herein, the term "synthetically derived" when used in reference to a chemical compound is intended to indicate that the referenced chemical compound is transformed from starting material to product by human intervention. In some embodiments, a synthetically derived chemical compound can have a chemical structure corresponding to an insect pheromone which is produced by an insect species.

As used herein, the term "synergistic" or "synergistic effect" obtained by the taught methods can be quantified according to Colby's formula (i.e. $(E)=X+Y-(X*Y/100)$). See Colby, R. S., "Calculating Synergistic and Antagonistic Responses of Herbicide Combinations," 1967 Weeds, vol. 15, pp. 20-22, incorporated herein by reference in its entirety. Thus, by "synergistic" is intended a component which, by virtue of its presence, increases the desired effect by more than an additive amount.

As used herein, "transgene" refers to a gene that will be or is inserted into a host genome, comprising a protein coding region to express a protein or a nucleic acid region to downregulate a target gene in the host.

As used herein, "transgenic plant" refers to a genetically modified plant which contains at least one transgene.

As used herein, "transgenic insecticidal trait" refers to a trait exhibited by a plant that has been genetically engineered to express a nucleic acid or polypeptide that is detrimental to one or more pests. In one embodiment, the trait comprises the expression of vegetative insecticidal proteins (VIPs) from *Bacillus thuringiensis*, lectins and proteinase inhibitors from plants, terpenoids, cholesterol oxidases from *Streptomyces* spp., insect chitinases and fungal chitinolytic enzymes, bacterial insecticidal proteins and early recognition resistance genes. In another embodiment, the trait comprises the expression of a *Bacillus thuringiensis* protein that is toxic to a pest. In one embodiment, the Bt protein is a Cry protein (crystal protein). Bt crops include Bt corn, Bt cotton and Bt soy. Bt toxins can be from the Cry family (see, for example, Crickmore et al., 1998, Microbiol. Mol. Biol. Rev. 62: 807-812), which are particularly effective against Lepidoptera, Coleoptera and Diptera. Examples of genes coding for Bt proteins include: CrylA, crylAa1, crylAa2, crylAa3, crylAa4, crylAa5, crylAa6, crylAa7, crylAa8, crylAa9, crylAa10, crylAa11, crylAb1, crylAb2, crylAb3, crylAb4, crylAb5, crylAb6, crylAb7, crylAb8, crylAb9, crylAb10, crylAb11, crylAb12, crylAb13, crylAb14, crylAc1, crylAc2, crylAc3, crylAc4, crylAc5, crylAc6, crylAc7, crylAc8, crylAc9, crylAc10, crylAc11, crylAc12, crylAc13, crylAd1, crylAd2, crylAe1, crylAf1, crylAg1, crylB, crylBa1, crylBa2, crylBb1, crylBc1, crylBd1, crylBe1, crylC, crylCa1, crylCa2, crylCa3, crylCa4, crylCa5, crylCa6, crylCa7, crylCb1, crylCb2, crylD, crylDa1, crylDa2, crylDb1, crylE, crylEa1, crylEa2, crylEa3, crylEa4, crylEa5, crylEa6, crylEb1, crylF, crylFa1, crylFa2, crylFb1, crylFb2, crylFb3, crylFb4, crylG, crylGa1, crylGa2, crylGb1, crylGb2, crylH, crylHa1, crylHb1, cryll, cryllal, cryIIa2, cryIIa3, cryIIa4, cryIIa5, cryIIa6, cryIIb1, cryIIc1, cryIId1, cryIIe1, cryII-like, crylJ, crylJa1, crylJb1, crylJc1, crylKa1, cryl-like, cry2A, cry2Aa1, cry2Aa2, cry2Aa3, cry2Aa4, cry2Aa5, cry2Aa6, cry2Aa7, cry2Aa8, cry2Aa9, cry2Ab1, cry2Ab2, cry2Ab3, cry2Ac1, cry2Ac2, cry2Ad1, cry3A, cry3Aa1, cry3Aa2, cry3Aa3, cry3Aa4, cry3Aa5, cry3Aa6, cry3Aa7, cry3B, cry3Ba1, cry3Ba2, cry3Bb1, cry3Bb2, cry3Bb3, cry3Ca1, cry4Aa1, cry4Aa2, cry4Ba1, cry4Ba2, cry4Ba3, cry4Ba4, cry5Aa1, cry5Ab1, cry5Ac1, cry5Ba1, cry6Aa1, cry6Ba1, cry7Aa1, cry7Ab1, cry7Ab2, cry8Aa1, cry8Ba1, cry8Ca1, cry9Aa1, cry9Aa2, cry9Ba1, cry9Ca1, cry9Da1, cry9Da2, cry9Ea1, cry9 like, cry10Aa1, cry10Aa2, cryllAa1, cryllAa2, cryllBa1, cryllBb1, cry12Aa1, cry13Aa1, cry14Aa1, cry15Aa1, cry16Aa1, cry17Aa1, cry18Aa1, cry18Ba1, cry18Ca1, cry19Aa1, cry19Ba1, cry20Aa1, cry21al, cry21Aa2, cry22Aa1, cry23Aa1, cry24Aa1, cry25Aa1, cry26Aa1, cry27Aa1, cry28Aa1, cry28Aa2, cry29Aa1, cry30Aa1, cry31Aa1, cry34, cry35, cyt1Aa1, cyt1Aa2, cyt1Aa3, cyt1Aa4, cyt1Ab1, cyt1Ba1, cyt2Aa1, cyt2Ba1, cyt2Ba2, cyt2Ba3, cyt2Ba4, cyt2Ba5, cyt2Ba6, cyt2Ba7, cyt2Ba8, cyt2Bb1, VIP3A.

As used herein, "genetic trait" refers to any genetically determined characteristic. In one embodiment, a genetic trait is amenable to segregation analysis. Genetic traits may comprise traits conferred by endogenous alleles in an organism, or may be conferred by introduction of one or more heterologous genes into an organism. An example of a genetic trait in a plant is resistance of the plant to one or more pests due to endogenous alleles or exogenous genes introduced for resistance. In one embodiment, a transgenic insecticidal trait is a genetic trait.

As used herein, "volatile compounds" refers to organic compounds or materials that are vaporizable at ambient temperature and atmospheric pressure without the addition of energy by some external source. Any suitable volatile compound in any form may be used. Volatile liquids composed of a single volatile compound are preferred for large-scale application, but volatile solids can also be used for some specialized applications. Liquids and solids suitable for use may have more than one volatile component, and may contain non-volatile components. The volatile compounds may be commercially pure or blended and, furthermore, may be obtained from natural or synthetic sources.

As used herein, the term "plant damage" refers to any destruction or loss in value, usefulness, or ability resulting from an action or event associated with a pest such as an insect. Types of plant damage include, but are not limited to, the following. Feeding damage occurs as a result of direct feeding on above-ground and/or below-ground plant parts. Holes or notches in foliage and other plant parts, leaf skeletonizing (removal of tissue between the leaf veins), leaf defoliation, cutting plants off at the soil surface, or consumption of roots can all occur from pests with chewing mouthparts. Chewing pests can also bore or tunnel into plant tissue. Stem-boring insects can kill or deform individual stems or whole plants. Leaf mining insects feed between the upper and lower surfaces of leaves, creating distinctive tunnel patterns visible as translucent lines or blotches on leaves. Pests with sucking mouthparts can suck sap from plant tissue, which may cause spotting or stippling of foliage, leaf curling and stunted or misshapen fruits. Insects such as *thrips* have rasping mouthparts that scrape the surface of foliage or flower parts, disrupting plant cells. Oviposition damage occurs as a result of egg laying into plant tissue. Heavy oviposition into stems can cause death or dieback of stems or branches on the plant. Flagging is a result of dieback of the ends of stems or branches. Oviposition in fruits can result in misshapen or aborted fruits, and is sometimes called cat-facing. Some insects form galls on their host plant, causing the plant to grow abnormally. Depending on the insect species, the gall formation can be stimulated by feeding or by oviposition into plant tissue. Pests can also cause damage by transmitting plant pathogens such as viruses, fungi, bacteria, mollicutes, protozoa, and nematodes. The transmission can be accidental or incidental (the plant pathogen enters plant tissue through feeding or oviposition wounds), phoretic or passive (the pest carries the plant pathogen from one plant to another), or active (the plant pathogen is carried within the body of the pest, and a plant is inoculated with the pathogen when the pest feeds on a plant).

As used herein, the term "plant symptom" refers to any abnormal states that indicate a bodily disorder. The plant symptom can be visible or not visible. Examples of plant symptoms include, but are not limited to: presence of pests in plant parts; poor stand or germination; wilted or lodged plants; roots severed or damaged; stalks with puncture holes; plants not emerged; plants cut off at or below ground; stunted plants; physically distorted plants; plants with odd colors; larvae in soil at or near roots; holes in leaves; irregular pieces of leaves missing from edges and/or center of leaves; tunneling or boring in leaves; mottled leaves; reduced leaf area; leaf defoliation; leaves discolored; dying leaves; tunneling or boring in stalks; distorted or broken stalks; dying stalks; distorted fruit; reduced fruit production. As an example, for corn, the ear, tassels, silks, husks, whorls and kernels can all have symptoms of pest damage, such as: anthers on tassel with pieces missing; whorls containing pests; distorted ear; larvae in ear; short, thread-like or small particle frass (debris or excrement from pest) in silk or on surrounding husk; numerous silks clipped off; silks often matted, discolored, and damp in silk channel or at ear tip; husks with round or oval holes often penetrating into ear; husks with irregular holes; dry, highly structured, pillow-shaped frass present on plants and on ground; kernels with chewing damage; kernels punctured through husk are sunken or popped.

As used herein, "signs of plant damage" or "signs of damage" refer to any plant symptoms that can be observed and indicate that the plant has been negatively affected by a pest compared to a plant that has not been affected by a pest or is resistant to a pest.

As used herein, the terms "resistant", "resistance", or "pest resistance" refers to the following. Resistance is caused by genes in the target insect that reduce susceptibility to a toxin, and is a trait of an individual. Resistance is defined as a phenotype of an individual that can survive on the transgenic insecticidal plant from egg to adult and produce viable offspring. For Bt toxins expressed in crops, this means that an individual must grow and mature feeding only on the Bt crop, and then mate and produce viable offspring. There is much confusion in the scientific literature over the definition of resistance. However, from a genetic or an evolutionary perspective, it is essential to define resistance as a trait of an individual. A consequence of this definition is that if only one individual in a population is resistant, the population contains resistance (Andow 2008).

As used herein, the terms "control failure from resistance" or "field resistance" refers to the following. Much of the confusion with the term "resistance" stems from the fact that it is used to describe a characteristic of a population. Specifically, it is used to describe a field population with enough resistant individuals to cause economic damage to the target crop. However, it is confusing and illogical to use the same term to describe both individuals and populations. Thus, a term to describe a resistant field population is control failure from resistance (aka field resistance). A control failure from resistance occurs when the pest causes significant economic damage to the crop. There are several reasonable definitions. For example, a control failure could be defined as occurring when the pest causes detectable economic damage to the crop, when the pest causes economic damage that is similar to that caused by susceptible insects on a non-resistant crop variety, or when the economic damage is considered unacceptable to the grower (Andow 2008).

As used herein, the term "cross-resistance" refers to resistance to all pesticidal compounds in the same sub-group that share a common mode of action.

As used herein, the term "refuge" refers to a habitat in which the target pest can maintain a viable population in the presence of Bt crop fields, where there is no additional selection for resistance to Bt toxins and insects occur at the same time as in the Bt fields (Ives and Andow, 2002). Refuges can be structured (deliberately planted in association with the Bt crop) or unstructured (naturally present as part of the cropping system). The refuge can comprise the non-Bt crop, another crop that is a host for the target pest or pests, or wild host plants. The refuge can be managed to control pest damage, as long as the control methods do not reduce the population to such low levels that susceptible populations are driven to extirpation (Ives and Andow, 2002). The effectiveness of any refuge will depend on its size and spatial arrangement relative to the Bt crop, the behavioral characteristics (movement, mating) of the target pests and the additional management requirements of the refuge.

As used herein, "percentage of refuge compliance", "percent refuge compliance" or "% refuge compliance" refers to the percentage of area planted as refuge in a given crop area.

As used herein, "efficiency of a refuge" refers to the ability of a refuge to delay or eliminate the emergence of resistance of one or more pests to a genetic trait. In one embodiment, a refuge that is more efficient would be smaller in area size compared to a refuge that is less efficient.

As used herein, the term "susceptible" is used herein to refer to an insect having no or virtually no resistance to an insecticidal trait or a chemical insecticide. The term "susceptible" is therefore equivalent to "non-resistant".

As used herein, the term "field plot" refers to any situation where plants are grown together in a contiguous physical area. Examples of such field plots include but are not limited to monoculture, plantations, range lands, golf courses, forests, vineyards, orchards, nurseries, row crops, and plants grown under a central pivot irrigation system. The systems and methods of the present invention can be applied to any way of growing plants, including but not limited to minimized tilling, zero or no-tilling, organic, non-organic, ploughed, harrowed, hoed, irrigated, non-irrigated, dry land, row plantings, hill plantings, plants grown from seed, plants grown from cuttings, plants grown from tissue culture, plants grown from rhizomes, plants grown from tubers and plants grown from bulbs.

As used herein, the term "farm" refers to an area of land and its buildings used for growing crops and rearing animals. Land on a farm may be cultivated for the purpose of agricultural production, and "farming" refers to making a living by growing crops or keeping livestock.

The present invention provides insect pheromones that are combined with transgenic insecticidal crops and chemical insecticides to provide superior and durable pest control. Because pheromone-based mating disruption acts via a unique non-toxic mode of action, which is orthogonal to insecticidal traits and chemicals, this invention provides a novel method for (i) delaying the emergence of insect resistant phenotypes (preemptive strategies) and (ii) rescuing traits and chemicals that have been overcome by resistant insects (responsive strategies).

In one embodiment, the present methods comprise part of an Integrated Pest Management Program (IPM) to control insect pests, especially in cases where resistance has emerged or is likely to emerge.

In one embodiment, a mating disruption tactic is applied to manage the genetic population of the pest by promoting cross mating of homozygous susceptible individuals (SS) with heterozygous individuals (RS) and homozygous resistant individuals (RR). In another embodiment, the applying of a mating disruption tactic comprises applying one or more pheromones. In one embodiment, population numbers of pests are kept low so as to make it very unlikely that RS will mate with RS. In another embodiment, population numbers of pests are kept low by a killing agent. In another embodiment, the killing agent is an insecticidal trait and/or a chemical insecticide.

Over time, transgenic insecticidal plant proteins and chemical insecticides have been repeatedly overcome by resistant insects. In the case of transgenic insecticidal proteins, they were overcome in major row crops by key resistant pests within 4 to 8 years, Table 1, (Tabashnik et al. Field-Evolved Insect Resistance to Bt Crops: Definition, Theory, and Data. J Econ Entomol 102(6): 2011-2025 (2009)). Since then, resistance development to traits has spread to new geographies, e.g. Brazil (Farias et al. Field—evolved resistance to Cry1F maize by *Spodoptera frugiperda* (Lepidoptera: Noctuidae) in Brazil. Crop Protection 64: 150-158 (2014)).

Chemical insecticide use has also increased over time with Brazil being the main market followed by China and the United States. In tropical Brazil, for example, the genus *Spodoptera* (Lepidoptera: Noctuidae) comprising ~30 species are among the most economically important pests of cultivated crops (Guerrero et al. Semiochemical and natural product-based approaches to control *Spodoptera* spp. (Lepidoptera: Noctuidae). J Pest Sci 87: 231-247 (2014)). In Brazil, the first report of insecticide resistance to *S. frugiperda* was to a carbamate insecticide, carbaryl (Young and McMillan. Differential feeding by two strains of fall armyworm larvae on carbaryl surfaces. J Econ Entomol 72:202-203 (1979)). Since then high levels of resistance to pyrethroid and organophosphate insecticides have been reported for *S. frugiperda* in North Florida (Yu, S. J. Insecticide resistance in the fall armyworm, *Spodoptera frugiperda* (J E Smith). Pestic Biochem Physiol 39:84-91 (1991); Yu, S. J. Detection and biochemical characterization of insecticide resistance in fall armyworm (Lepidoptera: Noctuidae). J Econ Entomol 85: 675-682 (1992)). Currently, of the 136 products registered for control of *S. frugiperda* in Brazil, 78 are pyrethroids or organophosphates (Carvalho, et al. Investigating the Molecular Mechanisms of Organophosphate and Pyrethroid Resistance in the Fall Armyworm *Spodoptera frugiperda*. PLoS ONE 8(4): e62268 (2013)).

Despite these challenges, transgenic insecticidal proteins such as Cry1Ac continue to be launched in existing and new large volume row crop markets. In recent years Monsanto launched MON87701×MON89788 (Intacta) soybean, as a means of control against *Anticarsia gemmatalis* and *Chrysodeixis includens* (Bernardi et al. Assessment of the high-dose concept and level of control provided by MON 87701× MON 89788 soybean against *Anticarsia gemmatalis* and *Pseudoplusia includens* (Lepidoptera: Noctuidae) in Brazil. Pest Manag Sci 68: 1083-1091 (2012)). Bernardi et al. (2012) observed that Intacta soybean tissue diluted 25 times in the artificial diet caused 100% *A. gemmatalis* mortality, demonstrating that Intacta soybean met the high-dose concept for this species; in contrast, Intacta soybean did not cause complete *P. includens* mortality, and therefore it did not fully meet the high-dose concept for *P. includens*. In general, these new products are selected for a high-dose transgenic insecticidal phenotype. The combination of high-dose with an adequate refuge strategy reduces the selection pressure favoring the resistance alleles thus delaying the evolution of resistance (Andow, D. A. The risk of resistance evolution in insects to transgenic insecticidal crops. Collection of Biosafety Reviews, Trieste, v. 4, p 142-199 (2008)).

In the case of the recently launched Intacta soybean, the dose for *A. gemmatalis* was referred to as high dose, and for *C. includens* was referred to as 'very near' high dose. The authors noted the *C. includens* population that they used in their research in Brazil was ~8× and 15× less susceptible than the US lab and field populations, respectively. The authors noted that growth inhibition was present and perhaps the stunted larvae should be considered to be dead. This was followed by the authors noting that *C. includens* also feeds on cotton and the use of Bt cotton varieties that also express

TABLE 1

Selected transgenic toxins and the amount of time for resistance to develop

| Reference | Crop | Species | Protein | Country | Year of Introduction | Time for Resistance to Develop |
|---|---|---|---|---|---|---|
| Luttrell et al. 1999 | Cotton | *Helicoverpa zea* | Cry1Ac | USA | 1996 | 7-8 y |
| Ali and Lutterell, 2007 | Cotton | *Helicoverpa zea* | Cry2Ab | USA | 2003 | 4 y |
| Dhura and Guja, 2011 | Cotton | *Pectinophora gossypiella* | Cry1Ac | India | 2002 | 6 y |
| Van Rensburg, 2007 | Corn | *Busseola fusca* | Cry1Ab | South Africa | 1998 | <8 y |
| Matten et al. 2008 | Corn | *Spodoptera frugiperda* | Cry1F | Puerto Rico | 2003 | 4 y | the Cry1Ac protein could accelerate the evolution of resistance to Cry1Ac in soybean. This would be especially true in the soybean and cotton planting areas in central Brazil, where there is a succession of very large contiguous cotton and soybean plantings. Differences in susceptibility were also present across geographies with the US populations being much more susceptible than the Brazilian populations. Ultimately the authors concluded that the useful life of this technology will be highly dependent on effective Insect Resistance Management (IRM) programs, in particular providing adequate refuge areas.

Subsequent research and modeling suggest that going forward, most transgenic crops will exist in a mosaic of crops that may contain either the same gene expressed at different levels or different genes with various levels of cross-resistance (Caprio, M. A. and D. M. Suckling. Resistance Management in the 21st Century: An Entomologists Point of View. Proc 50th NZ Plant Protection Conf: 307-313 (1997)). Management strategies therefore need to consider pest movement, multiple pests, and varying levels of refuge. Considering the expanded use of transgenic insecticidal proteins and chemical insecticides it is clear that pest control will only become more complex.

The present disclosure of using pheromones to manage resistance to insecticidal traits and chemicals can, in one embodiment, improve the durability of insecticidal transgenes and chemicals. In another embodiment, using pheromones to manage resistance to insecticidal traits and chemicals allows for recovery of insecticidal performance across a broader range of products. In another embodiment, using pheromones to manage resistance to insecticidal traits and chemicals can allow development of lower dose insecticidal transgenes. In another embodiment, using pheromones to manage resistance to insecticidal traits and chemicals can allow development of lower dose chemical insecticides, thus making them safer. In a further embodiment, attract-and-kill can also allow development of lower dose chemical insecticides. In another embodiment, using pheromones to manage resistance to insecticidal traits and chemicals can reduce refuge size.

All effective insecticide resistance management (IRM) strategies seek to minimize the selection of resistance to any one type of insecticide. In practice, alternations, sequences or rotations of compounds from different MoA groups provide sustainable and effective IRM for insect and mite pests. This ensures that selection from compounds in the same MoA group is minimized, and resistance is less likely to evolve. Applications are often arranged into MoA spray windows or blocks that are defined by the stage of crop development, together with the biology and phenology of the species of concern. Local expert advice should always be followed with regard to spray windows and timing. Several sprays may be possible within each spray window, but it is generally essential that successive generations of the pest are not treated with compounds from the same MoA group. IRAC (Insecticide Resistance Action Committee) also offers specific recommendations for some MoA groups. Metabolic resistance mechanisms may give cross-resistance between MoA groups; where this is known to occur, the above advice should be modified accordingly.

Several approaches can be taken to delay resistance evolution. One approach, and perhaps the simplest, is to reduce the selection pressure (exposure) on the pests to Bt crops by maintaining refuge plants. Nearby refuges of host plants without Bt toxins provide abundant susceptible pests with which most of the rare resistant pests surviving on Bt crops will mate. If inheritance of resistance is recessive, the hybrid progeny from such matings will die on Bt crops, substantially slowing the evolution of resistance. Specific issues to be considered in maintaining refuges include the size of the refuge, the placement of the refuge, time of planting and management of refuges.

A second approach is to reduce the fitness differential between resistant and susceptible insects. The fitness differential is the fitness advantage of resistant phenotypes over susceptible phenotypes when both are exposed to the transgenic plant. This can be accomplished by suppressing pests emerging from the transgenic crop with other control tactics such as insecticides, cultural controls, or more effective biological control.

A third approach is to reduce RS heterozygote fitness. When resistance is rare, the rate of evolution of resistance is mainly determined by the fitness of heterozygotes. Heterozygotes may have a susceptible or a resistant phenotype. If the heterozygotes are phenotypically susceptible, then they have low fitness on the Bt plant (resistance is recessive), and the rate of resistance evolution is slow. A high-dose event has low RS heterozygote fitness, and a low-dose event has higher RS heterozygote fitness.

A fourth approach is used only with high-dose IRM strategies. For some pest species, it may be possible to manage the sex-specific movement and mating frequencies to delay resistance evolution (Andow, D. A. and A. R. Ives. Monitoring and adaptive resistance management. Ecological Applications 12:1378-1390 (2002)). By using chemical and environmental attractants, it may be possible to enhance the movement of males and simultaneously reduce the movement of females from refuges to transgenic fields limiting the impact of source-sink dynamics (Caprio, M. A. Source-sink dynamics between transgenic and non-transgenic habitats and their role in the evolution of resistance. Insecticide Resistance and Resistance Management, Vol 94: 698-705 (2001)).

A high-dose/refuge strategy is also employed to delay resistance evolution. This strategy requires that the Bt crop produces a sufficiently high toxin concentration. Plant tissue must be sufficiently toxic that any resistance allele in the target population is functionally recessive. High-dose is a property of both the Bt plant and the target pest, and is not merely based on the concentration of toxin in the plant. A "high-dose" is defined as one that kills a high proportion (>95%) of heterozygous resistance genotypes, so that the heterozygotes have a similar mortality as the homozygous susceptible genotypes. A high-dose renders resistance recessive, which can greatly delay resistance evolution. A host plant other than the Bt crop is growing nearby as a refuge for the target pest or pests. A refuge provides unselected pests, which will mate with resistant individuals emerging from Bt fields, thereby making all offspring heterozygous and phenotypically susceptible. The non-Bt refuges must be interspersed sufficiently among the Bt crop fields, so that there is sufficient mingling and mating between individuals emerging from refuges and Bt fields.

The high-dose/refuge strategy delays the evolution of resistance primarily by reducing the selection pressure favouring the resistance alleles. It also reduces the fitness advantage of the RS heterozygote over the SS homozygote. A high-dose event is one in which the R allele is nearly recessive, which means that the fitness of the RS heterozygote is nearly the same as the SS homozygote. Finally, the mingling and mating promoted between individuals from a Bt field and a refuge field reduces the rate of formation of RR offspring in Bt fields.

A 2-year crop rotation in the United States between maize and soybean has traditionally been highly successful in controlling corn rootworm populations. The cultivation of soybean following maize planting presents hatching corn rootworm larvae with plant roots unsuitable for feeding. Thus suppression of corn rootworm population is possible, as the larvae fail to develop into adults. However, it has been observed that the corn rootworm has adapted to circumvent this practice of pest control in two ways: by using diapause, an arrest in development, to overwinter for two years, thus hatching during a maize crop cultivation, and by losing the fidelity for laying eggs in maize fields, ovipositing near other plants including soybean (French et al. Inheritance of an extended diapause trait in the Northern corn rootworm, *Diabrotica barberi* (Coleoptera: Chrysomelidae) J. Appl. Entomol. 138:213-221 (2014)).

Another technology to control insect resistance relies on the release of mass-reared insects that have been sterilized by irradiation or genetic engineering (Sterile Insect Technique, or SIT). Because the released insects are sterile, no viable offspring result from matings between the released insects and the wild population. Although the susceptible alleles provided by traditional SIT are not inherited, SIT can reduce the mating of resistant insects, thus preventing the spread of resistant alleles. Wider applicability of SIT is hindered by several challenges, including the negative effects on insect fitness from sterilization and difficulty in conducting large-scale sex-sorting for male-only releases.

Suckling et al. (Suckling et al. Resistance management of lightbrown apple moth, *Epiphyas postvittana* (Lepidoptera: Tortricidae) by mating disruption. New Zealand Jounral of Crop and Horticultural Science, Vol 18: 89-98 (1990)) found that insecticide resistant (azinphos-methyl) light brown apple moth, *Epiphyas postvittana*, could persist in apple orchards treated with both mating disruption and insecticides (chlorpyrifos). This is not surprising given that the constant selection pressure of insecticides with shared MOAs would favor the resistant population. Regardless of this, they suggested that mating disruption can still be used to decrease the fruit damage caused by insecticide resistant pests merely by suppressing their ability to mate since mating disruption operates via an orthogonal MOA. No specific mechanism, or resistance-targeting mechanism of mating disruption was elucidated.

Caprio and Suckling (Caprio, M. A. and D. M. Suckling. Mating disruption reduces the risk of resistance development to transgenic apple orchards: simulations of the lightbrown apple moth. Proc. 48th N. Z. Plant Protection Conf: 52-58 (1995)) produced a model showing that mating disruption can reduce the evolution of Bt resistance by decreasing the resistant allele frequency in a population of *E. postvittana* within a virtual apple orchard. They simulated mating disruption by reducing the number of eggs laid by the female population. Thus, with 90% mating disruption, females only laid 10% of their normal reproductive capacity. The authors recognized the limitation that their model did not account for ovipositioning by invading gravid females. That is, they treated mated females immigrating into a field with mating disruption as if they had to remate, which was unrealistic. By referencing mark-release-capture studies that showed that adult male *E. postvittana* did not disperse long distances, they reasoned that this limitation was a minor for their simulation given that 95% of the moths would not disperse beyond the simulated field. They proposed that mating disruption decreases the size of the treated population, just as an additional mortality factor, and increases the relative effect of immigration from refugia because the population in the refugia was not penalized with mating disruption. They showed that mating disruption can delay the emergence of resistance even in cases where a low Bt dose was simulated (FIG. 1).

Andow and Ives (2002) have simulated the potential of using chemical and environmental attractants as tools to delay insecticide resistance by managing the sex-specific movement of pests between transgenic fields and refugia. Low migration between refugia and toxin-expressing crops causes non-random mating, and thus leads to local increase in the number of homozygous resistant pests. Using chemicals to enhance the chemically-mediated orientation of pests is a way to enhance dispersion leading to random mating between resistant adults reared on toxic crops and susceptible adults from refugia. Enhancing the movement of males while simultaneously reducing the movement of females from refugia to transgenic fields, manipulates mating and oviposition dynamics and limits the impact of source-sink dynamics (Caprio, 2001). Using attractants in a refuge increases the number of matings occurring in the refuge among susceptible and resistant adults. Furthermore, the selective advantage of resistance is reduced if oviposition increases in non-toxic refuges where any resulting resistant larvae would receive no fitness advantage from their evolved resistance in the absence of toxins (Carriere et al. Predicting spring moth emergence in the pink bollworm: implications for managing resistance to transgenic cotton. Journal of Economic Entomology 94:1012-1021 (2001); Andow and Ives 2002).

Andow and Ives (2002) present a model of how the reduction of reproduction in Bt fields could slow the evolution of resistance. Supplemental insecticide treatment, increasing overwintering mortality (plowing), biological controls, and disrupting mating are listed as potential mechanisms by which reproduction can be reduced. But there is no elaboration on the detail of these potential mechanisms. Andow and Ives (2002) also describe how female pheromone application in the Bt field could serve to attract susceptible males from refugia to enter the Bt field and dilute the resistant alleles that are evolving there.

The present invention has advantages over the previous concepts because the systems and methods of the present disclosure do not require high dose traits, nor do they depend on the presence of a refuge. High dose traits are sometimes difficult to attain for all target pest species. Additionally, the maintenance of refuges can be costly for farmers and difficult to enforce across a region. By controlling the mingling and mating between individuals from toxic and refuge fields, one can reduce the rate at which resistant homozygote offspring are formed. Table 2 below contrasts the present invention with previous disclosures in the art.

TABLE 2

Insect Resistance Management Strategies

| Reference | Resistance Management Mechanism | Limitations/Comments |
|---|---|---|
| Caprio and Suckling (1995)-Preemptive | Mating disruption in Bt field decreases reproduction | Does not account for oviposition by invading gravid females |
| Andow and Ives (2002)-Preemptive | Mating disruption in Bt field decreases reproduction; Attracts susceptible males to mate with resistant females in the Bt field | Mating disruption cannot at the same time attract males to a field and allow them to mate with females |
| Present Invention-Preemptive strategy | Same as Caprio & Suckling (1995) | |
| Present Invention-Responsive Strategy | Bt field core: mating disruption Bt field border: no pheromone Refuge on the border or as a separate nearby field: pheromone as a lure to attract resistant males to mate with susceptible females. | Allows rescuing an insecticide while still using that insecticide. A feat that Suckling (1990) failed to achieve. |

Traits—Responsive

Female sex pheromone spatial distribution and concentration:

Bt plot: high concentration of sex pheromone and high coverage to effect mating disruption. Males in this plot are disoriented. No mating in Bt plot reduces the number of resistant pests.

Refuge: low concentration of pheromone to attract resistant males from the border to mate with susceptible females in the refuge. In one embodiment, the pheromone is deployed as point sources dispersed throughout the field. These pheromones can be different than mating disruption formulations. They can also be male hair-pencil compounds. "Low concentration" affects the dispersal patterns of males to increase the number of resistant males from insecticide-treated fields mating with susceptible females in the refuge. Resulting heterozygote resistant eggs would either experience a fitness cost of resistance in the refuge (if females oviposited near to where they mated), or have a smaller fitness differential under selection pressure in the insecticide-treated fields (if mated females migrated to nearby field plots before ovipositing).

Border: This is a no pheromone lane on the inner edge of the Bt plot that can act as a buffer zone. It allows some resistant males to migrate to the neighboring refuge to mate with susceptible females.

Spatial distribution of refuge:

Separate blocks. Not too far from Bt plots so as to allow susceptible population to mate with resistant members from the Bt plot.

Refuge in a bag. Blanket pheromone application penalizes the entire population and keeps population numbers low. This reduces pressure favoring resistant alleles since all insects are able to find non-Bt crop to feed from in the refuge.

Refuge on the border. Promotes migration of the susceptible population towards the Bt plot to mate with resistant insects. This effect could be enhanced by planting the border earlier. As the border senesces, the susceptible insects will migrate en masse to the core.

The present invention provides for a method of rescuing one or more pests' susceptibility to one or more transgenic insecticidal traits and/or chemical insecticides in a field plot system which comprises plants of a plant population, wherein the plants may comprise one or more transgenic insecticidal traits, wherein a portion of or the entire field plot may comprise one or more chemical insecticides, wherein the entire field plot comprises a core region and a border region, wherein the field plot system further comprises one or more refuges, said method comprising: a) applying a mating disruption tactic to the core region, wherein said mating disruption tactic is capable of disrupting the mating of the one or more pests; b) having a pheromone-free zone in the border region; and c) applying a low concentration of one or more semiochemicals or factors in one or more of the refuges, wherein said method rescues the one or more pests' susceptibility to one or more transgenic insecticidal traits and/or chemical insecticides as a result of the applications when compared to a control field plot which only had one or none of the applications.

In one embodiment, the reduction in number of one or more pests comprises a decrease in mating of a resistant pest with another resistant pest. In another embodiment, said one or more susceptible pests in said one or more refuges mate with one or more resistant pests from the field plot. In another embodiment, the plants comprising one or more transgenic insecticidal traits express one or more Bacillus thuringiensis (Bt) proteins.

In one embodiment, applying a mating disruption tactic comprises applying one or more pheromones. In another embodiment, the one or more pheromones comprise sprayable formulations or are in aerosol emitters or hand applied dispensers. In another embodiment, the one or more pheromones are applied at a high concentration and at high coverage.

In one embodiment, said one or more refuges are adjacent to the field plot. In another embodiment, the one or more refuges comprise separate blocks. In another embodiment, the one or more refuges promotes migration of one or more susceptible pests to the core region to mate with one or more resistant pests. In another embodiment, the border region is planted earlier than the core region.

In one embodiment, the one or more semiochemicals or factors applied in the method of rescuing one or more pests' susceptibility to one or more transgenic insecticidal traits and/or chemical insecticides in a field plot system comprise male attractants.

In one embodiment, the one or more semiochemicals or factors increases the number of matings occurring in the one or more refuges among susceptible female pests and resistant male pests. In another embodiment, selective advantage of resistance is reduced in the one or more refuges.

The present invention also provides for a field plot system comprising plants of a plant population, wherein the plants may comprise one or more transgenic insecticidal traits, wherein a portion of or the entire field plot may comprise one or more chemical insecticides, wherein the entire field plot comprises a core region and a border region, wherein the field plot system further comprises one or more refuges, wherein the field plot system further comprises one or more pests capable of damaging the plants, wherein said one or more pests have become resistant to one or more transgenic insecticidal traits and/or chemical insecticides, said field plot comprising: a) one or more semiochemicals applied to the core region, wherein said one or more semiochemicals are capable of disrupting the mating of the one or more pests, b) a pheromone-free zone in the border region; and c) a low concentration of one or more semiochemicals or factors applied in one or more of the refuges, wherein said field plot system has the one or more pests' susceptibility to one or more transgenic insecticidal trait and/or chemical insecticide rescued as a result of the applications when compared to a control field plot system which only had one or none of the applications.

In one embodiment, the one or more semiochemicals applied to the core region comprises one or more pheromones. In another embodiment, the one or more pheromones are applied at a high concentration and at high coverage. In another embodiment, the low concentration of one or more semiochemicals or factors comprises male attractants.

Traits—Preemptive

Female sex pheromone spatial distribution and concentration:

Bt plot, refuge and border: high concentration of sex pheromone and high coverage to effect mating disruption and keep crop yields high in the refuge.

Spatial distribution of refuge:

Separate blocks. Not too far from Bt plots so as to allow susceptible population to mate with resistant members from the Bt plot.

Refuge in a bag. Blanket pheromone application penalizes the entire population and keeps population numbers low. This reduces pressure favoring resistant alleles since all insects are able to find non-Bt crop to feed from.

Refuge on the border. Promotes migration of the susceptible population towards the Bt plot to mate with resistant insects. This effect could be enhanced by planting the border earlier. As the border senesces, the susceptible insects will migrate en masse to the core.

The present invention provides for a method of delaying emergence of or reducing the number of one or more pests that may become resistant to one or more transgenic insecticidal traits and/or chemical insecticides in a field plot system which comprises plants of a plant population, wherein the plants may comprise one or more transgenic insecticidal traits, wherein a portion of or the entire field plot may comprise one or more chemical insecticides, wherein the entire field plot comprises a core region and a border region, wherein the field plot system further comprises one or more refuges, said method comprising: a) applying a mating disruption tactic to the core region, wherein said mating disruption tactic is capable of disrupting the mating of the one or more pests; and b) applying one or more semiochemicals or factors in the one or more refuges, wherein said one or more semiochemicals or factors are capable of reducing or preventing the movement of one or more susceptible pests, and/or attracting resistant pests to the refuge, wherein said method delays emergence of or reduces the number of one or more pests as a result of the applications when compared to a control field plot which only had one or none of the applications.

In one embodiment, the reduction in number of one or more pests comprises a decrease in mating of a resistant pest with another resistant pest. In another embodiment, said one or more susceptible pests in said one or more refuges mate with one or more resistant pests from the field plot. In another embodiment, the plants comprising one or more transgenic insecticidal traits express one or more *Bacillus thuringiensis* (Bt) proteins.

In one embodiment, applying a mating disruption tactic comprises applying one or more pheromones. In another embodiment, the one or more pheromones comprise sprayable formulations or are in aerosol emitters or hand applied dispensers. In another embodiment, the one or more pheromones are applied at a high concentration and at high coverage.

In one embodiment, said one or more refuges are adjacent to the field plot. In another embodiment, the one or more refuges comprise separate blocks. In another embodiment, said one or more refuges are in the border region. In another embodiment, the one or more refuges promotes migration of one or more susceptible pests to the core region to mate with one or more resistant pests. In another embodiment, the border region is planted earlier than the core region.

In one embodiment, the one or more semiochemicals or factors applied in the method of delaying emergence of or reducing the number of one or more pests that may become resistant to one or more transgenic insecticidal traits and/or chemical insecticides in a field plot system comprise oogenesis and oviposition factors (OOSFs). In another embodiment, the OOSFs are applied by vaporization. In another embodiment, the one or more semiochemicals or factors comprise one or more attractants. In another embodiment, the one or more attractants comprise one or more host plant chemical, non-host plant chemical, synthetic volatile chemical, or natural volatile chemical. In another embodiment, the one or more attractants are identified through binding to one or more pest odorant binding proteins. In another embodiment, the one or more attractants comprise one or more host plant volatile chemical. In another embodiment, the one or more host plant volatile chemical comprise heptanal or benzaldehyde. In another embodiment, the one or more attractants comprise one or more male pheromones. In another embodiment, the one or more attractants comprise one or more ovipositioning pheromones. In another embodiment, the one or more attractants comprise one or more female attractants. In another embodiment, the one or more female attractants comprise ethylene.

In one embodiment, the one or more semiochemicals or factors applied in the method of delaying emergence of or reducing the number of one or more pests that may become resistant to one or more transgenic insecticidal traits and/or chemical insecticides in a field plot system reduces the movement of susceptible female pests from the one or more refuges. In another embodiment, the one or more semiochemicals or factors increases the number of matings occurring in the one or more refuges among susceptible female pests and resistant male pests. In another embodiment, selective advantage of resistance is reduced in the one or more refuges.

The present invention also provides for a field plot system comprising plants of a plant population, wherein the plants may comprise one or more transgenic insecticidal traits, wherein a portion of or the entire field plot may comprise one or more chemical insecticides, wherein the entire field plot comprises a core region and a border region, wherein the field plot system further comprises one or more refuges, wherein the entire field plot further comprises one or more pests capable of damaging the plants, wherein said one or more pests can become resistant to one or more transgenic insecticidal traits and/or chemical insecticides, said field plot comprising: a) one or more semiochemicals applied to the core region, wherein said one or more semiochemicals are capable of disrupting the mating of the one or more pests; and b) one or more semiochemicals or factors applied in the one or more refuges, wherein said one or more semiochemicals or factors are capable of reducing or preventing the movement of one or more susceptible pests, and/or attracting resistant pests to the refuge, wherein said field plot system has a delay in the emergence of or a reduction in the number of one or more pests as a result of the applications when compared to a control field plot system which only had one or none of the applications.

In one embodiment, the one or more semiochemicals applied to the core region comprises one or more pheromones. In another embodiment, the one or more pheromones are applied at a high concentration and at high coverage. In another embodiment, the one or more semiochemicals or factors comprise oogenesis and oviposition factors (OOSFs). In another embodiment, the one or more semiochemicals or factors comprise one or more attractants.

Polyphagous insects feed on multiple different crops. Recently a strain of *Heliothis virescens* has shown cross-resistance to a range of Bt toxins differing in structure and activity. Thus the concept of avoiding resistance development by the use of different Bt genes in different host plants of polyphagous pests has been challenged. Therefore, in the methods of the present invention, applying mating disruption in all host crops in the same region would be desirable.

Preemptive and responsive strategies to combat resistance to chemical insecticides will be similar to the strategies described above for transgenic insecticidal traits.

Instead of refuges, different areas of a field can be treated with different insecticides with independent modes of action. This will decrease the likelihood that a pest will become resistant to a given chemical insecticide.

Bt expression is weakest in the late stages of the crop cycle. This increases the risk of resistance because by this point in the crop cycle, there may have already been 3-4 generations under selection pressure to become resistant. Attract-and-kill in this late stage would kill any heterozygotes thus improving the efficacy of the preemptive treatment. Differences in the likelihood of developing resistance in male and female caterpillars can be exploited. If, for example, resistance emerges faster in males, attract-and-kill using female sex pheromones can be used to selectively kill those males.

Resistance allele and its effect on olfaction. It is assumed that the resistance allele does not lead to any differences in olfaction (host finding or mate finding) between susceptible and resistant individuals. While this may be a reasonable assumption, when the insecticide MOA is unrelated to olfaction and the neural system (e.g. a Bt gut toxin), it may be that adaptations that enable resistance to neurotoxins, such as pyrethroids, may lead to differences in olfaction sensitivities. This in turn can be exploited to enable preferential mating between SS and RS.

Resistance Diagnostics and Genetic Markers for RS, SS, and RR

DNA-based screening methods can be used to measure the cessation and/or reversal of evolution of resistance provided by the systems and methods of this disclosure. By identifying the genes that confer resistance, low frequencies of resistance genes in a population can be detected and quantified. As of yet, there is no reliable identification of genetic markers for resistance in insects as there are for host plant resistance (Jessup et al. Genetic Mapping of Fall Armyworm Resistance in Zoysiagrass, Crop Science 51(4): 1774-1783 (2011)), though significant gains have been made in several lepidopterans.

Many studies corroborate the assertion that a single (or small number of) recessive, autosomal loci control resistance (Ríos-Díez, J. D. and C. I. Saldamando-Benjumea. Susceptibility of *Spodoptera frugiperda* (Lepidoptera: Noctuidae) Strains From Central Colombia to Two Insecticides, Methomyl and Lambda-Cyhalothrin: A Study of the Genetic Basis of Resistance, J. Economic Entomology 104(5): 1698-1705 (2011)). Resistance in *H. virescens* and *P. gossypiella* is due to a mutation in a single 12-cadherin-domain protein in the larval gut (Morin et al. Three cadherin alleles associated with resistance to *Bacillus thuringiensis* in pink bollworm. Proc Natl Acad Sci USA 100: 5004-5009 (2003)). The genetic basis for this particular Mode 1 resistance is not the same in all Lepidoptera, and possibly not even between all strains within a species (Baxter et al. Novel genetic basis of field-evolved resistance to Bt toxins in *Plutella xylostella*. Insect Molecular Biology 14:327-334 (2005)). Therefore, screening of this particular cadherin gene sequence would not be diagnostic and could not detect resistance in field populations. In a different lepidopteran, *Plodia interpunctella*, the resistance mechanism acts instead through a protoxin-processing protease, whose genetic basis is likely different in *Plutella* and *Heliothis* (Heckel et al. 2007). More recent evidence suggests that the same chromosomal region (ABCC2) on at least two, possibly 3, divergent Lepidoptera (*H. virescens* and *P. xylostella* and potentially *T. ni*) is the site of a mutation directly responsible for Bt resistance (Baxter et al. Parallel Evolution of *Bacillus thuringiensis* Toxin Resistance in Lepidoptera, Genetics 189: 675-679 (2011)). Jessup et al. (2011) assert that they have identified a marker, ZgAg136, for Zoysiagrass resistance to *S. frugiperda*, and suggest that it might carry over to resistance of additional important crops like corn.

Arias et al. (Arias et al. Ecology, Behavior and Bionomics First Genotyping of *Spodoptera frugiperda* (J. E. Smith) (Lepidoptera: Noctuidae) Progeny from Crosses between Bt-Resistant and Bt-Susceptible Populations, and 65-Locus Discrimination of Isofamilies, Research & Reviews: Journal of Botanical Sciences 4(1): 18-29 (2015)) found seven microsatellite markers that correlated with the Bt-resistant phenotype. This study provides a starting point to study low levels of Bt-resistance, which are generally associated to dominant or codominant genes.

A pheromone is a chemical substance that is usually produced by an animal or insect and serves especially as a stimulus to other individuals of the same species for one or more behavioral responses. Pheromones can be used to disrupt mating of invading insects by dispensing the pheromones or the pheromone scent in the air, so the males cannot locate the females, which disrupts the mating process. Pheromones can be produced by the living organism, or artificially produced. This pest control method does not employ insecticides, so the use of pheromones is safer for the environment and for living organisms. In one embodiment, the pheromone formulations used in the methods of the disclosure comprise a pheromone blend of (Z)-9-tetradecenyl acetate (Z9-14Ac): (Z)-11-hexadecenyl acetate (Z11-16Ac) from *Spodoptera frugiperda*. In another embodiment, the ratio of (Z)-9-tetradecenyl acetate (Z9-14Ac): (Z)-11-hexadecenyl acetate (Z11-16Ac) pheromone blend is about 87:13. In some embodiments, the pheromone formulations used in the methods of the disclosure comprise a pheromone blend of (Z)-9-tetradecenyl acetate (Z9-14Ac): (Z)-11-hexadecenyl acetate (Z11-16Ac): (Z)-7-dodecenyl acetate (Z7-12Ac). In another embodiment, the ratio of (Z)-9-tetradecenyl acetate (Z9-14Ac): (Z)-11-hexadecenyl acetate (Z11-16Ac): (Z)-7-dodecenyl acetate (Z7-12Ac) pheromone blend is about 87:12:1. In some embodiments, the pheromone formulations used in the methods of the disclosure comprise a pheromone blend of (Z)-11-hexadecenal (Z11-16Ald): (Z)-9-hexadecenal (Z9-16:Ald) from *Helicoverpa zea*. In another embodiment, the ratio of (Z)-11-hexadecenal (Z11-16Ald): (Z)-9-hexadecenal (Z9-16:Ald) pheromone blend is about 97:3.

Sex pheromones are used in the chemical communication of many insects for attracting the species of the opposite sex to engage in reproduction. Pheromones are useful for pest control largely through four means: monitoring, mass trappings, attract-and-kill, and disruption or impairment of communication. The "monitoring" methodology attracts the pest to a central area, which allows the grower to obtain precise information on the size of the pest population in order to make informed decisions on pesticide use or non-use. "Mass trappings" brings the pest to a common area and physically traps it, which hinder production of new generations of the pest. "Attract-and-kill" allows the pest to be drawn into a centrally located container and killed in the container by the pesticide reducing the need to spread pesticides in broad areas. "Disruption of communication" can occur in that a large concentration of sex pheromone can mask naturally occurring pheromones or saturate the receptors in the insect causing impairment of communication and disruption of natural reproductive means. For each one of these means, each individual species of pest needs to be treated with a tailor-made composition.

The pheromone formulations used in the methods of the invention may be provided alone or may be included in a carrier and/or a dispenser. In one embodiment, the methods comprise applying one or more pheromones in dispensers located throughout the entire field plot. In another embodiment, the methods comprise applying one or more pheromone formulations comprising sprayable emulsion concentrate or sprayable microencapsulation formulations. In another embodiment, the methods comprise applying one or more pheromones in aerosol emitters.

A dispenser allows for release of the pheromone composition. Any suitable dispenser known in the art can be used. Examples of such dispensers include but are not limited to bubble caps comprising a reservoir with a permeable barrier through which pheromones are slowly released, pads, beads, tubes rods, spirals or balls composed of rubber, plastic, leather, cotton, cotton wool, wood or wood products that are impregnated with the pheromone composition. For example, polyvinyl chloride laminates, pellets, granules, ropes or spirals from which the pheromone composition evaporates, or rubber septa. An example of a dispenser is a sealed polyethylene tube containing the pheromone composition of the invention where a wire is fused inside the plastic so the dispenser can be attached by the wire to a tree or shrub. The dispenser may also comprise or include a trap. A killing agent may be incorporated into the trap, such as a sticky or insecticide-treated surface, a restricted exit, insecticide vapour or an electric grid.

The carrier may be an inert liquid or solid. Examples of solid carriers include but are not limited to fillers such as kaolin, bentonite, dolomite, calcium carbonate, talc, powdered magnesia, Fuller's earth, wax, gypsum, diatomaceous earth, rubber, plastic, silica and China clay. Examples of liquid carriers include but are not limited to water; alcohols, particularly ethanol, butanol or glycol, as well as their ethers or esters, particularly methylglycol acetate; ketones, particularly acetone, cyclohexanone, methylethyl ketone, methylisobutylketone, or isophorone; alkanes such as hexane, pentane, heptanes; aromatic hydrocarbons, particularly xylenes or alkyl naphthalenes; mineral or vegetable oils; aliphatic chlorinated hydrocarbons, particularly trichloroethane or methylene chloride; aromatic chlorinated hydrocarbons, particularly chlorobenzenes; water-soluble or strongly polar solvents such as dimethylformamide, dimethyl sulfoxide, or N-methylpyrrolidone; liquefied gases; or the like or a mixture thereof.

The pheromone formulations used in the methods of the invention may be formulated so as to provide slow release into the atmosphere, and/or so as to be protected from degradation following release. For example, the pheromone formulations may comprise carriers such as microcapsules, biodegradable flakes and paraffin wax-based matrices. In some instances the pheromone composition is provided by direct release from the carrier. For example, Min-U-Gel™, a highly absorptive Attapulgite clay, can be impregnated with a pheromone composition of the invention. In another example, the pheromone composition may be mixed in a carrier paste that can be applied to trees and other plants. Insecticides may be added to the paste. Baits or feeding stimulants can also be added to the carrier.

The pheromone formulations used in the methods of the invention may comprise other pheromones or attractants provided that the other compounds do not substantially interfere with the activity of the formulations.

Mating disruption formulations can include the following categories, depending upon dispenser type and application technique: (1) Reservoir, high rate systems that must be hand applied; (2) female equivalent, low rate sprayable systems; (3) female equivalent, low rate hand-applied systems; (3) microdispersible, low rate systems that are sprayable. Commercial mating disruption and attract and kill formulations for pink bollworm are summarized in Jenkins 2002 (Jenkins, J. W. Use of mating disruption in cotton in North and South America. *Use of pheromones and other semiochemicals in integrated production, IOBC wprs Bulletin Vol.* 25, 2002) and is herein incorporated in its entirety.

Effect of sex pheromones on female moths. Mating disruption using female sex pheromones operates via modulating the behaviour of adult males, in so far as trap catch shutdown is a property of males only. Trap catch shutdown is used as proxy for indicating that no mating has occurred in the field. It is important to realize that adult moths cause negligible damage because they only feed from nectar and, for some species, they do not feed at all. Thus, damage is a property of the females, whose progeny of caterpillars will attack the host crop. How a female moth is affected by the presence of its own sex pheromone is not fully understood. Of course, females are indirectly affected by mating disruption if they are unable to successfully recruit a male partner for fertilizing their eggs.

Using an olfactometer to measure the behavioral response of female *H. armigera* and *H. zea* moths towards pheromones released by other live female *H. armigera* and *H. zea* moths, Saad & Scott (Saad, A. D. & Scott, D. R. Repellence of pheromone released by females of *Heliothis armigera* and *H. zea* to females of both species. Entomol. Exp. Appl. 30, 123-127 (1981)) showed the following order of repellency: virgins repelled virgin>virgins repelled by mated>mated repelled by virgin. Mated females were not repelled by other mated females. As expected due to *H. armigera* and *H. zea* sharing the same pheromone active ingredients (AIs), an *H.*

*armigera* female virgin was also repelled by an *H. zea* female virgin, and vice-versa. The authors interpreted this female virgin repellency as a mechanism of ensuring uniform distribution of newly emerged females and thus enhancing the overall success of the population in recruiting males. Additionally, they reasoned that uniform distribution of the females should lead to uniform distribution of the eggs, which should benefit survival for a species that is polyphagous, cannibalistic, and which deposits eggs singly.

Su et al. (Su, J.-W., et al. Female moths of cotton bollworm (Lepidoptera: Noctuidae) captured by waterbasin traps baited with synthetic female sex pheromone. Insect Sci. 13, 293-299 (2006)) conducted *H. armigera* mass trapping experiments in cotton fields in China over three years, which indicate that mated females are actually attracted to the female sex pheromone. Female and male moth catches by waterbasin traps with lures impregnated with the synthetic female sex pheromone blend, a 97:3 ratio of Z11-16:Ald: Z9-16:Ald, were compared to catches by control waterbasin traps with lures that lacked the pheromone. A total of 15×4 ha plots were used. Waterbasin traps were deployed in three configurations in the plots: 'A' was pheromone traps only, 'B' was both pheromone and control traps in approximate equal numbers, and 'C' was control traps only. There were four 'A' plots each with 169 traps, at 13 m intervals, three 'A' plots each with 100 traps, at 13 m intervals, and another three 'A' plots with 100 traps per plot but each at 20 m, 10 m and 5 m intervals. There were three 'B' plots each with 169 traps at 13 m intervals and one 'B' plot with 100 traps at 13 m intervals. There was only one 'C' plot with 100 traps at 13 m intervals. A total of 1,983 traps were used in the 15 plots. All cotton bollworm moths captured by traps in each plot were counted and sexed daily during a trapping period of typically two weeks. The key results are summarized in Tables 3-5.

TABLE 3

*H. armigera* moths caught by waterbasin traps baited with pheromone dispensers and control dispensers in four 'A' and three 'B' mass trapping plots. 'A' plots had 169 pheromone traps. 'B' plots had 85 pheromone and 84 control traps. Values in same row followed by different letters are significantly different.

| Plot Type | Trap Type | Mean Weekly Catch per Trap | |
| --- | --- | --- | --- |
| | | Male | Female |
| A | Female Sex Pheromone | 51.5 ± 11.2a | 1.5 ± 0.2b |
| B | Female Sex Pheromone | 153.3 ± 19.7a | 2.8 ± 0.5b |
| | Control | 2.6 ± 0.3a | 0.3 ± 0.1b |

TABLE 4

*H. armigera* moths captured by pheromone traps in three 'A' plots with 100 traps each and different trap intervals. Values in same column followed by different letters are significantly different.

| Trap Interval (m) | Mean Weekly Catch per Trap | | Mean Weekly Catch per Ha | |
| --- | --- | --- | --- | --- |
| | Male | Female | Male | Female |
| 20 | 21.91 ± 3.22 | 2.38 ± 0.55a | 547.84 ± 33.78 | 8.45 ± 1.65c |
| 10 | 10.51 ± 2.17 | 1.05 ± 0.28b | 262.73 ± 21.95 | 15.00 ± 2.86b |
| 5 | 8.13 ± 1.45 | 0.84 ± 0.24c | 203.30 ± 19.34 | 49.14 ± 13.27a |

TABLE 5

Female *H. armigera* moths caught by pheromone and control traps. All plots had 100 traps at 13 m interval.

| Trap Type | Unmated (%) | Mated (%) |
| --- | --- | --- |
| Female Sex Pheromone | 11.7 | 88.3 |
| Control | 51.7 | 48.3 |

Traps baited with female sex pheromone catch significantly more females than unbaited traps (Table 3).

Highest female catches occurred in the core as opposed to the perimeter of the plot. Trap density and thus pheromone concentration is also highest in the core.

Higher trap density leads to a lower female catch on a per trap basis, but a higher female catch on a per Ha basis.

Higher trap density leads to lower mean male catches on both a per trap and a per Ha basis (Table 4). Pheromone airborne concentration increases with trap density thus eliciting a mating disruption effect that leads to lower male catches.

Most of the females caught in the pheromone traps were mated, whereas females caught in control traps were ~50:50 virgin: mated. Thus it is mainly the mated female that is attracted to the female sex pheromone.

These conclusions are not necessarily in conflict with Saad & Scott. The fact that Su et al. observed more mated females in their pheromone traps is consistent with Saad & Scott's determination that the female virgin is repelled by its sex pheromone. Since Saad's experimental design was silent about attraction and it only reported a weak repellency of mated females by virgin females, this does not directly conflict with Su's observation that mated females are attracted to the female sex pheromone. The biological justification for this behaviour could be that mated females, which do not readily produce pheromones (see below), fly close to pheromone sources to increase mating chances with males attracted to the pheromone source. In other words, it piggybacks on the calling efforts of the virgin female. Another interpretation could be that the mated female flies towards the virgin female in order to oviposit on the calling substrate before the female virgin has a chance to mate.

It is also noteworthy that female *Helicoverpa* moths show short-range attraction to male sex pheromones, also referred to as hairpencil compounds (Hillier, N. K. & Vickers, N. J. The role of heliothine hairpencil compounds in female *Heliothis virescens* (Lepidoptera: Noctuidae) behavior and mate acceptance. Chem. Senses 29, 499-511 (2004)). Male sex pheromones from *H. virescens* (Teal, P. E. A. & Tumlinson, J. H. Isolation, identification and biosynthesis of compounds produced by male hairpencil glands of *Heliothis virescens* (F.) (Lepidoptera: Lepidoptera). J. Chem. Ecol. 15, 413-427 (1989)) and *H. sublexa* have been identified. Male *H. armigera* produce Z11-16:OH, which inhibits male upwind flight in wind tunnel assays, thus preventing conspecific males from competing for a single female (Huang, Y. et al. Male orientation inhibitor of cotton bollworm: identification of compounds produced by male hairpencil glands. Entomol. Sin. 3, 172-182 ST—Male orientation inhibitor of cotton (1996)). Relative attractancy of virgin and mated *Helicoverpa* females to the male sex pheromone has not been reported.

Because mated female *Helicoverpa* moths are attracted to the female sex pheromone, there will be an inherent tendency for mated females to attempt to migrate into a mating disruption field.

Mitchell et al. (Mitchell, E. R. et al. Capture of male and female cabbage loopers in field traps baited with synthetic sex pheromone. Environ. Entomol. 1, 525-526 (1972)) found that female *Trichoplusia ni* moths were captured by traps baited with a synthetic female sex pheromone. Birth (Birth, M. C. Responses of both sexes of *Trichoplusia ni* (Lepidoptera: Noctuidae) to virgin females and to synthetic pheromone. Ecol. Entomol. 2, 99-104 (1977)) reported a similar response of female moths to traps baited with virgin female *Trichoplusia ni*.

There is electroantennogram (EAG) evidence for female cotton bollworm perceiving its own sex pheromone. (Three Chinese papers referenced in Su et al.).

Pheromones that repel Lepidoptera females have been reported (Rothschild, M. & Schoonhoven, L. M. Assessment of egg load by *Pieris brassicae* (Lepidoptera: Pieridae). Nature 266, 352-355 (1977)).

Effect of mating on the calling behavior of female moths. *H. zea* female pheromone production and sexual receptivity are terminated after mating, but can resume the following night (Kingan, T. G. et al. The loss of female sex pheromone after mating in the corn earworm moth *Helicoverpa zea*: identification of a male pheromonostatic peptide. Proc. Natl. Acad. Sci. U.S.A. 92, 5082-5086 (1995)). Two 57 amino acid long pheromonostatic peptides (PSPs) in *H. zea* males' seminal fluid are responsible for triggering this refractory behavior in females. From Kingan et al: "Remating may occur in the following scotophase, at which time the paternity of subsequent progeny would depend on the extent of sperm precedence. Nevertheless, this temporary monogamy may confer some fitness on the male, since egg laying can be activated within a few hours of copulation; females may then oviposit 36% of their eggs in the first 24 h after mating."

In other moths it has been found that this refractory behavior in females is shortened or not triggered at all when females mate with previously-mated males. Copulation with multiply-mated males results in less of a pheromonostatic effect but fewer fertile eggs laid by females. The logical reasoning is that mating depletes the males of certain compounds that are not completely replaced. One embodiment of this invention is to co-apply the female sex pheromone and the male PSPs in order to enhance the efficacy of mating disruption in the field. PSPs can be thought of as a synergist with sex pheromones as they reduce calling in females, thus reducing females' ability to compete with synthetic sex pheromones being co-applied for mating disruption. This synergy could effectively make females invisible to the males and reduce the probability of mating. PSP would thus prevent mating from occurring even though a high local population of males and females may exist. The mode of delivery for the PSPs may involve a vaporization of the molecules in an air-borne spray which has been shown to allow the permeation of PSPs into insect haemolymph (Kennedy, R. Vestaron Corporation, Crops & Chemicals Conference, Raleigh, North Carolina, July 2015).

In one embodiment, the mating disruption in the method of delaying emergence of or reducing the number of one or more pests that may become resistant to one or more transgenic insecticidal traits and/or chemical insecticides in a field plot system further comprises applying one or more pheromonostatic peptides (PSPs). In one embodiment, the one or more PSPs are applied by vaporization. In another embodiment, each PSP is from a highly dispersive pest of the same species as each pest damaging the plants. In another embodiment, applying one or more PSPs enhances the mating disruption.

In another embodiment, the mating disruption in the method of rescuing one or more pests' susceptibility to one or more transgenic insecticidal traits and/or chemical insecticides in a field plot system further comprises applying one or more pheromonostatic peptides (PSPs). In one embodiment, the one or more PSPs are applied by vaporization. In another embodiment, each PSP is from a highly dispersive pest of the same species as each pest damaging the plants. In another embodiment, applying one or more PSPs enhances the mating disruption.

According to the present invention, another way to achieve the same effect is to use RNAi technology to hinder the expression of the pheromone biosynthesis-activating neuropeptide (PBAN). PBAN stimulates production of the female sex pheromone in female virgins. The 18-amino acid residue PBAN for *H. zea* has been characterized (Raina, A. K., et al. A pheromonotropic peptide of *Helicoverpa zea*, with melanizing activity, interaction with PBAN, and distribution of immunoreactivity. Arch. Insect Biochem. Physiol. 53, 147-57 (2003)). In one embodiment, the method comprises applying a mating disruption tactic and disrupting one or more pheromone biosynthesis-activating neuropeptides (PBANs) in the one or more pests. In another embodiment, disrupting one or more PBANs enhances mating disruption. In another embodiment, disrupting one or more PBANs comprises disrupting by RNA interference.

Techniques which can be employed in accordance with the present invention to knock down PBAN gene expression, include, but are not limited to: (1) disrupting a gene's transcript, such as disrupting a gene's mRNA transcript; (2) disrupting the function of a polypeptide encoded by a gene, or (3) disrupting the gene itself.

For example, antisense RNA, ribozyme, dsRNAi, RNA interference (RNAi) technologies can be used in the present invention to target RNA transcripts of one or more PBAN genes. Antisense RNA technology involves expressing in, or introducing into, a cell an RNA molecule (or RNA derivative) that is complementary to, or anti sense to, sequences found in a particular mRNA in a cell. By associating with the mRNA, the anti sense RNA can inhibit translation of the encoded gene product. The use of antisense technology to reduce or inhibit the expression of an insect gene has been described, for example, in Cabrera et al. (1987) Phenocopies induced with antisense RNA identify the wingless gene, Cell, 50(4): 659-663.

A ribozyme is an RNA that has both a catalytic domain and a sequence that is complementary to a particular mRNA. The ribozyme functions by associating with the mRNA (through the complementary domain of the ribozyme) and then cleaving (degrading) the message using the catalytic domain.

RNA interference (RNAi) is the process of sequence-specific, post-transcriptional gene silencing or transcriptional gene silencing in animals and plants, initiated by double-stranded RNA (dsRNA) that is homologous in sequence to the silenced gene. The RNAi technique is discussed, for example, in Elbashir, et al., Methods Enzymol. 26:199 (2002); McManus & Sharp, Nature Rev. Genetics 3:737 (2002); PCT application WO 01/75164; Martinez et al., Cell 110:563 (2002); Elbashir et al., supra; Lagos-Quintana et al., Curr. Biol. 12:735 (2002); Tuschl et al., Nature Biotechnol. 20:446 (2002); Tuschl, Chembiochem. 2:239 (2001); Harborth et al., J. Cell Sci. 114:4557 (2001); et al., EMBO J. 20:6877 (2001); Lagos-Quintana et al., Science 294:8538 (2001); Hutvagner et al., loc cit, 834; Elbashir et al., Nature 411:494 (2001).

The term "dsRNA" or "dsRNA molecule" or "double-strand RNA effector molecule" refers to an at least partially double-strand ribonucleic acid molecule containing a region of at least about 19 or more nucleotides that are in a double-strand conformation. The double-stranded RNA effector molecule may be a duplex double-stranded RNA formed from two separate RNA strands or it may be a single RNA strand with regions of self-complementarity capable of assuming an at least partially double-stranded hairpin conformation (i.e., a hairpin dsRNA or stem-loop dsRNA). In various embodiments, the dsRNA consists entirely of ribonucleotides or consists of a mixture of ribonucleotides and deoxynucleotides, such as RNA/DNA hybrids. The dsRNA may be a single molecule with regions of self-complementarity such that nucleotides in one segment of the molecule base pair with nucleotides in another segment of the molecule. In one aspect, the regions of self-complementarity are linked by a region of at least about 3-4 nucleotides, or about 5, 6, 7, 9 to 15 nucleotides or more, which lacks complementarity to another part of the molecule and thus remains single-stranded (i.e., the "loop region"). Such a molecule will assume a partially double-stranded stem-loop structure, optionally, with short single stranded 5' and/or 3' ends. In one aspect the regions of self-complementarity of the hairpin dsRNA or the double-stranded region of a duplex dsRNA will comprise an Effector Sequence and an Effector Complement (e.g., linked by a single-stranded loop region in a hairpin dsRNA). The Effector Sequence or Effector Strand is that strand of the double-stranded region or duplex which is incorporated in or associates with RISC. In one aspect the double-stranded RNA effector molecule will comprise an at least 19 contiguous nucleotide effector sequence, preferably 19 to 29, 19 to 27, or 19 to 21 nucleotides, which is a reverse complement to the RNA of PBANs, or an opposite strand replication intermediate, or the anti-genomic plus strand or non-mRNA plus strand sequences of PBANs. One skilled in the art will be able to design suitable double-strand RNA effector molecule based on the nucleotide sequences of PBANs in the present invention.

In some embodiments, the dsRNA effector molecule is a "hairpin dsRNA", a "dsRNA hairpin", "short-hairpin RNA" or "shRNA", i.e., an RNA molecule of less than approximately 400 to 500 nucleotides (nt), or less than 100 to 200 nt, in which at least one stretch of at least 15 to 100 nucleotides (e.g., 17 to 50 nt, 19 to 29 nt) is based paired with a complementary sequence located on the same RNA molecule (single RNA strand), and where said sequence and complementary sequence are separated by an unpaired region of at least about 4 to 7 nucleotides (or about 9 to about 15 nt, about 15 to about 100 nt, about 100 to about 1000 nt) which forms a single-stranded loop above the stem structure created by the two regions of base complementarity. The shRNA molecules comprise at least one stem-loop structure comprising a double-stranded stem region of about 17 to about 100 bp; about 17 to about 50 bp; about 40 to about 100 bp; about 18 to about 40 bp; or from about 19 to about 29 bp; homologous and complementary to a target sequence to be inhibited; and an unpaired loop region of at least about 4 to 7 nucleotides, or about 9 to about 15 nucleotides, about 15 to about 100 nt, about 100 to about 1000 nt, which forms a single-stranded loop above the stem structure created by the two regions of base complementarity. It will be recognized, however, that it is not strictly necessary to include a "loop region" or "loop sequence" because an RNA molecule comprising a sequence followed immediately by its reverse complement will tend to assume a stem-loop conformation even when not separated by an irrelevant "stuffer" sequence.

In one embodiment, the mating disruption in the method of delaying emergence of or reducing the number of one or more pests that may become resistant to one or more transgenic insecticidal traits and/or chemical insecticides in a field plot system further comprises disrupting one or more pheromone biosynthesis-activating neuropeptides (PBANs) in the one or more pests. In another embodiment, disrupting one or more PBANs enhances the mating disruption. In another embodiment, disrupting one or more PBANs comprises disrupting by RNA interference. In another embodiment, each PBAN is from a highly dispersive pest of the same species as each pest damaging the plants.

In one embodiment, the mating disruption in the method of rescuing one or more pests' susceptibility to one or more transgenic insecticidal traits and/or chemical insecticides in a field plot system further comprises disrupting one or more pheromone biosynthesis-activating neuropeptides (PBANs) in the one or more pests. In another embodiment, disrupting one or more PBANs enhances the mating disruption. In another embodiment, disrupting one or more PBANs comprises disrupting by RNA interference. In another embodiment, each PBAN is from a highly dispersive pest of the same species as each pest damaging the plants.

In one embodiment, the mating disruption in the method of delaying emergence of or reducing the number of one or more pests that may become resistant to one or more transgenic insecticidal traits and/or chemical insecticides in a field plot system further comprises applying one or more PSPs and disrupting one or more PBANs in the one or more pests.

In one embodiment, the mating disruption in the method of rescuing one or more pests' susceptibility to one or more transgenic insecticidal traits and/or chemical insecticides in a field plot system further comprises applying one or more PSPs and disrupting one or more PBANs in the one or more pests.

An individual gravid female is capable of laying 500 to 3000 eggs, which she deposits singly on leaf hairs and corn silk. Gravid females are therefore capable of ovipositing on many plants within a field. When moth populations are high, several females may lay eggs on a single ear, resulting in 6-8 eggs per sweet corn ear. Given that there can be an average of about one thousand eggs per female, there is inherent asymmetry in mating disruption.

Flying strength of gravid females. This is a purely empirical parameter that can only be determined in the field. It is species dependent and likely to change with region and season. The present invention is concerned with the flying strength of the mated females since an invading virgin female will be unable to mate and oviposit in the pheromone treated plot. Mitchell and McLaughlin showed that mating disruption in 12 ha plots was enough to suppress ovipositioning (but not explicitly damage control) for *Spodoptera frugiperda* (Mitchell, E. R. & J. R. McLaughlin. Suppression of mating and oviposition by fall armyworm and mating by corn earworm in corn, using air permeation technique. J. Econ. Entomol. 75, 270-274 (1982)), but not enough for *H. zea*, implying that *S. frugiperda* gravid females are weaker flyers than *H. zea*. Using flight mill studies, Armes et al. determined the mean cumulative distance flown by *H. armigera* to be 40 km for virgin females and 2 km for gravid females (Armes, N. J. & Cooter, R. J. Effects of age and mated status on flight potential of *Helicoverpa armigera* (Lepidoptera, Noctuidae). Physiol. Entomol. 16, 131-144 (1991)). Interestingly, the longest single distance flown by gravid females was only 0.2 km compared to 20 km for unmated females.

The general observation that mated females are weaker flyers than virgin females is referred to as the oogenesis-flight syndrome, which can be intuitively understood as the disposition of gravid females to minimize predation risk associated with travelling long distances and choosing to oviposit close to where mating occurred. The distance measured by flight mill studies are likely to be an overestimate because the moths are supported by a tether and are constantly being fed with sugar. That flight mill studies are not a good predictor of minimum plot size required for mating disruption is supported by the fact that Cydia pomonella gravid female was measured to fly a mean cumulative distance of 8.6 km and a single longest distance of 1 km (Schumacher, P. et al. Long flights in Cydia pomonella L. (Lepidoptera: Tortricidae) measured by a flight mill: influence of sex, mated status and age. Physiol. Entomol. 22, 149-160 (1997)), even though it is well known that C. pomonella mating disruption in areas of only 50 ha will provide adequate damage control (Witzgall, P., et al. Codling moth management and chemical ecology. Annu. Rev. Entomol. 53, 503-522 (2008)). Table 6 summarizes published studies on flying strength of female moths.

Ovipositioning pattern. The present invention accounts for ovipositioning at multiple sites versus at single sites. Maximum oviposition (51.6 eggs/female) was recorded for H. armigera on a variety of cotton (Gossypium hirsutum LH 900) in a contained field bioassay (Butter, N. S. and Singh, S. (1996) Ovipositional response of Helicoverpa armigera to different cotton genotypes, Phytoparasitica 24(2): 97-102). Torres and Ruberson observed that there were about 0.2-0.4 eggs per cotton plant during peak oviposition season for Heliothis and Helicoverpa cotton bollworms (Torres, J. B. and Ruberson, J. R. (2006) Spatial and temporal dynamics of oviposition behavior of bollworm and three of its predators in Bt and non-Bt cotton fields, Entomologia Experimentalis et Applicata 120: 11-22). An individual gravid female is capable of laying 500 to 3000 eggs, which she deposits singly on leaf hairs and corn silk. Gravid females are therefore capable of ovipositing on many plants within a field. When moth populations are high, several females may lay eggs on a single ear, resulting in 6-8 eggs per sweet corn ear. Given that there can be an average of about one thousand eggs per female, there is inherent asymmetry in mating disruption.

TABLE 6

Published studies on flying strengths of female moths.

| | | Mean cumulative distance flown (km) | | Longest single distance flown (km) | | |
|---|---|---|---|---|---|---|
| Scientific name | Common name | Virgin female | Gravid female | Virgin female | Gravid female | Reference |
| Helicoverpa armigera | Cotton bollworm | 39.9 (12 hr normalized) | 2.3 (12 hr normalized) | 19.9 | 0.2 | Armes et al. Phys. Entomo. 16, 131-144 (1991) |
| Pectinophora gossypiella | Pink bollworm | 20.6 (12 hr normalized) | | 16.1 (does not discriminate M/F) | | Huaiheng et al. Environ. Ent. 887-893 (2006) |
| Cydia pomonella | Codling moth | 10.3 (12 hr normalized) | 8.6 (12 hr normalized) | 5 | 1 | Schumacher et al. Phys. Entomo. 22, 149-160 (1997) |
| Plutella xylostella | Diamondback moth | 9.4 (12 hr normalized) | 7.3 (12 hr normalized) | | | Shirai, Y. Res. Popul. Ecol. 37, 269-277 (1995) |

It is likely that gravid female flying strength is also a function of what is being cultivated in the surroundings. For example, a mated female in a senescing maize field (i.e. R1 to R6) will likely show a greater tendency to migrate to nearby field in the silking stage (e.g. V10) with better sites for oviposition. Because Helicoverpa larvae are cannibalistic, ovipositioning in a late stage field, where the corn ears are already likely to be infested, would be disfavored by natural selection. This factor is amplified to other host crops due to the polyphagous behavior of Helicoverpa.

Helicoverpa spp. participate in long-range migratory flights by climbing to high altitudes and being carried by wind jets. John Westbrook (USDA-ARS College Station, Texas) determined the mating status of females in migratory flights by capturing female moths at high altitudes, and found that gravid females do not participate in such flights. Therefore, the local dispersive behavior of mated females in the vicinity of the pheromone treated plot is of primary concern.

The tarsi, abdomen, and mature chorionated eggs of mated female H. armigera contain several fatty acids, some of which (including but not limited to: C14:0, C16:0, C18:0, and C18:1) elicit strong electroantennogram responses from mated females (Liu, M., et al (2008) Oviposition deterrents from eggs of the cotton bollworm, Helicoverpa armigera (Lepidoptera: noctuidae): Chemical identification and analysis by electroantennogram. J. Insect Physiol. 54:656-662). Blends of these fatty acids, applied at a concentration of 0.05 µg/cm$^2$ on a substrate, significantly reduce oviposition in laboratory bioassays. Their corresponding methyl esters have been identified in larval frass and have similar oviposition-deterring effect. Similar blends of fatty acids have been shown to have oviposition deterring effects on intra- and interspecific females of several lepidopterans.

Several researchers have shown that host-plant volatile components can serve as attractants (reviewed in: Gregg et al. (2010) Development of a synthetic plant volatile-based attracticide for female noctuid moths. II. Bioassays of synthetic plant volatiles as attractants for the adults of the cotton bollworm, *Helicoverpa armigera* (Hubner) (Lepidoptera: Noctuidae). Aust. J. Entomol. 49:21-30), and can significantly increase lepidopterans' attraction to sex pheromones when detected in unison (example: Deng et al. (2004) Enhancement of attraction to sex pheromones of *Spodoptera exigua* by volatile compounds produced by host plants. J. Chem. Ecol 30:2037-2045). Fang and Zhang (2002) demonstrated that in addition to increasing attraction to sex pheromones, host-plant volatiles also positively influence oviposition preference (Fang, Y. and Zhang, Z. (2002) Influence of host-plant volatile components on oviposition behaviour and sex pheromone attractiveness to *H. armigera*. Acta Entomologica Sinica 45:63-67). Heptanal and benzaldehyde are two host-plant volatile components that significantly increase the attractiveness of an oviposition substrate among mated *H. armigera*. Additionally, corn silk is a preferred oviposition substrate for *Helicoverpa* spp., and the concentration of its associated volatile, ethylene, is positively correlated with calling behaviour in virgin female *H. zea*. Ethylene thus serves as a mating cue and it would logically follow that high concentrations of ethylene would increase the number of locally oviposited eggs.

Jin et al. found that crude extracts of male accessory glands (MAG) stimulated earlier egg maturation (P<0.001) and oviposition (the oviposition ratio was more than 2 times the ratio of the control). (Jin, Z-Y and Gong, H. Male accessory gland derived factors can stimulate oogenesis and enhance oviposition in *Helicoverpa armigera* (Lepidoptera: Noctuidae). Arch. Insect Biochem. Physiol. 46:175-185, 2001). They also found that proteinaceous components in crude extracts purified by fractionation and sub-fractionation in reverse phase high performance liquid chromatography stimulated earlier egg maturation (P<0.01) and oviposition (more than 2 times the ratio of the control). They called these the oogenesis and oviposition factors (OOSF). The mode of delivery for the OOSFs may involve a vaporization of the molecules in an air-borne spray which has been shown to allow the permeation of PSPs into insect haemolymph (Kennedy, R. Vestaron Corporation, Crops & Chemicals Conference, Raleigh, North Carolina, July 2015).

Orthogonality of olfactory receptors. Sex pheromones are sensed by dedicated odorant binding proteins (OBPs). This means that in the presence of mating disruption, male OBPs dedicated to sex pheromones are already saturated and female OBPs that sense these molecules may be saturated too. Because host finding and oviposition site selection is sensed by different OBPs, this allows attract-and-kill to occur simultaneously with mating disruption. As an example, an odorant-binding protein (OBP) found in the antennae and seminal fluid of *H. armigera* and *H. assulta* is associated with 1-dodecene, a known insect repellent (Sun et al. 2012 Expression in Antennae and Reproductive Organs Suggests a Dual Role of an Odorant-Binding Protein in Two Sibling *Helicoverpa* Species. PLoS ONE 7(1): e30040 (2012)). OBPs are involved in the perception and release of semiochemicals in insects, and thus this particular OBP may potentially be involved in the detection and delivery of oviposition deterrents. In *Spodoptera frugiperda*, a trifluoromethyl ketone acts as a pheromone analogue that competitively inhibits the binding of sex pheromones with their associated OBP, and thus reduces pheromone reception in males (Malo et al. 2013 Inhibition of the responses to sex pheromone of the fall armyworm, *Spodoptera frugiperda*. Journal of Insect Science, 13: 134). As these examples show, an understanding of the molecular structures of the odorant binding proteins can lead to novel attractants and repellents which will find use in the methods of the present invention.

In silico screening of novel semiochemicals by docking to OBPs. Computational structure-activity screen of thousands of compounds against OBPs in the target pest can be used to identify new attractants or repellents. See, for example, the work done on fruit fly odor receptors to identify alternative mosquito repellents to DEET (Kain et al. 2013 Odour receptors and neurons for DEET and new insect repellents. Nature, 502: 507-512), which used a high-throughput chemical informatics screen without knowing the 3D crystal structure of the OBP. Thus, for example, structural features shared by compounds demonstrated to be attractive or repellent to mated female pests can be used to screen a vast library of compounds in silico for the presence of these structural features. A training set of known mated female pest attractants or repellents can be assembled to computationally identify a unique subset of descriptors that correlate highly with either attraction or repellency. Also, compounds that may be safe for human use may be identified by applying the in silico screen to an assembled library having chemicals originating from plants, insects or vertebrate species, and compounds already approved for human use.

Gregg et al. (Gregg, P. C. et al. Development of a synthetic plant volatile-based attracticide for female noctuid moths. II. Bioassays of synthetic plant volatiles as attractants for the adults of the cotton bollworm, *Helicoverpa armigera* (Hübner) (Lepidoptera: Noctuidae). Aust. J. Entomol. 49, 21-30 (2010)) measured the attractiveness of synthetic equivalent of host and non-host plant volatiles to virgin females of *H. armigera*. A total of 34 different compounds were tested singly and as blends. These compounds included aromatic volatiles found in flowers, such as 2-phenylethanol and phenylacetaldehyde, and volatiles found in leaves, including green leaf volatiles and terpenoids. All of these compounds and their blends are incorporated here in their entirety. The attractiveness of these compounds on mated females was not measured in the Gregg et al. study.

Plant volatiles can be grouped into floral volatiles (fatty acid derivatives, mostly short-chain alcohols and acetates, which are products of nectar fermentation), green leaf volatiles (C6 fatty acid derivatives, straight chain alcohols, aldehydes and esters mostly present in leaves), aromatic compounds (cyclic C6 compounds and their derivatives, found in flowers and leaves) and isoprenoids (mono- and sesquiterpenes which can be found in both leaves and flowers) (Del Socorro, A. P. et al. Development of a synthetic plant volatile-based attracticide for female noctuid moths. I. Potential sources of volatiles attractive to *Helicoverpa armigera* (Hübner) (Lepidoptera: Noctuidae). *Australian Journal of Entomology,* 49: 10-20 (2010)).

It is also known that female moths are attracted to ethylene. Therefore, reagents such as ethenphos can be applied in the field to deliver ethylene in situ. Since it is further known that 1-methylcyclopropene (1-MCP) competes with an ethylene binding protein in plants, another aspect of this invention consists of spraying on the border as a way to attract females. Other synthetic volatiles could also work given that non-host volatiles are attractive to *Helicoverpa* female moths.

In one embodiment, the one or more semiochemicals or factors applied in the method of delaying emergence of or reducing the number of one or more pests that may become resistant to one or more transgenic insecticidal traits and/or chemical insecticides in a field plot system comprise oogenesis and oviposition factors (OOSFs). In another embodiment, the OOSFs are applied by vaporization. In another embodiment, the one or more semiochemicals or factors comprise one or more attractants. In another embodiment, the one or more attractants comprise one or more host plant chemical, non-host plant chemical, synthetic volatile chemical, or natural volatile chemical. In another embodiment, the one or more attractants are identified through binding to one or more pest odorant binding proteins. In another embodiment, the one or more attractants comprise one or more host plant volatile chemical. In another embodiment, the one or more host plant volatile chemical comprise heptanal or benzaldehyde. In another embodiment, the one or more attractants comprise one or more male pheromones. In another embodiment, the one or more attractants comprise one or more ovipositioning pheromones. In another embodiment, the one or more attractants comprise one or more female attractants. In another embodiment, the one or more female attractants comprise ethylene.

Attract-and-kill targeted at females. It is known in the art that noctuid moths, including *H. armigera*, are attracted to floral scents (Gregg, P. C. et al. Development of a synthetic plant volatile-based attracticide for female noctuid moths. II. Bioassays of synthetic plant volatiles as attractants for the adults of the cotton bollworm, *Helicoverpa armigera* (Hübner) (Lepidoptera: Noctuidae). Aust. J. Entomol. 49, 21-30 (2010)). It is further known that these floral scents can be mixed with a feeding stimulant (e.g. sugar) and an insecticide in an attract-and-kill formulation. According to the methods of the present invention, these formulations can be field applied to kill both male and female noctuid moths. However, the use of these formulations as a stand-alone method is limited because: (i) the floral scents also attract beneficial insects (e.g. pollinators), (ii) the residual activity of the insecticide is typically shorter than one week necessitating repeated applications throughout the season, and (iii) the floral scents have a short attraction range and thus the attract-and-kill formulation needs to be applied over large portions of the field.

In another embodiment, the method of delaying emergence of or reducing the number of one or more pests that may become resistant to one or more transgenic insecticidal traits and/or chemical insecticides in a field plot system further comprises applying an attract-and-kill tactic in the field plot, wherein said tactic reduces the number of one or more pests in the field plot. In another embodiment, applying an attract-and-kill tactic comprises applying one or more semiochemicals or factors and one or more insecticides. In another embodiment, the one or more semiochemicals or factors comprise one or more attractants. In another embodiment, the one or more attractants comprise one or more host plant chemical, non-host plant chemical, synthetic volatile chemical, or natural volatile chemical. In another embodiment, the one or more resistant pests are male or female.

In one embodiment of the present invention, the attract-and-kill product combination can be delivered as a broadcast spray or in the form of traps applied in the field at high density.

Commercial attract and kill products include Magnet® and Noctovi® (ISCA Technologies). Magnet® is a synthetic plant volatile-based attracticide for noctuid pests of agriculture (Del Socorro, A. P. et al. 2010). Noctovi® is an environmentally friendly semiochemical attractant and phagostimulant that can be mixed with insecticides and improves the efficacy and longevity of insecticides.

A variety of ingredients can be incorporated into the insect control formulations as optional additives. In one embodiment, an additive comprises an ingredient that either affects the release rate of a semiochemical from the formulation or otherwise affects the physical properties of the formulation and/or protect the formulation from weather conditions, for example. Such optional additives include, among others, emulsifiers, stickers, plasticizers, volatility suppressants, antioxidants, lipids, various ultraviolet blockers and absorbers, or antimicrobials.

In one embodiment, one or more additives are included in the formulation in a total amount of from about 0.001% to about 20% by weight of the total formulation, or any weight range within said weight range. For example, in another embodiment, one or more additive is included in the formulation in a total amount of from about 0.1% to about 10%, by weight of the total formulation. In yet another embodiment, one or more additive is included in the formulation in a total amount of from about 1% to about 6%, by weight of the total formulation.

The additives can be included, for example, in a pre-formulated carrier mixture that includes a carrier and the additives, which can then be blended with the semiochemical and insecticide to provide an insect control formulation. A pre-formulated carrier mixture can be made by combining the carrier mixture and selected additives in predetermined ratios or can be obtained commercially. For example, in one embodiment, the pre-formulated carrier mixture comprises a SPLAT™ matrix, which is commercially available from ISCA TECHNOLOGIES, INC. (Riverside, Calif.).

Further with regard to additives that can be included in an insect control formulation, in one embodiment, the formulation includes an emulsifier to impart or improve emulsification properties of the formulation. Examples of emulsifiers that can be used in alternate embodiments include lecithin and modified lecithins, mono- and diglycerides, sorbitan monopalmitate, sorbitan monooleate, sorbitan monolaurate, polyoxyethylene-sorbitan monooleate, fatty acids, lipids, and combinations thereof. The emulsifier can be selected from a wide variety of emulsifier products that are well known in the art and available commercially, including but not limited to, sorbitan monolaurate (anhydrosorbitol stearate, molecular formula $C_{24}H_{46}O_6$), ARLACEL 60, ARMOTAN MS, CRILL 3, CRILL K3, DREWSORB 60, DURTAN 60, EMSORB 2505, GLYCOMUL S, HODAG SMS, IONET S 60, LIPOSORB S, LIPOSORB S-20, MONTANE 60, MS 33, MS33F, NEWCOL 60, NIKKOL SS 30, NISSAN NONION SP 60, NONION SP 60, NONION SP 60R, RIKEMAL S 250, sorbitan c, sorbitan stearate, SORBON 60, SORGEN 50, SPAN 55, AND SPAN 60. Other sorbitan fatty acid ester that may be used include sorbitan monostearate, sorbitan tri stearate, sorbitan sesquioleate, sorbitan trioleate.

In one embodiment, an emulsifier is present in the formulation in an amount of up to about 10% by weight of the total formulation, or any range within said range. For example, in another embodiment, the formulation includes an emulsifier in an amount from about 1% to about 10% by weight of the total formulation. In yet another embodiment, the formulation includes an emulsifier in an amount from about 1% to about 6% by weight of the total formulation. In still another embodiment, the formulation includes an emulsifier in an amount from about 1% to about 5% by weight of the total formulation.

Plasticizers can affect physical properties of a formulation, such as, for example, to extend its resistance to degradation in the field. In one embodiment, the insect control formulation includes a plasticizer. Examples of suitable plasticizers include glycerin and soy oil. In one embodiment, a plasticizer is present in the formulation in an amount of up to about 40% by weight of the total formulation, or any range within said range. For example, in another embodiment, the formulation includes a plasticizer in an amount from about 1% to about 40% by weight of the total formulation. In yet another embodiment, the formulation includes a plasticizer in an amount from about 1% to about 25% by weight of the total formulation. In still another embodiment, the formulation includes a plasticizer in an amount from about 1% to about 15% by weight of the total formulation.

In another embodiment, the formulation includes at least one antioxidant that is operable to protect the formulation and/or one or more of its ingredients from degradation. Examples of suitable antioxidants for inclusion include, without limitation, vitamin E, BHA (butylated hydroxyanisole) and BHT (butylated hydroxytoluene). In one embodiment, at least one antioxidant is present in the formulation in an amount of up to about 3% by weight of the total formulation, or any range within said range. For example, in another embodiment, the formulation includes at least one antioxidant in an amount from about 0.1% to about 3% by weight of the total formulation. In yet another embodiment, the formulation includes at least one antioxidant in an amount from about 0.1% to about 2% by weight of the total formulation. In still another embodiment, the formulation includes at least one antioxidant in an amount from about 0.1% to about 1% by weight of the total formulation.

In another embodiment, the formulation further includes at least one ultraviolet blocker effective to protect the formulation and/or one or more of its ingredients from light degradation. Examples of suitable ultraviolet blockers for this use include beta-carotene and p-aminobenzoic acid. In one embodiment, at least one ultraviolet blocker is present in the formulation in an amount of up to about 3% by weight of the total formulation, or any range within said range. For example, in another embodiment, the formulation includes at least one ultraviolet blocker in an amount from about 0.5% to about 3% by weight of the total formulation. In yet another embodiment, the formulation includes at least one ultraviolet blocker in an amount from about 0.5% to about 2% by weight of the total formulation. In still another embodiment, the formulation includes at least one ultraviolet blocker in an amount from about 0.5% to about 1.5% by weight of the total formulation.

In another embodiment, the formulation further includes at least one antimicrobial ingredient to protect the formulation and/or one or more of its ingredients from microbial destruction. Examples of suitable antimicrobial ingredients include potassium sorbate, nitrates, nitrites, 1,2-benzisothiazolin-3-one (biocide ingredient in Proxel™ GXL; available from Arch Chemicals, Inc.) and propylene oxide. In one embodiment, at least one antimicrobial ingredient is present in the formulation in an amount of up to about 3% by weight of the total formulation, or any range within said range. For example, in another embodiment, the formulation includes at least one antimicrobial ingredient in an amount from about 0.1% to about 3% by weight of the total formulation. In yet another embodiment, the formulation includes at least one antimicrobial ingredient in an amount from about 0.1% to about 2% by weight of the total formulation.

Other compounds and materials may also be included in formulations described herein provided they do not substantially interfere with the attractant activity of the formulation. Whether or not an additive substantially interferes with the attractant activity can be determined by standard test formats, involving direct comparisons of efficacy of a given formulation without an added compound or material and a formulation that is otherwise the same, but with the added compound or material.

For example, additional bioactive ingredients can also be included in a formulation as described herein. The term "additional bioactive compound" is used herein to refer to compounds, other than those described above, that fall within one or more of the following categories: attractants, juvenile hormones, plant hormones, pesticides, fungicides, herbicides, nutrients, micronutrients, bacteria (such as *Bacillus thuringiensis*), insect pathogenic virus (such as celery looper virus), fertilizers, plant mineral supplements, or other ingredients that can be included in the formulation to meet specific needs of crop production. In one embodiment, one or more additional bioactive ingredient is included in an amount up to about 20% by weight based on the total formulation, or any range within said range. For example, in another embodiment, one or more additional bioactive ingredient is included in an amount up to about 10%, by weight. In yet another embodiment, one or more additional bioactive ingredient is included in an amount up to about 5%, by weight.

In yet another embodiment, the formulation also includes a visual attractant, such as, for example a food coloring or other coloring agent, a wide variety of which are known and available commercially. Other ingredients, such as, for example, adjuvants, humectants, viscosity modifiers can also be included.

In one embodiment, the method of delaying emergence of or reducing the number of one or more resistant pests in a field plot system further comprises applying one or more chemical insecticides comprising independent modes of action to different areas of the field plot.

Contact or feeding action insecticides are both viable options for use in the methods of the present invention. Thus Bt related insecticides, peptide insecticides, and virus-based insecticides are all contemplated for use in the methods of the present invention.

In one embodiment, the insecticide is an insecticide approved for use in organic farming. Examples of naturally-derived insecticides that have been approved for use on organic farms include, for example, *Bacillus thuringiensis*, pyrethrum, Spinosad, neem, and rotenone.

*Helicoverpa*

*Helicoverpa* is a genus of moth in the Noctuidae family. Species in the *Helicoverpa* genus include *H. armigera, H. assulta, H. atacamae, H. fletcheri, H. gelotopoeon, H. hardwicki, H. hawaiiensis, H. helenae, H. pallida, H. prepodes, H. punctigera, H. titicacae, H. toddi* and *H. zea. H. confusa* and *H. minuta* are two *Helicoverpa* species that are extinct.

*Helicoverpa armigera*

*H. armigera* is commonly known as the cotton bollworm when found outside the United States, or alternatively the "Old World (African) bollworm". The larvae of this moth feed on a wide range of plants, including economically important cultivated crops. This species is widespread in central and southern Europe, temperate Asia, Africa, Australia and Oceania, and has also recently been confirmed to have successfully invaded Brazil and the US. It is a migrant species, able to reach Scandinavia and other northern territories. The female cotton bollworm can lay several hundred eggs, distributed on various parts of the plant. Under favorable conditions, the eggs can hatch into larvae within three days and the whole life cycle can be completed in just over a month.

The cotton bollworm is a highly polyphagous species, being able to feed on many crops. It is a major pest in cotton. The most important crop hosts are tomato, cotton, pigeon pea, chickpea, *Sorghum* and cowpea. Other hosts include groundnut, okra, peas, field beans, soybeans, lucerne, *Phaseolus* spp., other Leguminosae, tobacco, potatoes, maize, flax, *Dianthus, Rosa, Pelargonium, Chrysanthemum, Lavandula angustifolia*, a number of fruit trees, forest trees and a range of vegetable crops. In Russia and adjacent countries, the larvae populate more than 120 plant species, favoring *Solanum, Datura, Hyoscyamus, Atriplex* and *Amaranthus* genera.

The greatest damage is caused to cotton, tomatoes, maize, chick peas, alfalfa and tobacco. In cotton crops, blooms that have been attacked may open prematurely and stay fruitless. When the bolls are damaged, some will fall off and others will fail to produce lint or produce lint of an inferior quality. Secondary infections by fungi and bacteria are common and may lead to rotting of fruits. Injury to the growing tips of plants may disturb their development, delay maturity and cause fruits to drop.

*Helicoverpa zea* (formerly *Heliothis zea*)

*Helicoverpa zea* (or *Heliothis zea*) is also commonly known as the corn earworm and the cotton bollworm in the United States. Thus, the species should not be confused with the aforementioned *H. armigera*, which is given the common name "cotton bollworm" outside of the United States and "old world bollworm" within the United States. Corn earworm is found throughout North America except for northern Canada and Alaska. In the eastern United States, corn earworm does not normally overwinter successfully in the northern states. It is known to survive as far north as about 40 degrees north latitude, or about Kansas, Ohio, Virginia, and southern New Jersey, depending on the severity of winter weather. However, it is highly dispersive, and routinely spreads from southern states into northern states and Canada. Thus, areas have overwintering, both overwintering and immigrant, or immigrant populations, depending on location and weather. In the relatively mild Pacific Northwest, corn earworm can overwinter at least as far north as southern Washington.

*Helicoverpa zea* is active throughout the year in tropical and subtropical climates, but becomes progressively more restricted to the summer months with increasing latitude. In northeastern states dispersing adults may arrive as early as May or as late as August due to the vagaries associated with weather; thus, their population biology is variable. The number of generations is usually reported to be one in northern areas such as most of Canada, Minnesota, and western New York; two in northeastern states; two to three in Maryland; three in the central Great Plains; and northern California; four to five in Louisiana and southern California; and perhaps seven in southern Florida and southern Texas. The life cycle can be completed in about 30 days.

Egg: Eggs are deposited singly, usually on leaf hairs and corn silk. The egg is pale green when first deposited, becoming yellowish and then gray with time. The shape varies from slightly dome-shaped to a flattened sphere, and measures about 0.5 to 0.6 mm in diameter and 0.5 mm in height. Fecundity ranges from 500 to 3000 eggs per female. The eggs hatch in about three to four days.

Larva: Upon hatching, larvae wander about the plant until they encounter a suitable feeding site, normally the reproductive structure of the plant. Young larvae are not cannibalistic, so several larvae may feed together initially. However, as larvae mature they become very aggressive, killing and cannibalizing other larvae. Consequently, only a small number of larvae are found in each ear of corn. Normally, corn earworm displays six instars, but five is not uncommon and seven to eight have been reported. Mean head capsule widths are 0.29, 0.47, 0.77, 1.30, 2.12, and 3.10 mm, respectively, for instars 1 to 6. Larval lengths are estimated at 1.5, 3.4, 7.0, 11.4, 17.9, and 24.8 mm, respectively. Development time averaged 3.7, 2.8, 2.2, 2.2, 2.4, and 2.9 days, respectively, for instars 1 to 6 when reared at 25° C. Butler (Butler Jr. G. D. (1976) Bollworm: development in relation to temperature and larval food. Environmental Entomology 5: 520-522) cultured earworm on corn at several temperatures, reporting total larval development times of 31.8, 28.9, 22.4, 15.3, 13.6, and 12.6 days at 20.0, 22.5, 25.0, 30.0, 32.0, and 34.0° C., respectively.

The larva is variable in color. Overall, the head tends to be orange or light brown with a white net-like pattern, the thoracic plates black, and the body brown, green, pink, or sometimes yellow or mostly black. The larva usually bears a broad dark band laterally above the spiracles, and a light yellow to white band below the spiracles. A pair of narrow dark stripes often occurs along the center of the back. Close examination reveals that the body bears numerous black thorn-like microspines. These spines give the body a rough feel when touched. The presence of spines and the light-colored head serve to distinguish corn earworm from fall armyworm, *Spodoptera frugiperda* (J. E. Smith), and European corn borer, *Ostrinia nubilalis* (Hubner). These other common corn-infesting species lack the spines and have dark heads. Tobacco budworm, *Heliothis virescens* (Fabricius), is a closely related species in which the late instar larvae also bear microspines. Although it is easily confused with corn earworm, it rarely is a vegetable pest and never feeds on corn. Close examination reveals that in tobacco budworm larvae the spines on the tubercles of the first, second, and eighth abdominal segments are about half the height of the tubercles, but in corn earworm the spines are absent or up to one-fourth the height of the tubercle. Younger larvae of these two species are difficult to distinguish, but Neunzig (1964) give a key to aid in separation (Neunzig H. H. (1964) The eggs and early-instar larvae of *Heliothis zea* and *Heliothis virescens* (Lepidoptera: Noctuidae). Annals of the Entomological Society of America 57: 98-102).

Pupa: Mature larvae leave the feeding site and drop to the ground, where they burrow into the soil and pupate. The larva prepares a pupal chamber 5 to 10 cm below the surface of the soil. The pupa is mahogany-brown in color, and measures 17 to 22 mm in length and 5.5 mm in width. Duration of the pupal stage is about 13 days (range 10 to 25) during the summer.

Adult: As with the larval stage, adults are quite variable in color. The forewings of the moths usually are yellowish brown in color, and often bear a small dark spot centrally. The small dark spot is especially distinct when viewed from below. The forewing also may bear a broad dark transverse band distally, but the margin of the wing is not darkened. The hind wings are creamy white basally and blackish distally, and usually bear a small dark spot centrally. The moth measures 32 to 45 mm in wingspan. Adults are reported to live for five to 15 days, but may survive for over 30 days under optimal conditions. The moths are principally nocturnal, and remain active throughout the dark period. During the daylight hours they usually hide in vegetation, but sometimes can be seen feeding on nectar. Oviposition commences about three days after emergence, continuing until death. Fresh-silking corn is highly attractive for oviposition but even ears with dry silk will receive eggs. Fecundity varies from about 500 to 3000 eggs, although feeding is a prerequisite for high levels of egg production. Females may deposit up to 35 eggs per day.

Corn earworm has a wide host range; hence, it is also known as "tomato fruitworm," "*Sorghum* headworm,"

"vetchworm," and "cotton bollworm." In addition to corn and tomato, perhaps its most favored vegetable hosts, corn earworm also attacks artichoke, asparagus, cabbage, cantaloupe, collard, cowpea, cucumber, eggplant, lettuce, lima bean, melon, okra, pea, pepper, potato, pumpkin, snap bean, spinach, squash, sweet potato, and watermelon. Not all are good hosts, however. Harding, for example, studied relative suitability of crops and weeds in Texas, and reported that although corn and lettuce were excellent larval hosts, tomato was merely a good host, and broccoli and cantaloupe were poor (Harding J. A. (1976) *Heliothis* spp.: seasonal occurrence, hosts and host importance in the lower Rio Grande Valley. Environmental Entomology 5: 666-668). Other crops injured by corn earworm include alfalfa, clover, cotton, flax, oat, millet, rice, *Sorghum*, soybean, sugarcane, sunflower, tobacco, vetch, and wheat. Among field crops, *Sorghum* is particularly favored. Cotton is frequently reported to be injured, but this generally occurs only after more preferred crops have matured. Fruit and ornamental plants may be attacked, including ripening avocado, grape, peaches, pear, plum, raspberry, strawberry, carnation, geranium, gladiolus, nasturtium, rose, snapdragon, and zinnia. In studies conducted in Florida, Martin et al. found corn earworm larvae on all 17 vegetable and field crops studied, but corn and *Sorghum* were most favoured (Martin P. B. et al. (1976) Relative abundance and host preferences of cabbage looper, soybean looper, tobacco budworm, and corn earworm on crops grown in northern Florida. Environmental Entomology 5: 878-882). In cage tests earworm moths preferred to oviposit on tomato over a selection of several other vegetables that did not include corn.

Such weeds as common mallow, crown vetch, fall panicum, hemp, horsenettle, lambsquarters, lupine, morningglory, pigweed, prickly sida, purslane, ragweed, Spanish needles, sunflower, toadflax, and velvetleaf, have been reported to serve as larval. However, Harding (1976) rated only sunflower as a good weed host relative to 10 other species in a study conducted in Texas. Stadelbacher indicated that crimson clover and winter vetch, which may be both crops and weeds, were important early season hosts in Mississippi (Stadelbacher E. A. (1981) Role of early-season wild and naturalized host plants in the buildup of the F1 generation of *Heliothis zea* and *H. virescens* in the Delta of Mississippi. Environmental Entomology 10: 766-770). He also indicated that cranesbill species were particularly important weed hosts in this area. In North Carolina, especially important wild hosts were toadflax and deergrass (Neunzig H. H. (1963) Wild host plants of the corn earworm and the tobacco budworm in eastern North Carolina. Journal of Economic Entomology 56: 135-139).

Adults collect nectar or other plant exudates from a large number of plants. Trees and shrub species are especially frequented. Among the hosts are *Citrus, Salix, Pithecellobium, Quercus, Betula, Prunus, Pyrus* and other trees, but also alfalfa; red and white clover; milkweed, and Joe-Pye weed and other flowering plants.

Corn earworm is considered by some to be the most costly crop pest in North America. It is more damaging in areas where it successfully overwinters, however, because in northern areas it may arrive too late to inflict extensive damage. It often attacks valuable crops, and the harvested portion of the crop. Thus, larvae often are found associated with such plant structures as blossoms, buds, and fruits. When feeding on lettuce, larvae may burrow into the head. On corn, its most common host, young larvae tend to feed on silks initially, and interfere with pollination, but eventually they usually gain access to the kernels. They may feed only at the tip, or injury may extend half the length of the ear before larval development is completed. Such feeding also enhances development of plant pathogenic fungi. If the ears have not yet produced silk, larvae may burrow directly into the ear. They usually remain feeding within a single ear of corn, but occasionally abandon the feeding site and search for another. Larvae also can damage whorl-stage corn by feeding on the young, developing leaf tissue. Survival is better on more advanced stages of development, however. On tomato, larvae may feed on foliage and burrow in the stem, but most feeding occurs on the tomato fruit. Larvae commonly begin to burrow into a fruit, feed only for a short time, and then move on to attack another fruit. Tomato is more susceptible to injury when corn is not silking; in the presence of corn, moths will preferentially oviposit on fresh corn silk. Other crops such as bean, cantaloupe, cucumber, squash, and pumpkin may be injured in a manner similar to tomato, and also are less likely to be injured if silking corn is nearby.

Although numerous natural enemies have been identified, they usually are not effective at causing high levels of earworm mortality or preventing crop injury. For example, in a study conducted in Texas, Archer and Bynum (1994) reported less than 1% of the larvae were parasitized or infected with disease (Archer T. L. and Bynum Jr. E. D. (1994) Corn earworm (Lepidoptera: Noctuidae) biology on food corn on the High Plains. Environmental Entomology 23: 343-348). However, eggs may be heavily parasitized. *Trichogramma* spp. (Hymenoptera: Trichogrammatidae), and to a lesser degree *Telenomus* spp. (Hymenoptera: Scelionidae), are common egg parasitoids. Common larval parasitoids include *Cotesia* spp., and *Microplitis croceipes* (Cresson) (all Hymenoptera: Braconidae); *Campoletis* spp. (Hymenoptera: Ichneumonidae); *Eucelatoria armigera* (Coquillett) and *Archytas marmoratus* (Townsend) (Diptera: Tachinidae).

General predators often feed on eggs and larvae of corn earworm; over 100 insect species have been observed to feed on *H. zea*. Among the common predators are ladybird beetles such as convergent lady beetle, *Hippodamia convergens* Guerin-Meneville, and *Coleomegilla maculata* DeGeer (both Coleoptera: Coccinellidae); softwinged flower beetles, *Collops* spp. (Coleoptera: Melyridae); green lacewings, *Chrysopa* and *Chrysoperla* spp. (Neuroptera: Chrysopidae); minute pirate bug, *Orius tristicolor* (White) (Hemiptera: Anthocoridae); and big-eyed bugs, *Geocoris* spp. (Hemiptera: Lygaeidae). Birds can also feed on earworms, but rarely are adequately abundant to be effective.

Within-season mortality during the pupal stage seems to be, and although overwintering mortality is often very high the mortality is due to adverse weather and collapse of emergence tunnels rather than to natural enemies. In Texas, *Steinernema riobravis* (Nematoda: Steinernematidae) has been found to be an important mortality factor of prepupae and pupae, but this parasitoid is not yet generally distributed. Similarly, *Heterorhabditis heliothidis* (Nematoda: Heterorhabditidae) has been found parasitizing corn earworm in North Carolina, but it has not been found widely. Both of the latter species are being redistributed, and can be produced commercially, so in the future they may assume greater importance in natural regulation of earworm populations.

Epizootics caused by pathogens may erupt when larval densities are high. The fungal pathogen *Nomuraea rileyi* and the *Helicoverpa zea* nuclear polyhedrosis virus are commonly involved in outbreaks of disease, but the protozoan *Nosema heliothidis* and other fungi and viruses also have been observed.

Sampling: Eggs and larvae often are not sampled on corn because eggs are very difficult to detect, and larvae burrow down into the silks, out of the reach of insecticides, soon after hatching.

Moths can be monitored with blacklight and pheromone traps. Both sexes are captured in light traps, whereas only males are attracted to the sex pheromone. Both trap types give an estimate of when moths invade or emerge, and relative densities, but pheromone traps are easier to use because they are selective. The pheromone is usually used in conjunction with an inverted cone-type trap. Generally, the presence of five to 10 moths per night is sufficient to stimulate pest control practices.

Insecticides: Corn fields with more than 5% of the plants bearing new silk are susceptible to injury if moths are active. Insecticides are usually applied to foliage in a liquid formulation, with particular attention to the ear zone, because it is important to apply insecticide to the silk. Insecticide applications are often made at two to six day intervals, sometimes as frequently as daily in Florida. Because it is treated frequently, and over a wide geographic area, corn earworm has become resistant to many insecticides. Susceptibility to *Bacillus thuringiensis* also varies, but the basis for this variation in susceptibility is uncertain. Mineral oil, applied to the corn silk soon after pollination, has insecticidal effects. Application of about 0.75 to 1.0 ml of oil five to seven days after silking can provide good control in the home garden.

Cultural practices: Trap cropping is often suggested for this insect; the high degree of preference by ovipositing moths for corn in the green silk stage can be used to lure moths from less preferred crops. Lima beans also are relatively attractive to moths, at least as compared to tomato. However, it is difficult to maintain attractant crops in an attractive stage for protracted periods. In southern areas where populations develop first on weed hosts and then disperse to crops, treatment of the weeds through mowing, herbicides, or application of insecticides can greatly ameliorate damage on nearby crops. In northern areas, it is sometimes possible to plant or harvest early enough to escape injury. Throughout the range of this insect, population densities are highest, and most damaging, late in the growing season. Tillage, especially in the autumn, can significantly reduce overwintering success of pupae in southern locations.

Biological control: The bacterium *Bacillus thuringiensis*, and steinernematid nematodes provide some suppression. Entomopathogenic nematodes, which are available commercially, provide good suppression of developing larvae if they are applied to corn silk; this has application for home garden production of corn if not commercial production (Purcell M. et al. (1992) Biological control of *Helicoverpa zea* (Lepidoptera: Noctuidae) with *Steinernema carpocapsae* (Rhabditida: Steinernematidae) in corn used as a trap crop. Environmental Entomology 21: 1441-1447). Soil surface and subsurface applications of nematodes also can affect earworm populations because larvae drop to the soil to pupate (Cabanillas H. E. and Raulston J. R. (1996) Evaluation of *Steinernema riobravis, S. carpocapsae*, and irrigation timing for the control of corn earworm, *Helicoverpa zea*. Journal of Nematology 28: 75-82). This approach may have application for commercial crop protection, but larvae must complete their development before they are killed, so some crop damage ensues.

*Trichogramma* spp. (Hymenoptera: Trichogrammatidae) egg parasitoids have been reared and released for suppression of *H. zea* in several crops. Levels of parasitism averaging 40 to 80% have been attained by such releases in California and Florida, resulting in fruit damage levels of about 3% (Oatman E. R. and Platner G. R. (1971) Biological control of the tomato fruitworm, cabbage looper, and hornworms on processing tomatoes in southern California, using mass releases of *Trichogramma pretiosum*. Journal of Economic Entomology 64: 501-506). The host crop seems to affect parasitism rates, with tomato being an especially suitable crop for parasitoid releases (Martin P. B. et al. (1976) Parasitization of two species of Plusiinae and *Heliothis* spp. after releases of *Trichogramma pretiosum* in seven crops. Environmental Entomology 5: 991-995).

Host plant resistance: Numerous varieties of corn have been evaluated for resistance to earworm, and some resistance has been identified in commercially available corn. Resistance is derived from physical characteristics such as husk tightness and ear length, which impede access by larvae to the ear kernels, or chemical factors such as maysin, which inhibit larval growth. Host plant resistance thus far is not completely adequate to protect corn from earworm injury, but it may prove to be a valuable component of multifaceted pest management programs. Varieties of some crops are now available that incorporate *Bacillus thuringiensis* toxin, which reduces damage by *H. zea*.

*Spodoptera*

*Spodoptera* is a genus of moths of the family Noctuidae. About 30 species are distributed across six continents. Many are insect pests, and the larvae are sometimes called armyworms.

*Spodoptera frugiperda*

*Spodoptera frugiperda*, commonly known as fall armyworm, is native to the tropical regions of the western hemisphere from the United States to Argentina. It normally overwinters successfully in the United States only in southern Florida and southern Texas. The fall armyworm is a strong flier, and disperses long distances annually during the summer months. It is recorded from virtually all states east of the Rocky Mountains. However, as a regular and serious pest, its range tends to be mostly the southeastern states. The life cycle is completed in about 30 days during the summer, but 60 days in the spring and autumn, and 80 to 90 days during the winter. The number of generations occurring in an area varies with the appearance of the dispersing adults. The ability to diapause is not present in this species. In Minnesota and New York, where fall armyworm moths do not appear until August, there may be but a single generation. The number of generations is reported to be one to two in Kansas, three in South Carolina, and four in Louisiana. In coastal areas of north Florida, moths are abundant from April to December, but some are found even during the winter months.

Egg: The egg is dome shaped; the base is flattened and the egg curves upward to a broadly rounded point at the apex. The egg measures about 0.4 mm in diameter and 0.3 m in height. The number of eggs per mass varies considerably but is often 100 to 200, and total egg production per female averages about 1500 with a maximum of over 2000. The eggs are sometimes deposited in layers, but most eggs are spread over a single layer attached to foliage. The female also deposits a layer of grayish scales between the eggs and over the egg mass, imparting a furry or moldy appearance. Duration of the egg stage is only two to three days during the summer months.

Larvae: There usually are six instars in fall armyworm. Head capsule widths are about 0.35, 0.45, 0.75, 1.3, 2.0, and 2.6 mm, respectively, for instars 1-6. Larvae attain lengths of about 1.7, 3.5, 6.4, 10.0, 17.2, and 34.2 mm, respectively, during these instars. Young larvae are greenish with a black head, the head turning orangish in the second instar. In the second, but particularly the third instar, the dorsal surface of the body becomes brownish, and lateral white lines begin to form. In the fourth to the sixth instars the head is reddish brown, mottled with white, and the brownish body bears white subdorsal and lateral lines. Elevated spots occur dorsally on the body; they are usually dark in color, and bear spines. The face of the mature larva is also marked with a white inverted "Y" and the epidermis of the larva is rough or granular in texture when examined closely. However, this larva does not feel rough to the touch, as does corn earworm, *Helicoverpa zea* (Boddie), because it lacks the microspines found in the similar-appearing corn earworm. In addition to the typical brownish form of the fall armyworm larva, the larva may be mostly green dorsally. In the green form, the dorsal elevated spots are pale rather than dark. Larvae tend to conceal themselves during the brightest time of the day. Duration of the larval stage tends to be about 14 days during the summer and 30 days during cool weather. Mean development time was determined to be 3.3, 1.7, 1.5, 1.5, 2.0, and 3.7 days for instars 1 to 6, respectively, when larvae were reared at 25° C. (Pitre H. N. and Hogg D. B. (1983) Development of the fall armyworm on cotton, soybean and corn. Journal of the Georgia Entomological Society 18: 187-194).

Pupa: Pupation normally takes place in the soil, at a depth 2 to 8 cm. The larva constructs a loose cocoon, oval in shape and 20 to 30 mm in length, by tying together particles of soil with silk. If the soil is too hard, larvae may web together leaf debris and other material to form a cocoon on the soil surface. The pupa is reddish brown in color, and measures 14 to 18 mm in length and about 4.5 mm in width. Duration of the pupal stage is about eight to nine days during the summer, but reaches 20 to 30 days during the winter in Florida. The pupal stage of fall armyworm cannot withstand protracted periods of cold weather. For example, Pitre and Hogg (1983) studied winter survival of the pupal stage in Florida, and found 51 percent survival in southern Florida, but only 27.5 percent survival in central Florida, and 11.6 percent survival in northern Florida.

Adult: The moths have a wingspan of 32 to 40 mm. In the male moth, the forewing generally is shaded gray and brown, with triangular white spots at the tip and near the center of the wing. The forewings of females are less distinctly marked, ranging from a uniform grayish brown to a fine mottling of gray and brown. The hind wing is iridescent silver-white with a narrow dark border in both sexes. Adults are nocturnal, and are most active during warm, humid evenings. After a preoviposition period of three to four days, the female normally deposits most of her eggs during the first four to five days of life, but some oviposition occurs for up to three weeks. Duration of adult life is estimated to average about 10 days, with a range of about seven to 21 days.

A comprehensive account of the biology of fall armyworm was published by Luginbill (Luginbill P. (1928) The Fall Armyworm. USDA Technical Bulletin 34. 91 pp.), and an informative synopsis by Sparks (Sparks A. N. (1979) A review of the biology of the fall armyworm. Florida Entomologist 62: 82-87). Ashley et al. (1989) presented an annotated bibliography (Ashley T. R. et al. (1989) The fall armyworm: a bibliography. Florida Entomologist 72: 152-202). A sex pheromone has been described (Sekul A. A. and Sparks A. N. (1976) Sex attractant of the fall armyworm moth. USDA Technical Bulletin 1542. 6 pp.).

This species seemingly displays a very wide host range, with over 80 plants recorded, but clearly prefers grasses. The most frequently consumed plants are field corn and sweet corn, *Sorghum*, Bermudagrass, and grass weeds such as crabgrass, *Digitaria* spp. When the larvae are very numerous they defoliate the preferred plants, acquire an "armyworm" habit and disperse in large numbers, consuming nearly all vegetation in their path. Many host records reflect such periods of abundance, and are not truly indicative of oviposition and feeding behavior under normal conditions. Field crops are frequently injured, including alfalfa, barley, Bermuda grass, buckwheat, cotton, clover, corn, oat, millet, peanut, rice, ryegrass, *Sorghum*, sugarbeet, sudangrass, soybean, sugarcane, timothy, tobacco, and wheat. Among vegetable crops, only sweet corn is regularly damaged, but others are attacked occasionally. Other crops sometimes injured are apple, grape, orange, papaya, peach, strawberry and a number of flowers. Weeds known to serve as hosts include bentgrass, *Agrostis* sp.; crabgrass, *Digitaria* spp.; Johnson grass, *Sorghum halepense*; morning glory, *Ipomoea* spp.; nutsedge, *Cyperus* spp.; pigweed, *Amaranthus* spp.; and sandspur, *Cenchrus tribuloides*.

There is some evidence that fall armyworm strains exist, based primarily on their host plant preference. One strain feeds principally on corn, but also on *Sorghum*, cotton and a few other hosts if they are found growing near the primary hosts. The other strain feeds principally on rice, Bermudagrass, and Johnson grass. Larvae cause damage by consuming foliage. Young larvae initially consume leaf tissue from one side, leaving the opposite epidermal layer intact. By the second or third instar, larvae begin to make holes in leaves, and eat from the edge of the leaves inward. Feeding in the whorl of corn often produces a characteristic row of perforations in the leaves. Larval densities are usually reduced to one to two per plant when larvae feed in close proximity to one another, due to cannibalistic behavior. Older larvae cause extensive defoliation, often leaving only the ribs and stalks of corn plants, or a ragged, torn appearance. Marenco et al. (1992) studied the effects of fall armyworm injury to early vegetative growth of sweet corn in Florida (Marenco R. J. et al. (1992) Sweet corn response to fall armyworm (Lepidoptera: Noctuidae) damage during vegetative growth. Journal of Economic Entomology 85: 1285-1292). They reported that the early whorl stage was least sensitive to injury, the midwhorl stage intermediate, and the late whorl stage was most sensitive to injury. Further, they noted that mean densities of 0.2 to 0.8 larvae per plant during the late whorl stage could reduce yield by 5 to 20 percent. Larvae also will burrow into the growing point (bud, whorl, etc.), destroying the growth potential of plants, or clipping the leaves. In corn, they sometimes burrow into the ear, feeding on kernels in the same manner as corn earworm, *Helicoverpa zea*. Unlike corn earworm, which tends to feed down through the silk before attacking the kernels at the tip of the ear, fall armyworm will feed by burrowing through the husk on the side of the ear. Cool, wet springs followed by warm, humid weather in the overwintering areas favor survival and reproduction of fall armyworm, allowing it to escape suppression by natural enemies. Once dispersal northward begins, the natural enemies are left behind. Therefore, although fall armyworm has many natural enemies, few act effectively enough to prevent crop injury.

Numerous species of parasitoids affect fall armyworm. The wasp parasitoids most frequently reared from larvae in the United States are *Cotesia Marginiventris* (Cresson) and *Chelonus texanus* (Cresson) (both Hymenoptera: Braconidae), species that are also associated with other noctuid species. Among fly parasitoids, the most abundant is usually *Archytas marmoratus* (Townsend) (Diptera: Tachinidae). However, the dominant parasitoid often varies from place to place and from year to year. Luginbill (1928) and Vickery (Vickery R. A. (1929) Studies of the fall armyworm in the Gulf coast region of Texas. USDA Technical Bulletin 138. 63 pp.) describe and picture many of the fall armyworm parasitoids. The predators of fall armyworm are general predators that attack many other caterpillars. Among the predators noted as important are various ground beetles (Coleoptera: Carabidae); the striped earwig, *Labidura riparia* (Pallas) (Dermaptera: Labiduridae); the spined soldier bug, *Podisus maculiventris* (Say) (Hemiptera: Pentatomidae); and the insidious flower bug, *Orius insidiosus* (Say) (Hemiptera: Anthocoridae). Vertebrates such as birds, skunks, and rodents also consume larvae and pupae readily. Predation may be quite important, as Pair and Gross (1984) demonstrated 60 to 90 percent loss of pupae to predators in Georgia (Pair S. D. and Gross H. R. Jr. (1984) Field mortality of pupae of the fall armyworm, *Spodoptera frugiperda* (J. E. Smith), by predators and a newly discovered parasitoid, *Diapetimorpha introita*. Journal of the Georgia Entomological Society 19: 22-26).

Numerous pathogens, including viruses, fungi, protozoa, nematodes, and a bacterium have been associated with fall armyworm (Gardner et al. 1984), but only a few cause epizootics. Among the most important are the *S. frugiperda* nuclear polyhedrosis virus (NPV), and the fungi *Entomophaga aulicae, Nomuraea rileyi*, and *Erynia radicans*. Despite causing high levels of mortality in some populations, disease typically appears too late to alleviate high levels of defoliation.

Sampling: Moth populations can be sampled with blacklight traps and pheromone traps; the latter are more efficient. Pheromone traps should be suspended at canopy height, preferably in corn during the whorl stage. Catches are not necessarily good indicators of density, but indicate the presence of moths in an area. Once moths are detected it is advisable to search for eggs and larvae. A search of 20 plants in five locations, or 10 plants in 10 locations, is generally considered to be adequate to assess the proportion of plants infested. Sampling to determine larval density often requires large sample sizes, especially when larval densities are low or larvae are young, so it is not often used.

Insecticides: Insecticides are usually applied to sweet corn in the southeastern states to protect against damage by fall armyworm, sometimes as frequently as daily during the silking stage. In Florida, fall armyworm is the most important pest of corn. It is often necessary to protect both the early vegetative stages and reproductive stage of corn. Because larvae feed deep in the whorl of young corn plants, a high volume of liquid insecticide may be required to obtain adequate penetration. Insecticides may be applied in the irrigation water if it is applied from overhead sprinklers. Granular insecticides are also applied over the young plants because the particles fall deep into the whorl. Some resistance to insecticides has been noted, with resistance varying regionally. Foster (1989) reported that keeping the plants free of larvae during the vegetative period reduced the number of sprays needed during the silking period (Foster R. E. (1989) Strategies for protecting sweet corn ears from damage by fall armyworms (Lepidoptera: Noctuidae) in southern Florida. Florida Entomologist 72: 146-151). The grower practice of concentrating the sprays at the beginning of the silking period instead of spacing the sprays evenly provided little benefit.

Cultural techniques: The most important cultural practice, employed widely in southern states, is early planting and/or early maturing varieties. Early harvest allows many corn ears to escape the higher armyworm densities that develop later in the season (Mitchell E. R. (1978) Relationship of planting date to damage by earworms in commercial sweet corn in north central Florida. Florida Entomologist 61: 251-255). Reduced tillage seems to have little effect on fall armyworm populations (All J. N. (1988) Fall armyworm (Lepidoptera: Noctuidae) infestations in no-tillage cropping systems. Florida Entomologist 71: 268-272), although delayed invasion by moths of fields with extensive crop residue has been observed, thus delaying and reducing the need for chemical suppression (Roberts P. M. and All J. N. (1993) Hazard for fall armyworm (Lepidoptera: Noctuidae) infestation of maize in double-cropping systems using sustainable agricultural practices. Florida Entomologist 76: 276-283).

Host plant resistance: Partial resistance is present in some sweet corn varieties, but is inadequate for complete protection.

Biological control: Although several pathogens have been shown experimentally to reduce the abundance of fall armyworm larvae in corn, only *Bacillus thuringiensis* presently is feasible, and success depends on having the product on the foliage when the larvae first appear. Natural strains of *Bacillus thuringiensis* tend not to be very potent, and genetically modified strains improve performance (All J. N. et al. (1996) Controlling fall armyworm infestations in whorl stage corn with genetically modified *Bacillus thuringiensis* formulations. Florida Entomologist 79: 311-317).

Spider Mites

Spider mites belong to the Acari (mite) family Tetranychidae, which includes about 1,200 species. They generally live on the undersides of leaves of plants and can cause damage by puncturing the plant cells to feed. Many species of spider mites may also spin protective silk webs to protect their colonies from predators. Spider mites are known to feed on several hundred species of plants.

Spider mites are less than 1 millimeter in size and vary in color. They lay small, spherical, initially transparent eggs which can be protected by silk webbing.

Hot, dry conditions are often associated with population build-up of spider mites. Under optimal conditions (approximately 27° C.), the two-spotted spider mite can hatch in as little as 3 days, and become sexually mature in as little as 5 days. One female can lay up to 20 eggs per day and can live for 2 to 4 weeks, laying hundreds of eggs. This accelerated reproductive rate allows spider mite populations to quickly develop resistance to pesticides, so chemical control methods can become ineffectual when the same pesticide is used over a prolonged period.

The best known member of the group is *Tetranychus urticae*, or the twospotted spider mite, which is dispersive and attacks a wide range of plants, including peppers, tomatoes, potatoes, beans, corn, *cannabis*, and strawberries. Dispersal of *Tetranychus urticae* is observed to be triggered by starvation, desiccation, wind and light, or in response to a heavily-infested plant (Li, J. and Margolies, D. C. (1994) Responses to direct and indirect selection on aerial dispersal behaviour in *Tetranychus urticae*. Heredity, 72: 10-22; Boykin, L. S. and Campbell, W. V. (1984) Wind Dispersal of the Twospotted Spider Mite (Acari: Tetranychidae) in North Carolina Peanut Fields. Environmental Entomology, 13(1): 221-227; Smitley, D. R. and Kennedy, G. G. (1985) Photo-oriented aerial-dispersal behavior of *Tetranychus urticae* (Acari: Tetranychidae) enhances escape from the leaf surface. Annals of the Entomological Society of America, 78(5): 609-614; Smitley, D. R. and Kennedy, G. G. (1988) Aerial dispersal of the two-spotted spider mite (*Tetranychus urticae*) from field corn. Experimental & Applied Acarology, 5(1): 33-46; Hussey, N. W. and Parr, W. J. (2011) Dispersal of the glasshouse red spider mite *Tetranychus urticae* Koch (Acarina, Tetranychidae). Entomologia Experimentalis et Applicata, 6(3): 207-214; Dicke, M. (1986) Volatile spider-mite pheromone and host-plant kairomone, involved in spaced-out gregariousness in the spider mite *Tetranychus urticae*. Physiological Entomology 11: 251-262).

Other species which can be important pests of commercial plants include *Panonychus ulmi* (fruit tree red spider mite) and *Panonychus citri* (*Citrus* red mite).

Sucking Pests

The three main taxonomic groups of sucking pests are: *thrips* (Thysanoptera), true bugs (Heteroptera [stink bugs, tarnished plant bugs, squash bugs]) and (spider) mites (Acarina). The sucking pests also include other Hemiptera like leaf/plant/tree hoppers, psyllids, aphids, whiteflies, mealybugs and scales. Sucking pests have piercing/sucking mouth parts to feed on sap. Some sucking insects inject toxic materials into the plant while feeding, and some transmit disease organisms. The southern green stink bug (*Nezara viridula*) and the neotropical brown stink bug (*Euschistus heros*) are two examples of very destructive sucking pests, especially in South American soybeans and other legumes grown in tropical and subtropical regions. The damage caused by *E. heros* when uncontrolled can get up to 30% on soybean (Vivan and Degrande (2011) Pragas da soj a In: Boletim de pesquisa de soja ($1^{st}$ ed., p. 297). Rondonopolis: Fundacao M T. (Boletim, 15)). *Nezara viridula*, however, is considered significantly more destructive, as it is more polyphagous and has a wider geographical range. Plants being attacked by sap-feeders will take on a shiny look and sticky feel. Plant symptoms include: plant distortion (leaf and stem twisting and curling, dead spots); excrement deposits (tar spots, honeydew and sooty mold); and foliage discoloration (spots and stipples, yellowing and bronzing).

The engineering of plants to express the insecticidal *Bacillus thuringiensis* (Bt) toxins have allowed effective control of lepidopteran pests such as the corn rootworm. However, phloem sap-sucking insects, such as aphids, whiteflies, planthoppers and plant bugs, have evolved from minor pests to major pests, because these is no Bt toxin with adequate insecticidal effects on these kinds of pests. Control of sucking insects with insecticides is not always effective. RNAi could be more effective against the adults of Pentatomidae pests (like *N. viridula* and *E. heros*) than with lepidopterans, due to their longer reproductive period. This extended adult period gives the introduced ds/siRNA time to influence the synthesis of new proteins and thus affect the behavior of the reproductive adults. While mating disruption might not be effective with pentatomids, an attract and RNAi-kill could be an effective way to control *N. viridula* and *E. heros* pest populations. Female *E. heros* are attracted to lures of methyl 2,6,10-trimethyltridecanoate (TMTD; Borges et al. (2001) Monitoring the Neotropical brown stink bug *Euschistus heros* (F.) (Hemiptera: Pentatomidae) with pheromone-baited traps in soybean fields. J. Appl. Entomol. 135). Females, males, and late-stage larvae of *N. viridula* are attracted to a male-produced pheromone, (Z)-α-bisabolene (17%), trans- and cis-1,2-epoxides of (Z)-α-bisabolene (44 and 15%, respectively), (E)-nerolidol (1.4%), and n-nonadecane (7.4%) (Aldrich et al. (2005) Pheromone strains of the Cosmopolitan pest, *Nezara viridula* (heteroptera: Pentatomidae) J. Exp. Zool 244(1)171-175). Food substrate at these lures can be treated with an RNAi to effect the mortality or reproductive behaviors of the attracted females. The use of pheromones and ds/siRNA specific to a particular species, ensures that there will be no non-target effects.

EXAMPLES

Example 1

Lab experiment: Show that RR and RS individuals are as attracted to the pheromone as SS individuals.

Without DNA-based screening methods, the genotype of sampled moths (collected from eggs) can be determined based on differences in their mortality, growth inhibition, and total fecundity when reared on artificial diets laced with the resisted insecticidal toxin (as in Bernardi et al. Cross-Resistance between Cry1 Proteins in Fall Armyworm (*Spodoptera frugiperda*) May Affect the Durability of Current Pyramided Bt Maize Hybrids in Brazil, PLoS ONE 10(10): e0140130 (2015)). Wild-caught adults will be reared in the lab to produce susceptible (SS) and resistant (RR) strains. The heterozygous strain will be obtained by reciprocal crosses between these RR and SS strains. Exposing these genotypes to certain concentrations of Cry1A (for example) and quantifying their survivability will establish a diagnostic threshold (resistant ratio) by which to determine the genotype of experimental moths obtained from the field that will have been exposed to both transgenic insecticidal traits and chemical insecticides. The attraction of these genotypes to pheromones will be studied in wind-tunnels and y-tubes to determine if they show different behavioural responses.

Example 2

Cage and field experiment: Show that mating disruption dose is independent of genotype.

The genotypes characterized in Example 1 will be released in the field for mating disruption experiments. The goal is to show that the pheromone dose required to achieve trap-catch shutdown, i.e. 100% mating disruption, is the same for RR, RS and SS genotypes.

Example 3

Field experiment to show trait rescue: responsive strategy.

In an area where resistance is well established, the responsive strategies described above will be used across multiple crop cycles in order to rescue a transgenic or chemical insecticide. Year-round sites are preferred in order to enable sequential crop cycles.

Mathematical models will be used to model all variables and scenarios described above before going to the field in order to shortlist key variables and thus zoom into the key experiments.

Example 4: In Silico Modeling—Benefit of a Refuge in Conjunction with MD

Figure 2:
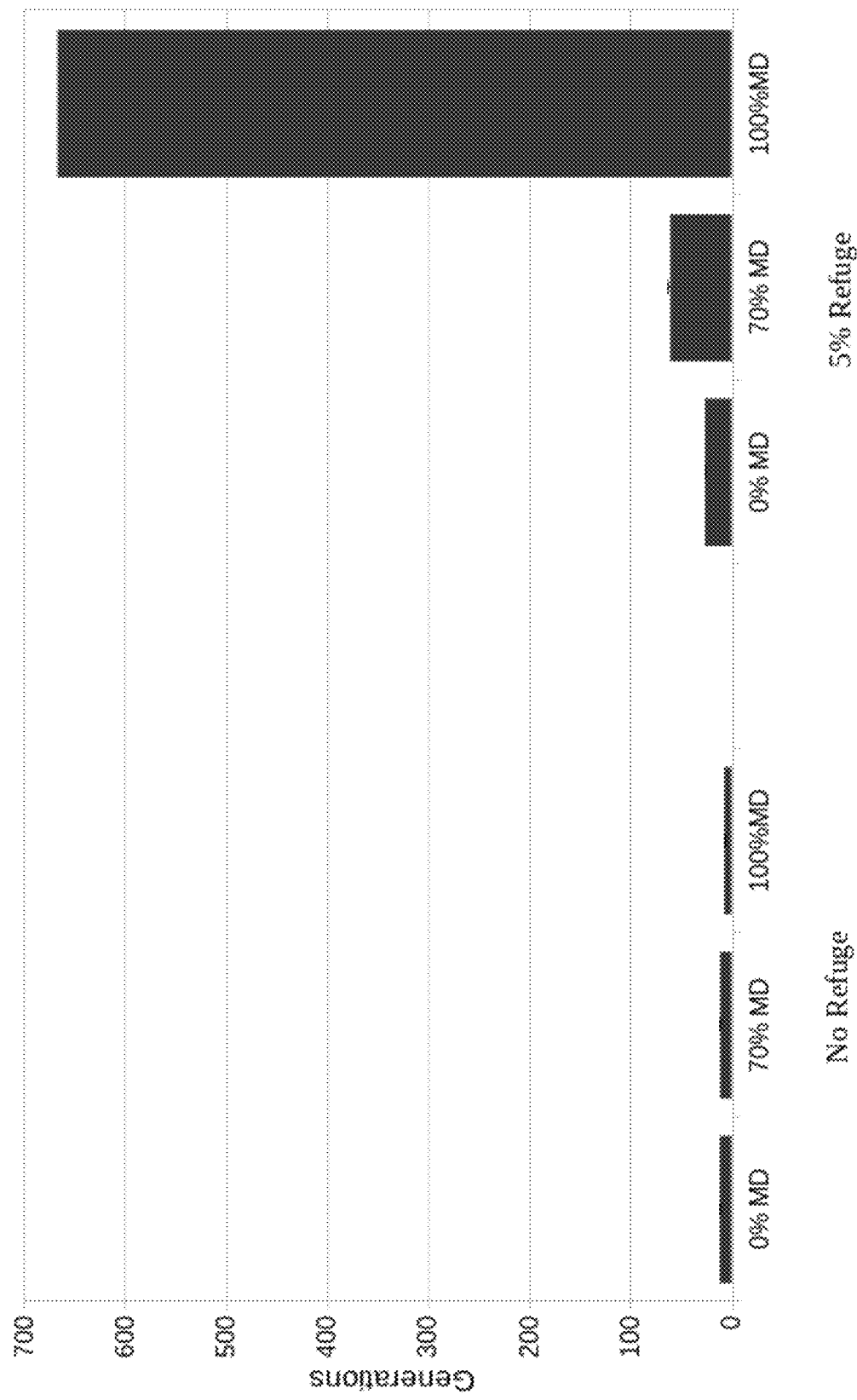
FIG. 2 shows the interaction of the presence of refuge and the rate of resistance evolution in the presence of mating disruption.

The present model was created to ascertain whether mating disruption (MD) can work as an insect resistance management tool in the absence of a refuge. According to the model, in the absence of a source of susceptible insects, mating disruption leads to very good pest management, but generally has no impact on the rather rapid evolution of resistance. That is, in the absence of refuges, one basically defaults back to basic selection equations with simultaneous selection at independent loci (FIG. 2). With 100% MD and a 5% refuge, the model predicts very good results.

Example 5: In Silico Modeling of Responsive Strategy—Utilizing MD to Rescue Traits The present model was created to ascertain whether mating disruption can be used to rescue traits. According to the model, in the absence of fitness costs, mating disruption cannot rescue traits, as mating disruption by itself cannot generate selection (assuming there is no correlation between mating success and selection for Bt resistance). However, MD can modify the rate at which allele frequencies change though demographic changes in populations, but it does not actually create selective forces. As has been demonstrated, under some circumstances, mating disruption can alter rates of resistance evolution. If the impact of fitness costs is constant, then the conditions under which mating disruption slows the evolution of resistance are also those in which there might be some possibility of increasing the impacts of fitness costs. By decreasing the selective forces increasing a gene's frequency, while the fitness costs that reduce a gene frequency remain constant, the rate of change of an allele could be altered, perhaps even leading to a decrease in its frequency. This could perhaps result in trait rescue or at least further delay the evolution of resistance.

Example 6: In Silico Modeling—Impact of Market Penetration/Adoption and Refuge Compliance The present model evaluated market penetration (i.e. adoption of MD practice) at 70% and 100% mating disruption, in either corn or corn and soy. The basic simulation strategy considered: no mating disruption, 5% sprayed refuge, 75% of area planted with soybeans and 25% of area planted with corn (NMD); mating disruption on 100% of Bt corn (MDC); mating disruption on 100% of Bt corn as well as on 100% of Bt soybeans (MDCS); mating disruption on 70% of Bt corn (MDC7); and mating disruption on 70% of Bt corn as well as on 70% of Bt soybeans (MDCS7). The simulation included 400 100-hectare (ha) fields, 100 of which were planted with corn and 300 of which were planted with soybean. The model assumed that: (a) two crop cycles are planted per year, each lasting about 150 days (or 5 generations of Sf). Over the course of a year, there are 300 days/year with crop cover (10 generations), and the crop in the field doesn't change over the course of a year, or between years; (b) growers are unlikely to plant more refuge than recommended, but they will often plant less (lower compliance). The model simulated both 100% compliance and 50% compliance. In the latter case, there was a 2.5% sprayed refuge present when both corn and soy were planted as two gene (Cry1A.105+Cry2Ab2) varieties. A 5% sprayed refuge at 100% compliance would be equal to a 20% sprayed refuge with 25% compliance; (c) all Bt corn has 2 genes active against $Spodoptera$ $frugiperda$ (Sf); (d) Bt soybeans are launched with a single protein that controls SI When resistance evolves to this single toxin, Bt soybeans are modified to include Bt corn traits. (e) A modest number of chemical insecticide applications were made on both Bt and refuge fields provided economic injury levels were reached, which, for $Spodoptera$ $frugiperda$ (Sf) pressure, is about 15,000 adults/ha, 1 individual female/6.7 plants, not including eggs.

Figure 3:
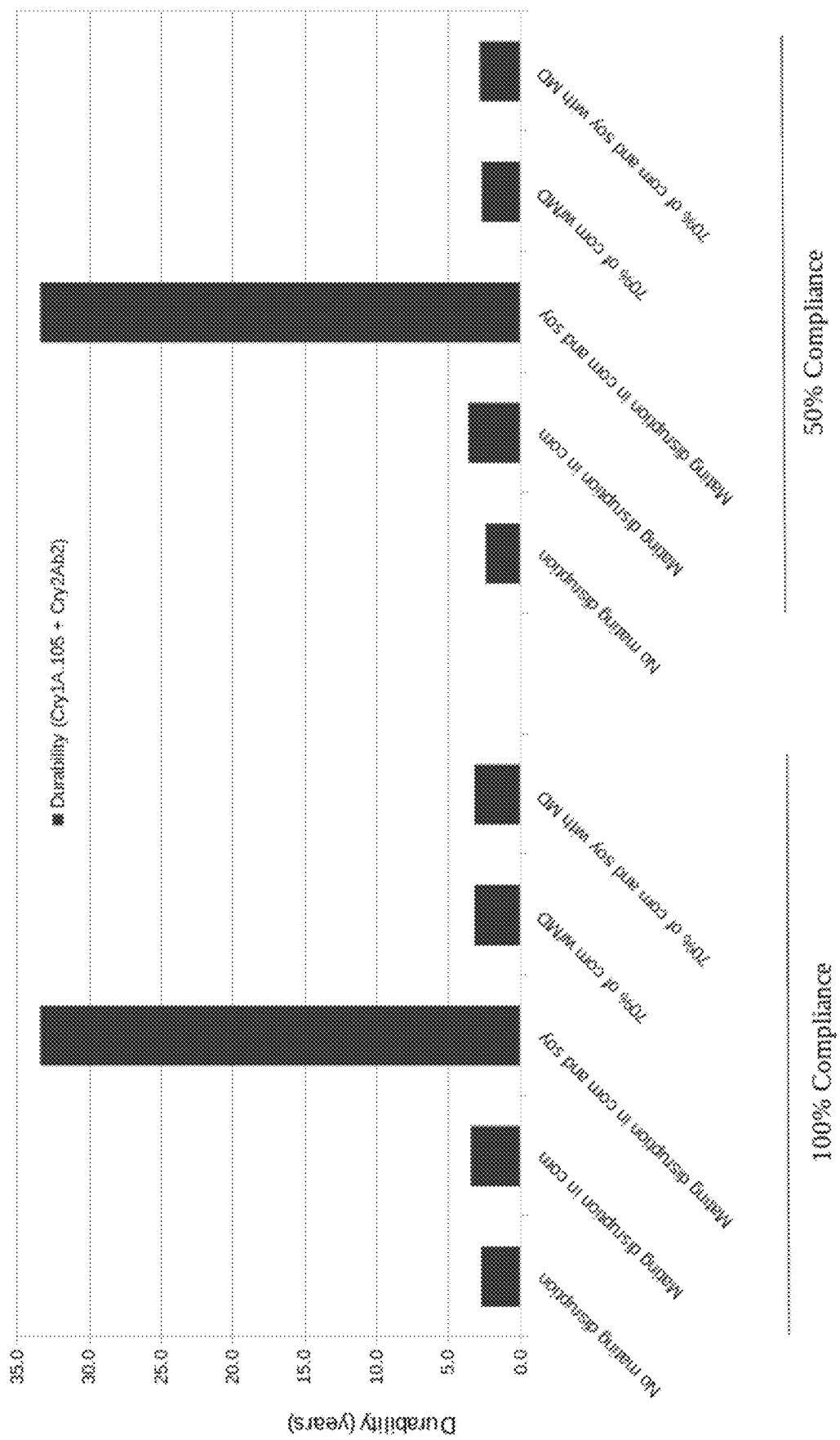
FIG. 3 shows the impact of refuge compliance and market penetration on the rate of *Helicoverpa zea* resistance evolution in fields of corn and soy with and without mating disruption.

In $Helicoverpa$ $zea$, there was little impact of mating disruption on the evolution of resistance unless mating disruption was used on 100% of Cry1A.105+Cry2Ab2 corn and soy. The model predicts that at 70% market penetration, MD does little to improve IRM, while at 100% market penetration, there is a tremendous advantage to combining MD with refuges (FIG. 3).

Figure 4:
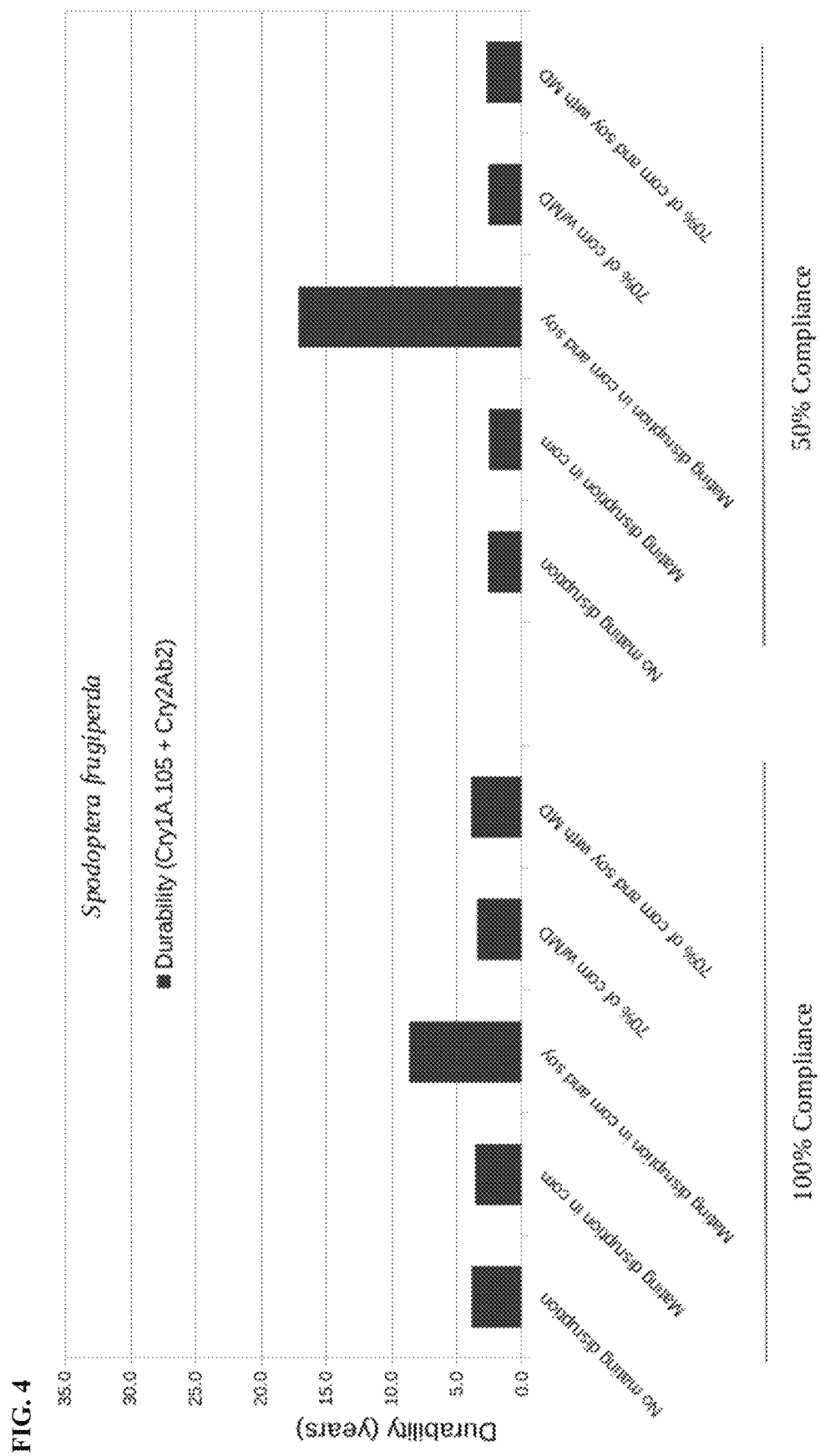
FIG. 4 shows the impact of refuge compliance and market penetration on the rate of *Spodoptera frugiperda* resistance evolution in fields of corn and soy with and without mating disruption.

The results from $Spodoptera$ $frugiperda$ at extremely high growth rates (where mortality was not factored in) were similar (FIG. 4). Mating disruption had a small impact on the evolution of resistance unless it was used on 100% of the Cry1A.105+Cry2Ab2 fields (both corn and soy). There was little impact of decreased refuge compliance. Thus, there was little advantage of increasing refuge size, at least when they are sprayed refuges. Simulations with more reasonable growth rates provided even more optimistic results, e.g., see FIG. 10.

Figure 5:
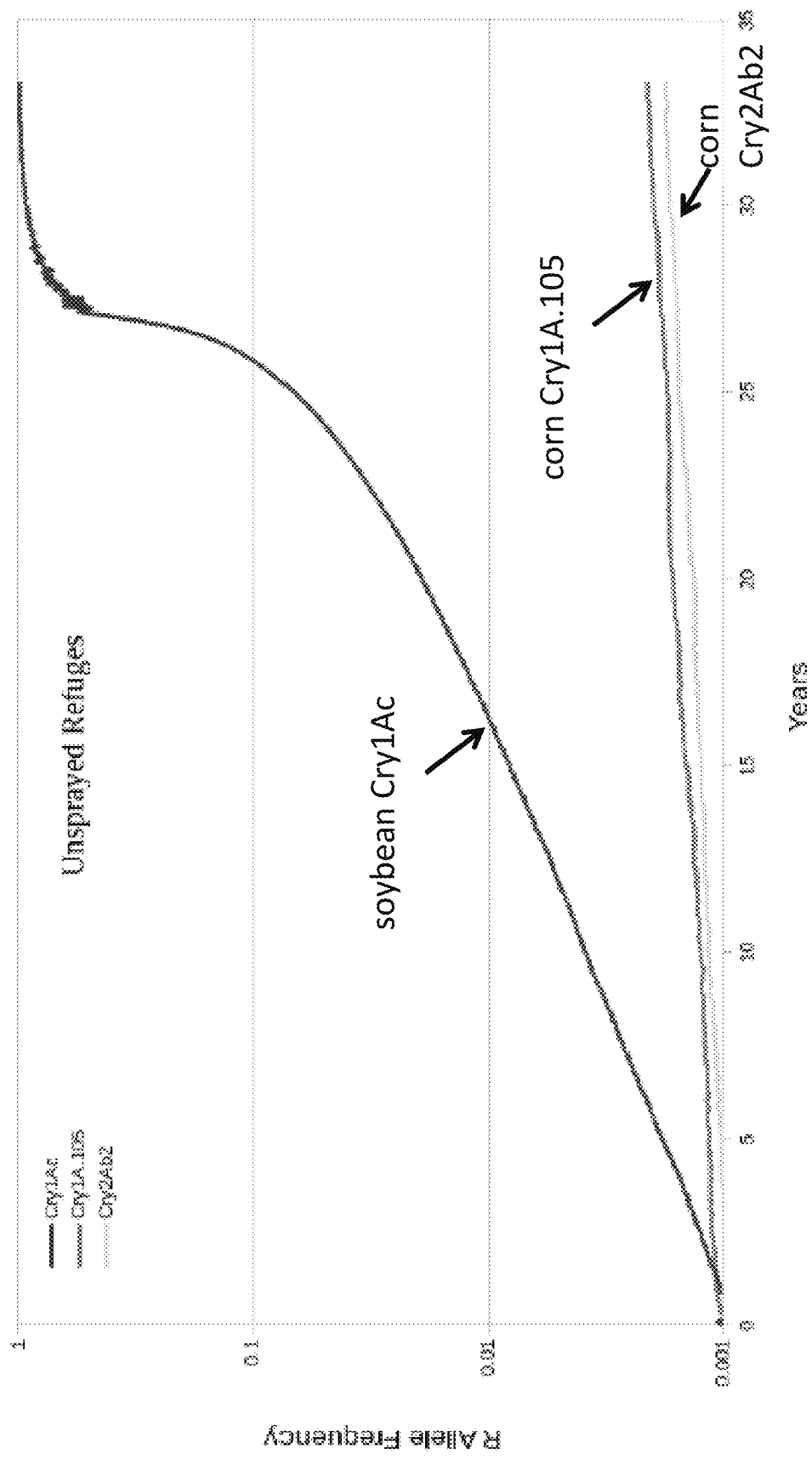
FIG. 5 shows resistance allele changes when 5% unsprayed refuge is simulated for both the Cry1Ac soy and Cry1A.105+Cry2Ab2 corn. There was 100% mating disruption on both corn and soy.

When refuges were unsprayed the durability of crops was significantly increased by an average of 2.98 fold (FIG. 5). This scenario was modelled for $Spodoptera$ $frugiperda$ at extremely high growth rates.

Thus, the model data predicts that the durability of Cry1Ac soy goes from less than 2 years with sprayed refuges and no mating disruption to more than 25 years with unsprayed refuges and 100% market penetration of mating disruption on corn and soy.

Therefore, the model illustrates that with very high market penetration of mating disruption the durability would be quite long, over 30 years with a two gene+MD strategy.

Under those circumstances, one might consider reduction in refuge size (and hence increase market penetration of the MD product) or one might consider it as additional buffer for a minimal IRM strategy.

There is a key trade-off between refuge size and trait durability. If MD increases, IRM can use the reduced rate of resistance evolution to increase durability but keep the refuge size the same, or decrease refuge size and keep the durability the same.

Figure 6:
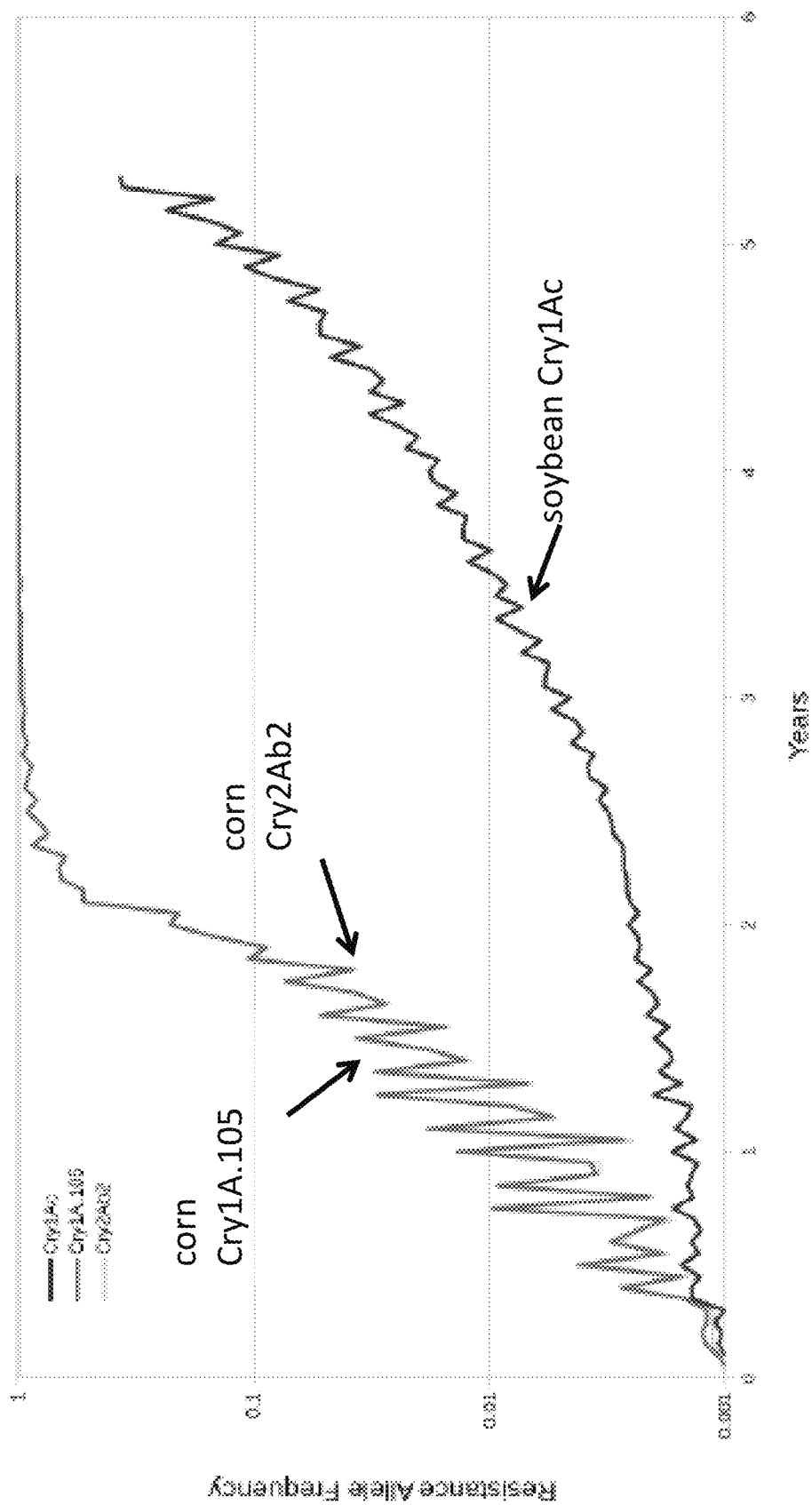
FIG. 6 shows resistance evolution when mating disruption is used on single gene soy and not on dual gene corn. A 5% sprayed refuge was simulated.

Example 7: In Silico Modeling of Preemptive Strategy—the Ability of MD to Delay the Development of Resistance to Transgenic Insecticidal Crops As evidence of the ability of MD to delay resistance evolution, a model was run with simulations for mating disruption in soy, but not corn. Recall that resistance in the default simulations always evolved first to the single gene Bt-soy and then more slowly to the dual gene Bt-corn. When mating disruption is instead used on soy but not corn, this pattern is reversed, and resistance first evolves to the dual gene corn (FIG. 6). The figure emphasizes that there is benefit in mating disruption, but it is difficult to assess because the overall refuge size is minimal. Thus, mating disruption can improve the efficiency of a refuge, but it cannot replace a refuge. When refuges are small and routinely sprayed, mating disruption makes large differences in durability only when conditions are optimal and mating disruption is applied to 100% of fields planted to the transgenes one is trying to protect.

Example 8: In Silico Modeling—Swapping Genetic Traits in Planted Crop

Figure 7:
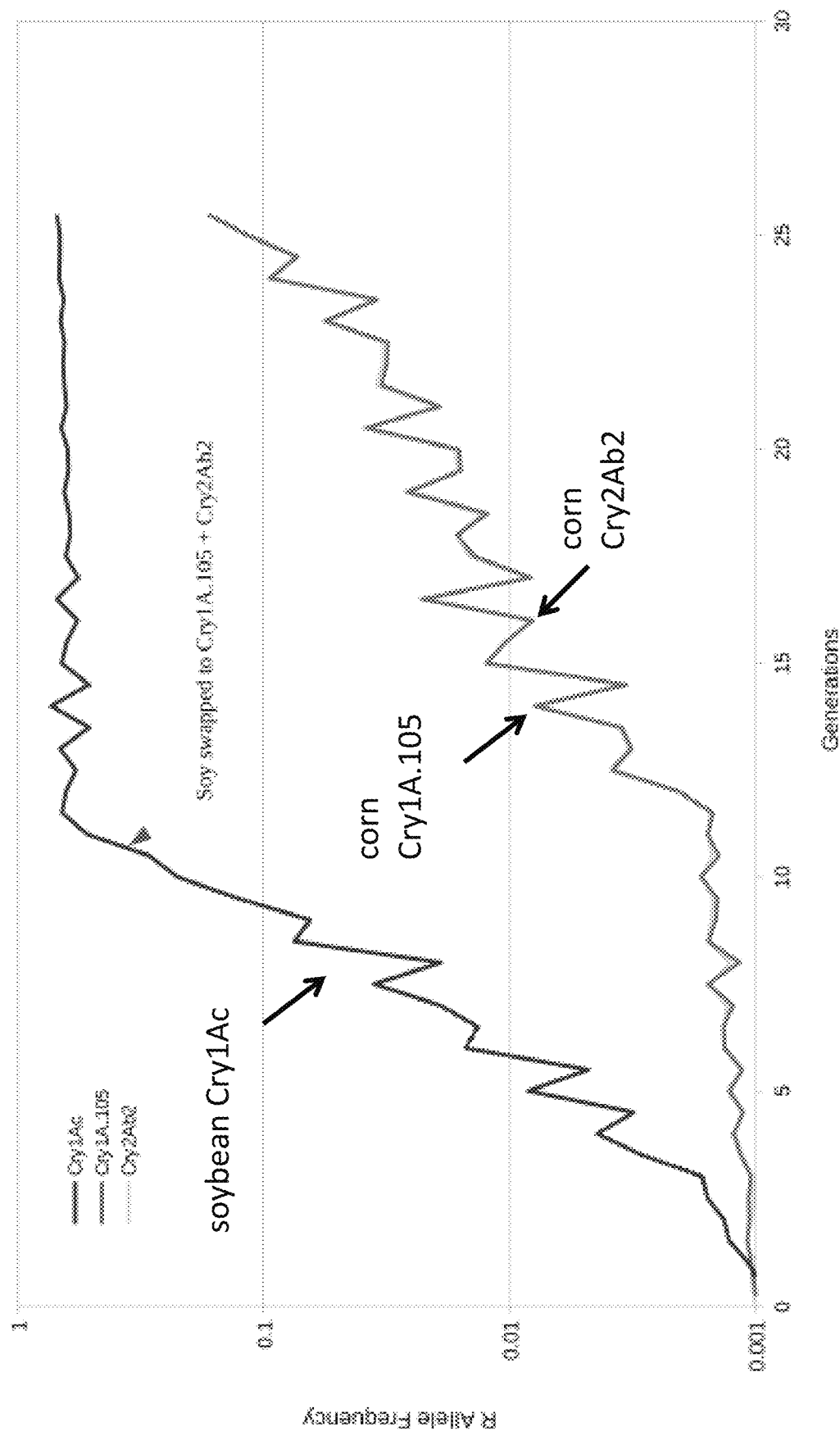
FIG. 7 shows evolution of resistance when soy is first planted as Cry1Ac soy and swapped to Cry1A.105+Cr2Ab2 once resistance to Cry1Ac evolves.

The present model demonstrates the evolution of resistance when soy is first planted as Cry1Ac soy and swapped to Cry1A.105+Cr2Ab2 once resistance to Cry1Ac evolves (FIG. 7). Resistance in corn is impacted when soy is switched (after about 12 years) to have the same toxins as corn.

Figure 8:
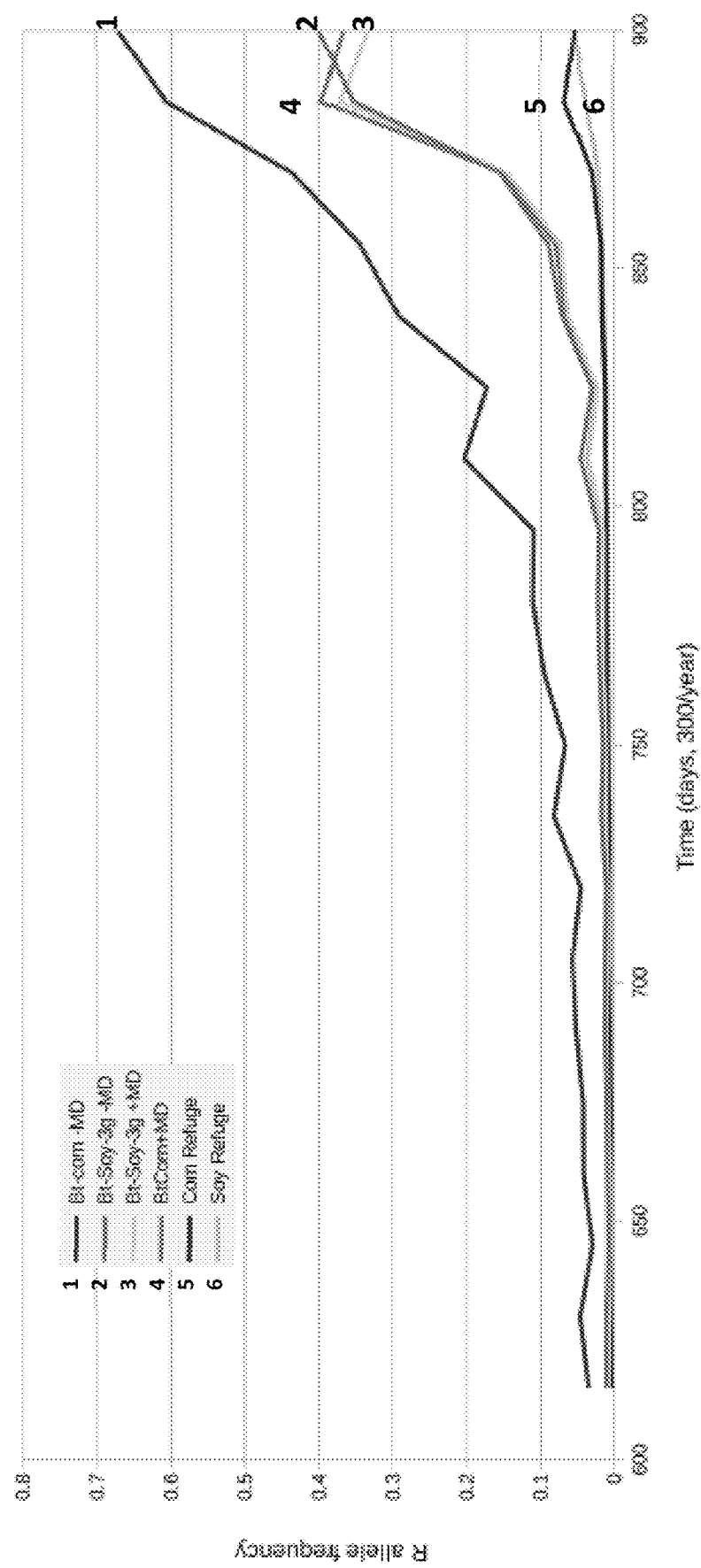
FIG. 8 shows resistance allele frequencies over time when there is only 70% market penetration of the mating disruption strategy. Bt-corn without mating disruption always has the highest resistance allele frequencies. Mating disruption fields, because adults produced in those fields cannot mate unless they leave that field, always have a resistance allele frequency that reflects the genetics of immigrant moths.

Example 9: In Silico Modeling—Low Market Penetration/Adoption Rate (70%) System Dynamics MD can be thought of as an additional mode of action and thus corn and soy with Cry1A.105+Cry2Ab2 would have two modes of action, while fields with mating disruption (Cry1A.105+Cry2Ab2+MD) would have 3 modes of action. It is known that having single gene traits in place when releasing dual gene traits can lead to more rapid resistance evolution. This normally would not be as much of a problem with 2 and 3 modes of action, but refuge size is minimal in this model, and the two gene corn and soy without mating disruption drives the entire system towards rapid resistance evolution (FIG. 8).

Figure 9A:
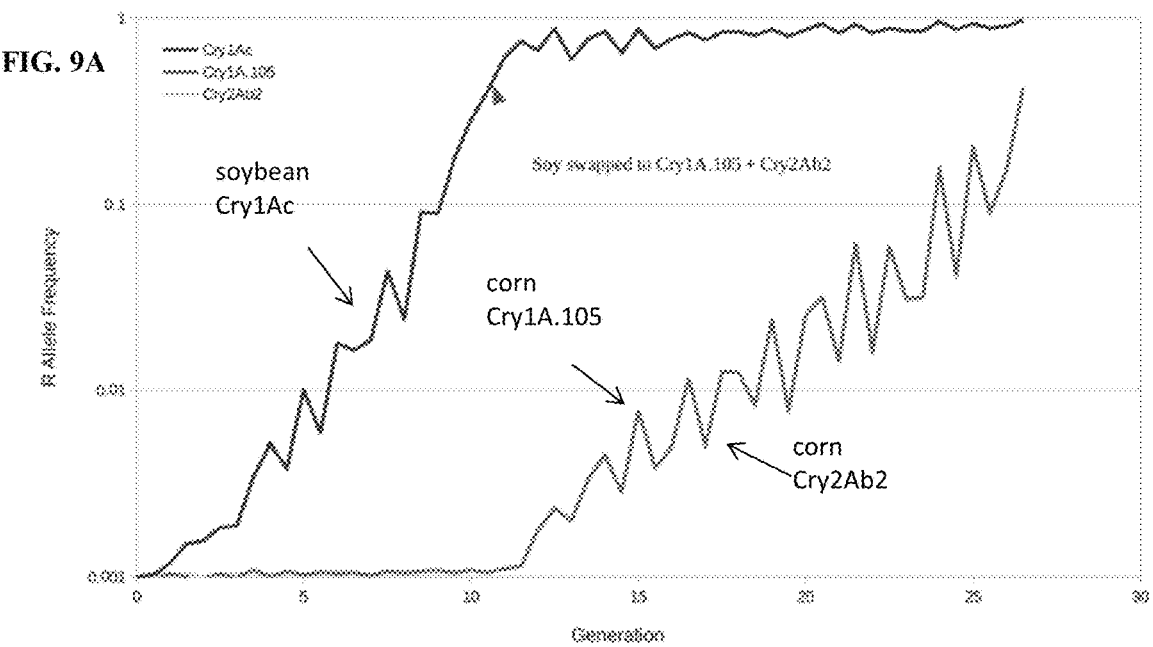
FIG. 9A-9B shows the impact of switching mating disruption from dual gene Bt-corn (FIG. 9A) to single gene Bt-soy (FIG. 9B).
Figure 9B:
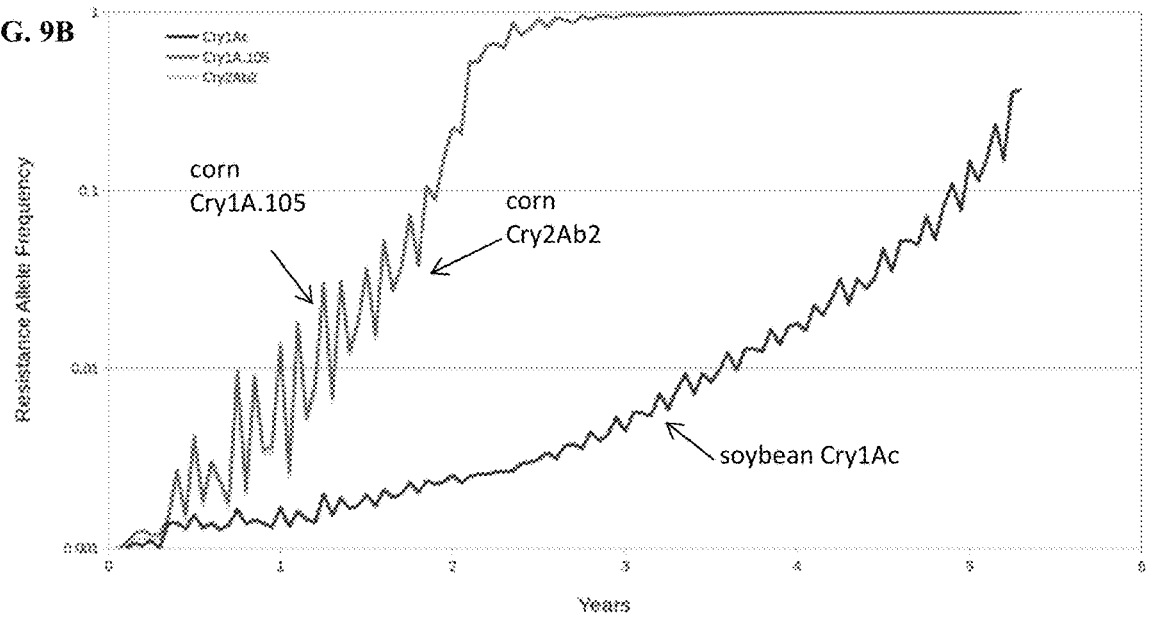

Example 10: In Silico Modeling—MD Enables the Utilization of Low Dose Events and Prolongs Trait Durability in the Low Dose Events The model demonstrates that resistance evolves first to Intacta soy when mating disruption is used on corn, but resistance evolves first to Cry1A.105+Cry2Ab2 corn when mating disruption is used in conjunction with the Intacta soy (FIG. 9A-9B).

The Intacta soy is a high dose single gene product (the Bt toxin kills 95% of larvae on it), while the corn actually has two low dose events (each kills 85% of the larvae developing on it).

In many of the model simulations, durability is increased from 1 to 2 years, which may be an artifact of the base simulation having too little refuge present. It is hypothesized that if more refuge is added to the model, or unsprayed refuge is added, or more genes in each product are added, then the MD would increase durability from 10 to 20 years. In each case MD has doubled durability.

Example 11: In Silico Modeling—as Pest Reproductive Rates Increase, Resistance Evolves More Rapidly and Density Dependent Mortality Becomes Important

*S. frugiperda* mortality rates for egg and larvae have been studied by Varella et al. (2015) and Murua and Virla (2004) (Varella et al. Mortality Dynamics of *Spodoptera frugiperda* (Lepidoptera: Noctuidae) Immatures in Maize. PloS one. 10: e0130437 (2015); Muria and Virla. Population parameters of *Spodoptera frugiperda* (Smith) (Lep.: Noctuidae) fed on corn and two predominant grasess in Tucuman (Argentina). Acta zoológica mexicana. 20: 199-210 (2004)). The model was adapted by reducing fecundity, which has the same impact as increasing egg mortality, to reduce the growth rates. The initial model had a growth rate of 97 fold per generation (Extreme growth rate). Hassell et al. (1975) list growth rates for 24 insect species and none exceed 75 fold per generation, so this was an extreme value (Hassell et al. Patterns of Dynamical Behaviour in Single-Species Populations. Journal of Animal Ecology. 45: 471-486 (1976)). To determine the impact of variation in growth rates on IRM, the growth rate was varied from 2.83 to 4.85 and 9.75. The mid-value (4.85) was estimated using mortality data from Varella et al. (2015). The variation in egg and larval mortality by region was taken into consideration. In drier regions, lower mortality might result in higher growth rates. The 4.85 growth rate (i.e. "balanced reproductive growth rate") is a rate based on Varella et al. (2015); the 2.83 growth rate value was doubling the amount of mortality; and the 9.75 growth rate (i.e. "rapid reproductive growth rate") resulted from assuming that mortality rates in some areas might be half that observed in the Varella research.

Figure 10:
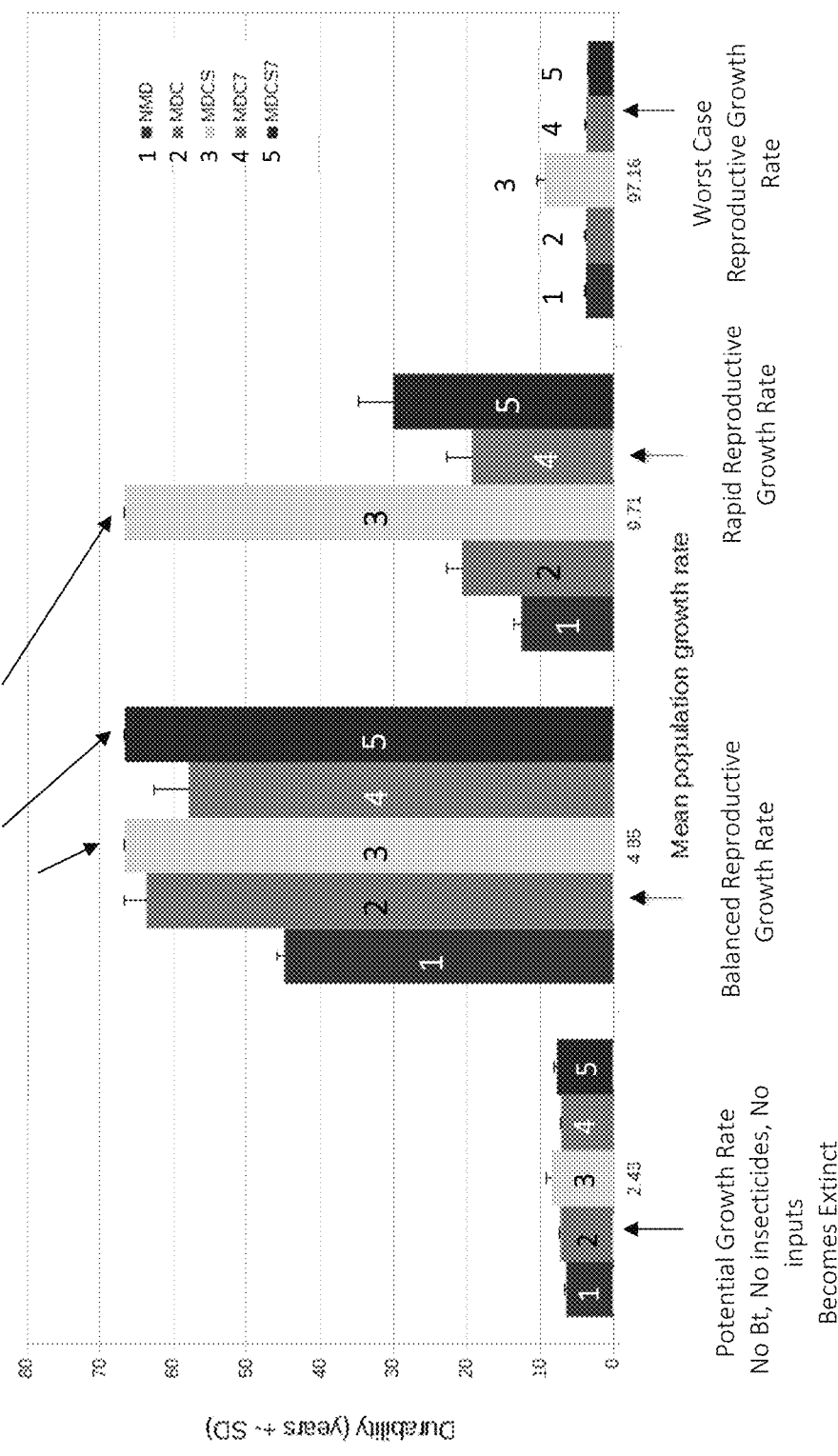
FIG. 10 shows the impact of *Spodoptera frugiperda* reproductive rates and market penetration on the rate of *Spodoptera frugiperda* resistance evolution in fields of corn and soy with and without mating disruption (MD). 1: NMD=No MD; 2: MDC=MD Bt corn; 3: MDCS=MD Bt corn and Bt soybean; 4: MDC7=MD on 70% of Bt corn; 5: MDCS7=MD on 70% of Bt corn and Bt soybean.

The impact of growth rate and market penetration on the potential for IRM was explored. The model predicts that at a balanced reproductive growth rate of *S. frugiperda*, 70% or 100% market penetration of MD on corn and soy was effective at increasing trait durability (FIG. 10). At rapid reproductive growth rate of *S. frugiperda*, 100% market penetration of MD on corn and soy was effective at increasing trait durability. In fact, the simulations for 70% and 100% market penetration of MD on corn and soy at a balanced reproductive growth rate and 100% market penetration of MD on corn and soy at a rapid reproductive growth rate never evolved resistance, and the three simulations were stopped after 67 years.

Example 12: In Silico Modeling—MD Efficacy has Little Impact on Durability Except in the Case of Corn and Soybeans where MD Improves Durability In the current model, all females are initially unmated. The mating disruption efficacy determines what proportion of the females that would normally mate on a given night. Mating disruption efficacy can be expressed as (100%—% of females that mate per night). Thus, if the mating disruption efficacy was 90%, only 10% of the females would mate on the first night. On the next night, 10% of the 90% that didn't mate on the first night would mate, and so on. Mated females that moved in from other fields would continue to lay eggs at their normal rate. If a female mated on one night, they remain mated until the fifth night, when all females (including immigrants) must remate.

Figure 11:
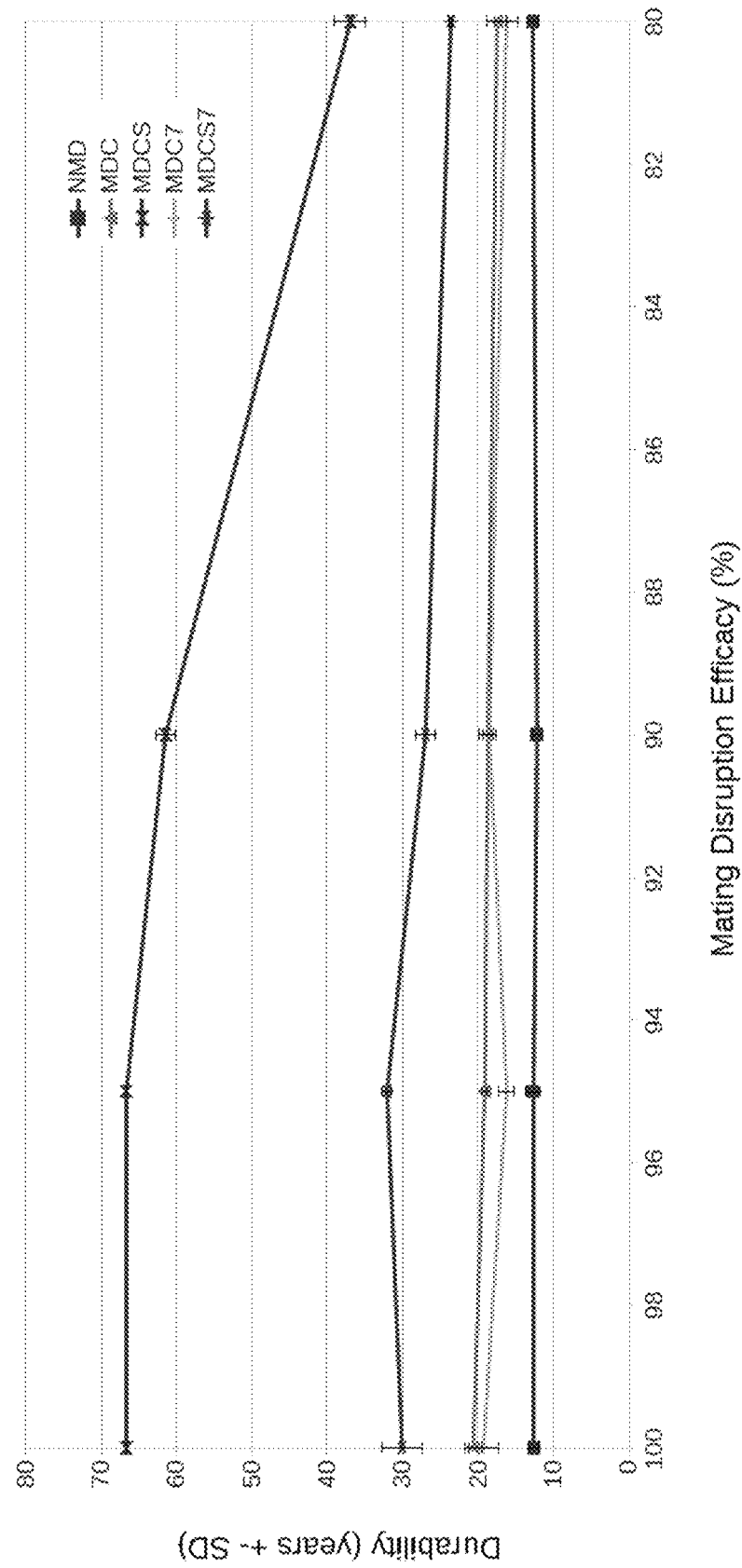
FIG. 11 shows the impact of mating disruption efficacy and market penetration on the rate of *Spodoptera frugiperda* resistance evolution in fields of corn and soy with and without mating disruption (MD). Squares: NMD=No MD; Triangles: MDC=MD Bt corn; Big double triangles: MDCS=MD Bt corn and Bt soybean; Line: MDC7=MD on 70% of Bt corn; Small double triangles: MDCS7=MD on 70% of Bt corn and Bt soybean.

The model explored the impact of mating disruption efficacy on trait durability. The model predicts that mating disruption efficacy had little impact on durability at 70% or 100% market penetration of MD on corn. Trait durability was increased at 70% or 100% market penetration of MD on corn and soy (FIG. 11).

The model certainly suggests that having MD on both corn and soybean would be a much better IRM strategy. This seems to make sense because ¾ of the field area was in soybean in the model and soybean was designed to include the same Bt toxin traits as corn. If this IRM strategy does not include soybean, resistance will be "pushed" by the soybean, reducing the effectiveness of the MD in corn as an IRM tool.

TABLE 7

Representative pheromones

| Name | Name |
| --- | --- |
| (E)-2-Decen-1-ol | (E)-5-Dodecenyl acetate |
| (E)-2-Decenyl acetate | (Z)-5-Dodecen-1-ol |
| (E)-2-Decenal | (Z)-5-Dodecenyl acetate |
| (Z)-2-Decen-1-ol | (Z)-5-Dodecenal |
| (Z)-2-Decenyl acetate | (E)-6-Dodecen-1-ol |
| (Z)-2-Decenal | (Z)-6-Dodecenyl acetate |
| (E)-3-Decen-1-ol | (E)-6-Dodecenal |
| (Z)-3-Decenyl acetate | (E)-7-Dodecen-1-ol |
| (Z)-3-Decen-1-ol | (E)-7-Dodecenyl acetate |
| (Z)-4-Decen-1-ol | (E)-7-Dodecenal |
| (E)-4-Decenyl acetate | (Z)-7-Dodecen-1-ol |
| (Z)-4-Decenyl acetate | (Z)-7-Dodecenyl acetate |
| (Z)-4-Decenal | (Z)-7-Dodecenal |
| (E)-5-Decen-1-ol | (E)-8-Dodecen-1-ol |
| (E)-5-Decenyl acetate | (E)-8-Dodecenyl acetate |
| (Z)-5-Decen-1-ol | (E)-8-Dodecenal |
| (Z)-5-Decenyl acetate | (Z)-8-Dodecen-1-ol |
| (Z)-5-Decenal | (Z)-8-Dodecenyl acetate |

TABLE 7-continued

Representative pheromones

| Name | Name |
|---|---|
| (E)-7-Decenyl acetate | (E)-9-Dodecen-1-ol |
| (Z)-7-Decenyl acetate | (E)-9-Dodecenyl acetate |
| (E)-8-Decen-1-ol | (E)-9-Dodecenal |
| (E,E)-2,4-Decadienal | (Z)-9-Dodecen-1-ol |
| (E,Z)-2,4-Decadienal | (Z)-9-Dodecenyl acetate |
| (Z,Z)-2,4-Decadienal | (Z)-9-Dodecenal |
| (E,E)-3,5-Decadienyl acetate | (E)-10-Dodecen-1-ol |
| (Z,E)-3,5-Decadienyl acetate | (E)-10-Dodecenyl acetate |
| (Z,Z)-4,7-Decadien-1-ol | (E)-10-Dodecenal |
| (Z,Z)-4,7-Decadienyl acetate | (Z)-10-Dodecen-1-ol |
| (E)-2-Undecenyl acetate | (Z)-10-Dodecenyl acetate |
| (E)-2-Undecenal | (E,Z)-3,5-Dodecadienyl acetate |
| (Z)-5-Undecenyl acetate | (Z,E)-3,5-Dodecadienyl acetate |
| (Z)-7-Undecenyl acetate | (Z,Z)-3,6-Dodecadien-1-ol |
| (Z)-8-Undecenyl acetate | (E,E)-4,10-Dodecadienyl acetate |
| (Z)-9-Undecenyl acetate | (E,E)-5,7-Dodecadien-1-ol |
| (E)-2-Dodecenal | (E,E)-5,7-Dodecadienyl acetate |
| (Z)-3-Dodecen-1-ol | (E,Z)-5,7-Dodecadien-1-ol |
| (E)-3-Dodecenyl acetate | (E,Z)-5,7-Dodecadienyl acetate |
| (Z)-3-Dodecenyl acetate | (E,Z)-5,7-Dodecadienal |
| (E)-4-Dodecenyl acetate | (Z,E)-5,7-Dodecadien-1-ol |
| (E)-5-Dodecen-1-ol | (Z,E)-5,7-Dodecadienyl acetate |
| (Z,E)-5,7-Dodecadienal | (Z,Z)-4,7-Tridecadien-1-ol |
| (Z,Z)-5,7-Dodecadienyl acetate | (Z,Z)-4,7-Tridecadienyl acetate |
| (Z,Z)-5,7-Dodecadienal | (E,Z)-5,9-Tridecadien-1-ol |
| (E,E)-7,9-Dodecadienyl acetate | (Z,E)-5,9-Tridecadienyl acetate |
| (E,Z)-7,9-Dodecadien-1-ol | (Z,Z)-5,9-Tridecadienyl acetate |
| (E,Z)-7,9-Dodecadienyl acetate | (Z,Z)-7,11-Tridecadienyl acetate |
| (E,Z)-7,9-Dodecadienal | (E,Z,Z)-4,7,10-Tridecatrienyl acetate |
| (Z,E)-7,9-Dodecadien-1-ol | (E)-3-Tetradecen-1-ol |
| (Z,E)-7,9-Dodecadienyl acetate | (E)-3-Tetradecenyl acetate |
| (Z,Z)-7,9-Dodecadien-1-ol | (Z)-3-Tetradecen-1-ol |
| (Z,Z)-7,9-Dodecadienyl acetate | (Z)-3-Tetradecenyl acetate |
| (E,E)-8,10-Dodecadien-1-ol | (E)-5-Tetradecen-1-ol |
| (E,E)-8,10-Dodecadienyl acetate | (E)-5-Tetradecenyl acetate |
| (E,E)-8,10-Dodecadienal | (E)-5-Tetradecenal |
| (E,Z)-8,10-Dodecadien-1-ol | (Z)-5-Tetradecen-1-ol |
| (E,Z)-8,10-Dodecadienyl acetate | (Z)-5-Tetradecenyl acetate |
| (E,Z)-8,10-Dodecadienal | (Z)-5-Tetradecenal |
| (Z,E)-8,10-Dodecadien-1-ol | (E)-6-Tetradecenyl acetate |
| (Z,E)-8,10-Dodecadienyl acetate | (Z)-6-Tetradecenyl acetate |
| (Z,E)-8,10-Dodecadienal | (E)-7-Tetradecen-1-ol |
| (Z,Z)-8,10-Dodecadien-1-ol | (E)-7-Tetradecenyl acetate |
| (Z,Z)-8,10-Dodecadienyl acetate | (Z)-7-Tetradecen-1-ol |
| (Z,E,E)-3,6,8-Dodecatrien-1-ol | (Z)-7-Tetradecenyl acetate |
| (Z,Z,E)-3,6,8-Dodecatrien-1-ol | (Z)-7-Tetradecenal |
| (E)-2-Tridecenyl acetate | (E)-8-Tetradecen-1-ol |
| (Z)-2-Tridecenyl acetate | (E)-8-Tetradecenyl acetate |
| (E)-3-Tridecenyl acetate | (Z)-8-Tetradecen-1-ol |
| (E)-4-Tridecenyl acetate | (Z)-8-Tetradecenyl acetate |
| (Z)-4-Tridecenyl acetate | (Z)-8-Tetradecenal |
| (Z)-4-Tridecenal | (E)-9-Tetradecen-1-ol |
| (E)-6-Tridecenyl acetate | (E)-9-Tetradecenyl acetate |
| (Z)-7-Tridecenyl acetate | (Z)-9-Tetradecen-1-ol |
| (E)-8-Tridecenyl acetate | (Z)-9-Tetradecenyl acetate |
| (Z)-8-Tridecenyl acetate | (Z)-9-Tetradecenal |
| (E)-9-Tridecenyl acetate | (E)-10-Tetradecenyl acetate |
| (Z)-9-Tridecenyl acetate | (Z)-10-Tetradecenyl acetate |
| (Z)-10-Tridecenyl acetate | (E)-11-Tetradecen-1-ol |
| (E)-11-Tridecenyl acetate | (E)-11-Tetradecenyl acetate |
| (Z)-11-Tridecenyl acetate | (E)-11-Tetradecenal |
| (E,Z)-4,7-Tridecadienyl acetate | (Z)-11-Tetradecen-1-ol |
| (Z)-11-Tetradecenal | (Z)-11-Tetradecenyl acetate |
| (E)-12-Tetradecenyl acetate | (E,E)-10,12-Tetradecadienal |
| (Z)-12-Tetradecenyl acetate | (E,Z)-10,12-Tetradecadienyl acetate |
| (E,E)-2,4-Tetradecadienal | (Z,E)-10,12-Tetradecadienyl acetate |
| (E,E)-3,5-Tetradecadienyl acetate | (Z,Z)-10,12-Tetradecadien-1-ol |
| (E,Z)-3,5-Tetradecadienyl acetate | (Z,Z)-10,12-Tetradecadienyl acetate |
| (Z,E)-3,5-Tetradecadienyl acetate | (E,Z,Z)-3,8,11-Tetradecatrienyl acetate |
| (E,Z)-3,7-Tetradecadienyl acetate | (E)-8-Pentadecen-1-ol |
| (E,Z)-3,8-Tetradecadienyl acetate | (E)-8-Pentadecenyl acetate |
| (E,Z)-4,9-Tetradecadienyl acetate | (Z)-8-Pentadecen-1-ol |
| (E,Z)-4,9-Tetradecadienal | (Z)-8-Pentadecenyl acetate |
| (E,Z)-4,10-Tetradecadienyl acetate | (E)-9-Pentadecenyl acetate |
| (E,E)-5,8-Tetradecadienal | (Z)-9-Pentadecenyl acetate |
| (Z,Z)-5,8-Tetradecadien-1-ol | (Z)-10-Pentadecenyl acetate |
| (Z,Z)-5,8-Tetradecadienyl acetate | (Z)-10-Pentadecenal |
| (Z,Z)-5,8-Tetradecadienal | (E)-12-Pentadecenyl acetate |
| (E,E)-8,10-Tetradecadien-1-ol | (Z)-12-Pentadecenyl acetate |
| (E,E)-8,10-Tetradecadienyl acetate | (Z,Z)-6,9-Pentadecadien-1-ol |
| (E,E)-8,10-Tetradecadienal | (Z,Z)-6,9-Pentadecadienyl acetate |
| (E,Z)-8,10-Tetradecadienyl acetate | (Z,Z)-6,9-Pentadecadienal |
| (E,Z)-8,10-Tetradecadienal | (E,E)-8,10-Pentadecadienyl acetate |
| (Z,E)-8,10-Tetradecadien-1-ol | (E,Z)-8,10-Pentadecadien-1-ol |
| (Z,E)-8,10-Tetradecadienyl acetate | (E,Z)-8,10-Pentadecadienyl acetate |
| (Z,Z)-8,10-Tetradecadienyl acetate | (Z,E)-8,10-Pentadecadienyl acetate |
| (E,E)-9,11-Tetradecadienyl acetate | (Z,Z)-8,10-Pentadecadienyl acetate |
| (E,Z)-9,11-Tetradecadienyl acetate | (E,Z)-9,11-Pentadecadienal |
| (Z,E)-9,11-Tetradecadien-1-ol | (Z,Z)-9,11-Pentadecadienal |
| (Z,E)-9,11-Tetradecadienyl acetate | (Z)-3-Hexadecenyl acetate |
| (Z,E)-9,11-Tetradecadienal | (E)-5-Hexadecen-1-ol |
| (Z,Z)-9,11-Tetradecadien-1-ol | (E)-5-Hexadecenyl acetate |
| (Z,Z)-9,11-Tetradecadienyl acetate | (Z)-5-Hexadecen-1-ol |
| (Z,Z)-9,11-Tetradecadienal | (Z)-5-Hexadecenyl acetate |
| (E,E)-9,12-Tetradecadienyl acetate | (E)-6-Hexadecenyl acetate |
| (Z,E)-9,12-Tetradecadien-1-ol | (E)-7-Hexadecen-1-ol |
| (Z,E)-9,12-Tetradecadienyl acetate | (E)-7-Hexadecenyl acetate |
| (Z,E)-9,12-Tetradecadienal | (E)-7-Hexadecenal |
| (Z,Z)-9,12-Tetradecadien-1-ol | (Z)-7-Hexadecen-1-ol |
| (Z,Z)-9,12-Tetradecadienyl acetate | (Z)-7-Hexadecenyl acetate |
| (E,E)-10,12-Tetradecadien-1-ol | (Z)-7-Hexadecenal |
| (E,E)-10,12-Tetradecadienyl acetate | (E)-8-Hexadecenyl acetate |
| (E)-9-Hexadecenyl acetate | (E)-9-Hexadecen-1-ol |
| (E)-9-Hexadecenal | (E,E)-10,12-Hexadecadien-1-ol |
| (Z)-9-Hexadecen-1-ol | (E,E)-10,12-Hexadecadienyl acetate |
| (Z)-9-Hexadecenyl acetate | (E,E)-10,12-Hexadecadienal |
| (Z)-9-Hexadecenal | (E,Z)-10,12-Hexadecadien-1-ol |
| (E)-10-Hexadecen-1-ol | (E,Z)-10,12-Hexadecadienyl acetate |
| (E)-10-Hexadecenal | (E,Z)-10,12-Hexadecadienal |
| (Z)-10-Hexadecenyl acetate | (Z,E)-10,12-Hexadecadienyl acetate |
| (Z)-10-Hexadecenal | (Z,E)-10,12-Hexadecadienal |
| (E)-11-Hexadecen-1-ol | (Z,Z)-10,12-Hexadecadienal |
| (E)-11-Hexadecenyl acetate | (E,E)-11,13-Hexadecadien-1-ol |
| (E)-11-Hexadecenal | (E,E)-11,13-Hexadecadienyl acetate |
| (Z)-11-Hexadecen-1-ol | (E,E)-11,13-Hexadecadienal |
| (Z)-11-Hexadecenyl acetate | (E,Z)-11,13-Hexadecadien-1-ol |
| (Z)-11-Hexadecenal | (E,Z)-11,13-Hexadecadienyl acetate |
| (Z)-12-Hexadecenyl acetate | (E,Z)-11,13-Hexadecadienal |
| (Z)-12-Hexadecenal | (Z,E)-11,13-Hexadecadien-1-ol |
| (E)-14-Hexadecenal | (Z,E)-11,13-Hexadecadienyl acetate |
| (Z)-14-Hexadecenyl acetate | (Z,E)-11,13-Hexadecadienal |
| (E,E)-1,3-Hexadecadien-1-ol | (Z,Z)-11,13-Hexadecadien-1-ol |
| (E,Z)-4,6-Hexadecadien-1-ol | (Z,Z)-11,13-Hexadecadienyl acetate |
| (E,Z)-4,6-Hexadecadienyl acetate | (Z,Z)-11,13-Hexadecadienal |
| (E,Z)-4,6-Hexadecadienal | (E,E)-10,14-Hexadecadienal |
| (E,Z)-6,11-Hexadecadienyl acetate | (E,Z)-11,14-Hexadecadienyl acetate |
| (E,Z)-6,11-Hexadecadienal | (E,E,Z)-4,6,10-Hexadecatrien-1-ol |
| (Z,Z)-7,10-Hexadecadien-1-ol | (E,E,Z)-4,6,10-Hexadecatrienyl acetate |
| (Z,Z)-7,10-Hexadecadienyl acetate | (E,Z,Z)-4,6,10-Hexadecatrien-1-ol |
| (Z,E)-7,11-Hexadecadien-1-ol | (E,Z,Z)-4,6,10-Hexadecatrienyl acetate |
| (Z,E)-7,11-Hexadecadienyl acetate | (E,E,Z)-4,6,11-Hexadecatrienyl acetate |
| (Z,E)-7,11-Hexadecadienal | (E,E,Z)-4,6,11-Hexadecatrienal |
| (Z,Z)-7,11-Hexadecadien-1-ol | (Z,Z,E)-7,11,13-Hexadecatrienal |
| (Z,Z)-7,11-Hexadecadienyl acetate | (E,E,E)-10,12,14-Hexadecatrienyl acetate |
| (Z,Z)-7,11-Hexadecadienal | (E,E,E)-10,12,14-Hexadecatrienal |
| (Z,Z)-8,10-Hexadecadienyl acetate | (E,E,Z)-10,12,14-Hexadecatrienyl acetate |
| (E,E)-8,11-Hexadecadienal | (E,E,Z)-10,12,14-Hexadecatrienal |
| (E,E)-9,11-Hexadecadienal | (E,E,Z,Z)-4,6,11,13-Hexadecatetraenal |
| (E,Z)-9,11-Hexadecadienyl acetate | (E)-2-Heptadecenal |
| (E,Z)-9,11-Hexadecadienal | (Z)-2-Heptadecenal |
| (Z,E)-9,11-Hexadecadienyl acetate | (E)-8-Heptadecen-1-ol |
| (Z,E)-9,11-Hexadecadienal | (E)-8-Heptadecenyl acetate |
| (Z,Z)-9,11-Hexadecadienyl acetate | (Z)-8-Heptadecen-1-ol |
| (Z,Z)-9,11-Hexadecadienal | (E,E)-5,9-Octadecadien-1-ol |
| (Z)-9-Heptadecenal | (E,E)-5,9-Octadecadienyl acetate |
| (E)-10-Heptadecenyl acetate | (E,E)-9,12-Octadecadien-1-ol |
| (Z)-11-Heptadecen-1-ol | |
| (Z)-11-Heptadecenyl acetate | |
| (E,E)-4,8-Heptadecadienyl acetate | |
| (Z,Z)-8,10-Heptadecadien-1-ol | |
| (Z,Z)-8,11-Heptadecadienyl acetate | |
| (E)-2-Octadecenyl acetate | |
| (E)-2-Octadecenal | |
| (Z)-2-Octadecenyl acetate | |
| (Z,Z)-5,8-Tetradecadienyl acetate | (Z)-10-Pentadecenal |
| (Z,Z)-5,8-Tetradecadienal | (E)-12-Pentadecenyl acetate |

TABLE 7-continued

Representative pheromones

| Name | Name |
|---|---|
| (Z)-2-Octadecenal | (Z,Z)-9,12-Octadecadienyl acetate |
| (E)-9-Octadecen-1-ol | (Z,Z)-9,12-Octadecadienal |
| (E)-9-Octadecenyl acetate | (Z,Z)-11,13-Octadecadienal |
| (E)-9-Octadecenal | (E,E)-11,14-Octadecadienal |
| (Z)-9-Octadecen-1-ol | (Z,Z)-13,15-Octadecadienal |
| (Z)-9-Octadecenyl acetate | (Z,Z,Z)-3,6,9-Octadecatrienyl acetate |
| (Z)-9-Octadecenal | |
| (E)-11-Octadecen-1-ol | (E,E,E)-9,12,15-Octadecatrien-1-ol |
| (E)-11-Octadecenal | (Z,Z,Z)-9,12,15-Octadecatrienyl acetate |
| (Z)-11-Octadecen-1-ol | |
| (Z)-11-Octadecenyl acetate | (Z,Z,Z)-9,12,15-Octadecatrienal |
| (Z)-11-Octadecenal | |
| (E)-13-Octadecenyl acetate | |
| (E)-13-Octadecenal | |
| (Z)-13-Octadecen-1-ol | |
| (Z)-13-Octadecenyl acetate | |
| (Z)-13-Octadecenal | |
| (E)-14-Octadecenal | |
| (E,Z)-2,13-Octadecadien-1-ol | |
| (E,Z)-2,13-Octadecadienyl acetate | |
| (E,Z)-2,13-Octadecadienal | |
| (Z,E)-2,13-Octadecadienyl acetate | |
| (Z,Z)-2,13-Octadecadien-1-ol | |
| (Z,Z)-2,13-Octadecadienyl acetate | |
| (E,E)-3,13-Octadecadienyl acetate | |
| (E,Z)-3,13-Octadecadienyl acetate | |
| (E,Z)-3,13-Octadecadienal | |
| (Z,E)-3,13-Octadecadienyl acetate | |
| (Z,Z)-3,13-Octadecadienyl acetate | |
| (Z,Z)-3,13-Octadecadienal | |

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth and as follows in the scope of the appended claims.

Unless defined otherwise, all technical and scientific terms herein have the same meaning as commonly understood by one of ordinary skill in the art to which this invention belongs. Although any methods and materials, similar or equivalent to those described herein, can be used in the practice or testing of the present invention, the preferred methods and materials are described herein.

Numbered Embodiments of the Disclosure

Particular subject matter contemplated by the present disclosure is set out in the below numbered embodiments.
1. A method of delaying emergence of or reducing the number of one or more pests that may become resistant to one or more transgenic insecticidal traits and/or chemical insecticides in a field plot system which comprises plants of a plant population,
wherein the plants may comprise one or more transgenic insecticidal traits,
wherein a portion of or the entire field plot may comprise one or more chemical insecticides,
wherein the entire field plot comprises a core region and a border region, wherein the field plot system further comprises one or more refuges, said method comprising:
   a. applying a mating disruption tactic to the core region, wherein said mating disruption tactic is capable of disrupting the mating of the one or more pests; and
   b. applying one or more semiochemicals or factors in the one or more refuges, wherein said one or more semiochemicals or factors are capable of reducing or preventing the movement of one or more susceptible pests, and/or attracting resistant pests to the refuge,
   wherein said method delays emergence of or reduces the number of one or more pests as a result of the applications when compared to a control field plot which only had one or none of the applications.
2. The method of claim 1, wherein the reduction in number of one or more pests comprises a decrease in mating of a resistant pest with another resistant pest.
3. The method of claim 1, wherein said one or more susceptible pests in said one or more refuges mate with one or more resistant pests from the field plot.
4. The method of claim 4, wherein the plants comprising one or more transgenic insecticidal traits express one or more *Bacillus thuringiensis* (Bt) proteins.
5. The method of claim 1, wherein applying a mating disruption tactic comprises applying one or more pheromones.
6. The method of claim 5, wherein the one or more pheromones comprise sprayable formulations or are in aerosol emitters or hand applied dispensers.
7. The method of claim 5, wherein the one or more pheromones are applied at a high concentration and at high coverage.
8. The method of claim 1, wherein said one or more refuges are adjacent to the field plot.
9. The method of claim 8, wherein the one or more refuges comprise separate blocks.
10. The method of claim 1, wherein said one or more refuges are in the border region.
11. The method of claim 1, wherein the one or more refuges promotes migration of one or more susceptible pests to the core region to mate with one or more resistant pests.
12. The method of claim 1, wherein the border region is planted earlier than the core region.
13. The method of claim 1, wherein the one or more semiochemicals or factors comprise oogenesis and oviposition factors (OOSFs).
14. The method of claim 13, wherein the OOSFs are applied by vaporization.
15. The method of claim 1, wherein the one or more semiochemicals or factors comprise one or more attractants.
16. The method of claim 15, wherein the one or more attractants comprise one or more host plant chemical, non-host plant chemical, synthetic volatile chemical, or natural volatile chemical.
17. The method of claim 15, wherein the one or more attractants are identified through binding to one or more pest odorant binding proteins.
18. The method of claim 15, wherein the one or more attractants comprise one or more host plant volatile chemical.
19. The method of claim 18, wherein the one or more host plant volatile chemical comprise heptanal or benzaldehyde.
20. The method of claim 15, wherein the one or more attractants comprise one or more male pheromones.
21. The method of claim 15, wherein the one or more attractants comprise one or more ovipositioning pheromones.
22. The method of claim 15, wherein the one or more attractants comprise one or more female attractants.

23. The method of claim 22, wherein the one or more female attractants comprise ethylene.

24. The method of claim 1, wherein the one or more semiochemicals or factors reduces the movement of susceptible female pests from the one or more refuges.

25. The method of claim 1, wherein the one or more semiochemicals or factors increases the number of matings occurring in the one or more refuges among susceptible female pests and resistant male pests.

26. The method of claim 1, wherein selective advantage of resistance is reduced in the one or more refuges.

27. The method of claim 1, wherein the mating disruption further comprises applying one or more pheromonostatic peptides (PSPs).

28. The method of claim 27, wherein the one or more PSPs are applied by vaporization.

29. The method of claim 27, wherein each PSP is from a highly dispersive pest of the same species as each pest damaging the plants.

30. The method of claim 27, wherein applying one or more PSPs enhances the mating disruption.

31. The method of claim 1, wherein the mating disruption further comprises disrupting one or more pheromone biosynthesis-activating neuropeptides (PBANs) in the one or more pests.

32. The method of claim 31, wherein disrupting one or more PBANs enhances the mating disruption.

33. The method of claim 31, wherein disrupting one or more PBANs comprises disrupting by RNA interference.

34. The method of claim 31, wherein each PBAN is from a highly dispersive pest of the same species as each pest damaging the plants.

35. The method of claim 1, wherein the mating disruption further comprises applying one or more PSPs and disrupting one or more PBANs in the one or more pests.

36. The method of claim 1, further comprising applying one or more chemical insecticides comprising independent modes of action to different areas of the field plot.

37. The method of claim 1, further comprising applying an attract-and-kill tactic in the field plot,
wherein said tactic reduces the number of one or more pests in the field plot.

38. The method of claim 37, wherein applying an attract-and-kill tactic comprises applying one or more semiochemicals or factors and one or more insecticides.

39. The method of claim 38, wherein the one or more semiochemicals or factors comprise one or more attractants.

40. The method of claim 39, wherein the one or more attractants comprise one or more host plant chemical, non-host plant chemical, synthetic volatile chemical, or natural volatile chemical.

41. The method of claim 37, wherein the one or more resistant pests are male or female.

42. A method of rescuing one or more pests' susceptibility to one or more transgenic insecticidal traits and/or chemical insecticides in a field plot system which comprises plants of a plant population, wherein the plants may comprise one or more transgenic insecticidal traits,
wherein a portion of or the entire field plot may comprise one or more chemical insecticides,
wherein the entire field plot comprises a core region and a border region,
wherein the field plot system further comprises one or more refuges, said method comprising:
a. applying a mating disruption tactic to the core region, wherein said mating disruption tactic is capable of disrupting the mating of the one or more pests;
b. having a pheromone-free zone in the border region; and
c. applying a low concentration of one or more semiochemicals or factors in one or more of the refuges,
wherein said method rescues the one or more pests' susceptibility to one or more transgenic insecticidal traits and/or chemical insecticides as a result of the applications when compared to a control field plot which only had one or none of the applications.

43. The method of claim 42, wherein the reduction in number of one or more pests comprises a decrease in mating of a resistant pest with another resistant pest.

44. The method of claim 42, wherein said one or more susceptible pests in said one or more refuges mate with one or more resistant pests from the field plot.

45. The method of claim 42, wherein the plants comprising one or more transgenic insecticidal traits express one or more *Bacillus thuringiensis* (Bt) proteins.

46. The method of claim 42, wherein applying a mating disruption tactic comprises applying one or more pheromones.

47. The method of claim 46, wherein the one or more pheromones comprise sprayable formulations or are in aerosol emitters or hand applied dispensers.

48. The method of claim 46, wherein the one or more pheromones are applied at a high concentration and at high coverage.

49. The method of claim 42, wherein said one or more refuges are adjacent to the field plot.

50. The method of claim 49, wherein the one or more refuges comprise separate blocks.

51. The method of claim 42, wherein the one or more refuges promotes migration of one or more susceptible pests to the core region to mate with one or more resistant pests.

52. The method of claim 42, wherein the border region is planted earlier than the core region.

53. The method of claim 42, wherein the one or more semiochemicals or factors comprise male attractants.

54. The method of claim 42, wherein the one or more semiochemicals or factors increases the number of matings occurring in the one or more refuges among susceptible female pests and resistant male pests.

55. The method of claim 42, wherein selective advantage of resistance is reduced in the one or more refuges.

56. The method of claim 42, wherein the mating disruption further comprises applying one or more pheromonostatic peptides (PSPs).

57. The method of claim 56, wherein the one or more PSPs are applied by vaporization.

58. The method of claim 56, wherein each PSP is from a highly dispersive pest of the same species as each pest damaging the plants.

59. The method of claim 56, wherein applying one or more PSPs enhances the mating disruption.

60. The method of claim 42, wherein the mating disruption further comprises disrupting one or more pheromone biosynthesis-activating neuropeptides (PBANs) in the one or more pests.

61. The method of claim 60, wherein disrupting one or more PBANs enhances the mating disruption.

62. The method of claim 60, wherein disrupting one or more PBANs comprises disrupting by RNA interference.

63. The method of claim 60, wherein each PBAN is from a highly dispersive pest of the same species as each pest damaging the plants.

64. The method of claim 42, wherein the mating disruption further comprises applying one or more PSPs and disrupting one or more PBANs in the one or more pests.

65. A field plot system comprising plants of a plant population, wherein the plants may comprise one or more transgenic insecticidal traits,
wherein a portion of or the entire field plot may comprise one or more chemical insecticides,
wherein the entire field plot comprises a core region and a border region, wherein the field plot system further comprises one or more refuges,
wherein the entire field plot further comprises one or more pests capable of damaging the plants,
wherein said one or more pests can become resistant to one or more transgenic insecticidal traits and/or chemical insecticides, said field plot comprising:
a. one or more semiochemicals applied to the core region, wherein said one or more semiochemicals are capable of disrupting the mating of the one or more pests; and
b. one or more semiochemicals or factors applied in the one or more refuges, wherein said one or more semiochemicals or factors are capable of reducing or preventing the movement of one or more susceptible pests, and/or attracting resistant pests to the refuge,
wherein said field plot system has a delay in the emergence of or a reduction in the number of one or more pests as a result of the applications when compared to a control field plot system which only had one or none of the applications.

66. The field plot system of claim 65, wherein the one or more semiochemicals applied to the core region comprises one or more pheromones.

67. The field plot system of claim 65, wherein the one or more pheromones are applied at a high concentration and at high coverage.

68. The field plot system of claim 65, wherein the one or more semiochemicals or factors comprise oogenesis and oviposition factors (OOSFs).

69. The field plot system of claim 65, wherein the one or more semiochemicals or factors comprise one or more attractants.

70. A field plot system comprising plants of a plant population, wherein the plants may comprise one or more transgenic insecticidal traits,
wherein a portion of or the entire field plot may comprise one or more chemical insecticides,
wherein the entire field plot comprises a core region and a border region,
wherein the field plot system further comprises one or more refuges,
wherein the field plot system further comprises one or more pests capable of damaging the plants,
wherein said one or more pests have become resistant to one or more transgenic insecticidal traits and/or chemical insecticides, said field plot comprising:
a. one or more semiochemicals applied to the core region, wherein said one or more semiochemicals are capable of disrupting the mating of the one or more pests;
b. a pheromone-free zone in the border region; and
c. a low concentration of one or more semiochemicals or factors applied in one or more of the refuges,
wherein said field plot system has the one or more pests' susceptibility to one or more transgenic insecticidal trait and/or chemical insecticide rescued as a result of the applications when compared to a control field plot system which only had one or none of the applications.

71. The field plot system of claim 70, wherein the one or more semiochemicals applied to the core region comprises one or more pheromones.

72. The field plot system of claim 70, wherein the one or more pheromones are applied at a high concentration and at high coverage.

73. The field plot system of claim 70, wherein the low concentration of one or more semiochemicals or factors comprises male attractants.

74. A method of delaying emergence of or reducing the number of one or more pests that may become resistant to one or more transgenic insecticidal traits and/or chemical insecticides in a field plot system which comprises plants of a plant population,
wherein the plants may comprise one or more transgenic insecticidal traits, wherein said one or more traits are low-dose,
wherein a portion of or the entire field plot may comprise one or more chemical insecticides, said method comprising:
a. applying a mating disruption tactic to the core region, wherein said mating disruption tactic is capable of disrupting the mating of the one or more pests; and
wherein said method delays emergence of or reduces the number of one or more pests as a result of the application when compared to a control field plot which did not have the application.

75. The method of any one of claims 1, 42, and 74, wherein the one or more pests are from the order Lepidoptera.

76. The method of any one of claims 1, 42, and 74, wherein the one or more pests comprise *Spodoptera frugiperda*.

77. The method of any one of claims 1, 42, and 74, wherein the one or more pests comprise *Helicoverpa zea*.

78. The field plot system of claim 65 or 70, wherein the one or more pests are from the order Lepidoptera.

79. The field plot system of claim 65 or 70, wherein the one or more pests comprise *Spodoptera frugiperda*.

80. The field plot system of claim 65 or 70, wherein the one or more pests comprise *Helicoverpa zea*.

Additional Numbered Embodiments of the Disclosure

Particular subject matter contemplated by the present disclosure is set out in the below numbered embodiments.

1. A method of delaying emergence of resistance to one or more transgenic insecticidal traits in a field plot system which comprises one or more pests and plants of one or more species, wherein the plants comprise the one or more transgenic insecticidal traits, wherein the field plot system further comprises one or more refuges, said method comprising: applying mating disruption to the field plot system, wherein said mating disruption is capable of disrupting the mating of the one or more pests, and wherein said method delays emergence of resistance to the one or more transgenic insecticidal traits as a result of the application of mating disruption when compared to a control field plot system which did not apply mating disruption.

2. A method of maintaining or increasing the durability of one or more transgenic insecticidal traits in a field plot system to resistance by one or more pests, wherein the field plot system comprises plants of one or more species, wherein the plants comprise the one or more transgenic insecticidal traits, wherein the field plot system further comprises one or more refuges, said method comprising:

applying mating disruption to the field plot system, wherein said mating disruption is capable of disrupting the mating of the one or more pests, and wherein said method maintains or increases the durability of the one or more transgenic insecticidal traits as a result of the application of mating disruption when compared to a control field plot system which did not apply mating disruption.

3. A method of increasing the efficiency of one or more refuges in a field plot system which comprises one or more pests and plants of one or more species, wherein the plants comprise one or more transgenic insecticidal traits, said method comprising: applying mating disruption to the field plot system, wherein said mating disruption is capable of disrupting the mating of the one or more pests, and wherein said method increases the efficiency of one or more refuges as a result of the application of mating disruption when compared to a control field plot system which did not apply mating disruption.

4. The method of any one of claims 1-3, wherein applying mating disruption comprises applying one or more pheromones.

5. The method of claim 4, wherein the one or more pheromones comprise sprayable formulations or are in aerosol emitters or hand applied dispensers.

6. The method of any one of claims 1-3, wherein the plants comprising one or more transgenic insecticidal traits express one or more *Bacillus thuringiensis* (Bt) proteins.

7. The method of any one of claims 1-3, wherein the one or more species of plants comprise corn and soybean.

8. The method of any one of claims 1-3, wherein the one or more pests are *Helicoverpa zea* and/or *Spodoptera frugiperda*.

9. The method of any one of claims 1-3, wherein the one or more transgenic insecticidal traits are low dose.

10. The method of claim 2, wherein the durability of one or more transgenic insecticidal traits is maintained or increased by 5 years.

11. The method of claim 2, wherein the durability of one or more transgenic insecticidal traits is maintained or increased by 10 years.

12. The method of claim 2, wherein the durability of one or more transgenic insecticidal traits is maintained or increased by 15 years.

13. The method of claim 2, wherein the durability of one or more transgenic insecticidal traits is maintained or increased by 20 years.

14. The method of claim 2, wherein the durability of one or more transgenic insecticidal traits is maintained or increased by 25 years.

15. The method of claim 2, wherein the durability of one or more transgenic insecticidal traits is maintained or increased by 30 years.

16. The method of any one of claims 1-3, wherein said one or more refuges are adjacent to the field plot system.

17. The method of any one of claims 1-3, wherein the one or more refuges are within the field plot system.

18. The method of any one of claims 1-3, wherein the size of the one or more refuges of the field plot system with mating disruption is decreased as compared to the size of the one or more refuges of the field plot system without mating disruption.

19. The method of claim 18, wherein the size of the one or more refuges is decreased by about 95%, about 90%, about 80%, about 70%, about 60%, about 50%, about 40%, about 30%, about 20%, about 10%, about 5%, or less.

20. The method of any one of claims 1-3, wherein the size of the one or more refuges of the field plot system with mating disruption is increased as compared to the size of the one or more refuges of the field plot system without mating disruption.

21. The method of claim 20, wherein the size of the one or more refuges is increased by about 1%, about 2%, about 3%, about 4%, about 5%, about 6%, about 7%, about 8%, about 9%, about 10%, about 20%, or more.

22. The method of any one of claims 1-3, wherein the one or more pests have a balanced reproductive growth rate.

23. The method of any one of claims 1-3, wherein the one or more pests have a rapid reproductive growth rate.

24. The method of any one of claims 1-3, wherein the number of the one or more pests in the field plot system with mating disruption is reduced as compared to the number of the one or more pests of the field plot system without mating disruption.

25. The method of any one of claims 1-3, wherein the one or more pests are from the order Lepidoptera.

26. The method of any one of claims 1-3, wherein the one or more pests comprise *Spodoptera frugiperda*.

27. The method of any one of claims 1-3, wherein the one or more pests comprise *Helicoverpa zea*.

INCORPORATION BY REFERENCE

All references, articles, publications, patents, patent publications, and patent applications cited herein are incorporated by reference in their entireties for all purposes. However, mention of any reference, article, publication, patent, patent publication, and patent application cited herein is not, and should not be taken as an acknowledgment or any form of suggestion that they constitute valid prior art or form part of the common general knowledge in any country in the world.

REFERENCES

1. Kehat, M. & Dunkelblum, E. Sex Pheromones: Achievements in Monitoring and Mating Disruption of Cotton Pests in Israel. *Arch. Insect Biochem. Physiol.* 431, 425-431 (1993).
2. Chamberlain, D. J., Brown, N. J., Jones, O. T. & Casagrande, E. Field evaluation of a slow release pheromone formulation to control the American bollworm, *Helicoverpa armigera* (Lepidoptera: Noctuidae) in Pakistan. *Bull. Entomol. Res.* 90, 183-90 (2000).
3. Betts, M. D., Greg, P. C., Fit, G. P. & MacQuilan, M. J. in *Pest Control Sustain. Agric.* (Corey, S. A., Dall, D. J. & Milne, W. M.) 298-300 (CSIRO, 1993).
4. Mitchell, E. R. & J. R. McLaughlin. Suppression of mating and oviposition by fall armyworm and mating by corn earworm in corn, using air permeation technique. *J. Econ. Entomol.* 75, 270-274 (1982).
5. Armes, N. J. & Cooter, R. J. EFFECTS OF AGE AND MATED STATUS ON FLIGHT POTENTIAL OF *HELICOVERPA-ARMIGERA* (LEPIDOPTERA, NOCTUIDAE). *Physiol. Entomol.* 16, 131-144 (1991).
6. Saad, A. D. & Scott, D. R. Repellence of pheromone released by females of *Heliothis armigera* and *H. zea* to females of both species. *Entomol. Exp. Appl.* 30, 123-127 (1981).
7. SU, J.-W., WANG, H.-T. & GE, F. Female moths of cotton bollworm (Lepidoptera: Noctuidae) captured by waterbasin traps baited with synthetic female sex pheromone. *Insect Sci.* 13, 293-299 (2006).
8. Hillier, N. K. & Vickers, N. J. The role of heliothine hairpencil compounds in female *Heliothis virescens*

(Lepidoptera: Noctuidae) behavior and mate acceptance. *Chem. Senses* 29, 499-511 (2004).
9. Teal, P. E. A. & Tumlinson, J. H. Isolation, identification and bio-synthesis of compounds produced by male hairpencil glands of *Heliothis virescens* (F.) (Lepidoptera: Lepidoptera). *J. Chem. Ecol.* 15, 413-427 (1989).
10. Huang, Y. et al. Male orientation inhibitor of cotton bollworm: identification of compounds produced by male hairpencil glands. *Entomol. Sin.* 3, 172-182 ST—Male orientation inhibitor of cotton (1996).
11. Mitchell, E. R., Webb, J. C. & Hines, R. W. Capture of male and female cabbage loopers in field traps baited with synthetic sex pheromone. *Environ. Entomol.* 1, 525-526 (1972).
12. Birth, M. C. Responses of both sexes of *Trichoplusia ni* (Lepidoptera: Noctuidae) to virgin females and to synthetic pheromone. *Ecol. Entomol.* 2, 99-104 (1977).
13. Rothschild, M. & Schoonhoven, L. M. Assessment of egg load by *Pieris brassicae* (Lepidoptera: Pieridae). *Nature* 266, 352-355 (1977).
14. Kingan, T. G., Bodnar, W. M., Raina, a K., Shabanowitz, J. & Hunt, D. F. The loss of female sex pheromone after mating in the corn earworm moth *Helicoverpa zea*: identification of a male pheromonostatic peptide. *Proc. Natl. Acad. Sci. U.S.A.* 92, 5082-5086 (1995).
15. Raina, A. K., Kingan, T. G. & Kochansky, J. P. A pheromonotropic peptide of *Helicoverpa zea*, with melanizing activity, interaction with PBAN, and distribution of immunoreactivity. *Arch. Insect Biochem. Physiol.* 53, 147-57 (2003).
16. Schumacher, P., WeyEneth, A., Weber, D. C. & Dorn, S. Long flights in *Cydia pomonella* L. (Lepidoptera: Tortricidae) measured by a flight mill: influence of sex, mated status and age. *Physiol. Entomol.* 22, 149-160 (1997).
17. Witzgall, P., Stelinski, L., Gut, L. & Thomson, D. Codling moth management and chemical ecology. *Annu. Rev. Entomol.* 53, 503-522 (2008).
18. Gregg, P. C., Socorro, A. P. D. & Henderson, G. S. Development of a synthetic plant volatile-based attracticide for female noctuid moths. II. Bioassays of synthetic plant volatiles as attractants for the adults of the cotton bollworm, *Helicoverpa armigera* (Hübner) (Lepidoptera: Noctuidae). *Aust. J. Entomol.* 49, 21-30 (2010).
19. Angeli, G., Anfora, G., Baldessari, M., Germinara, G. S., Rama, F., Cristofaro, A. De, & Ioriatti, C. Mating disruption of codling moth *Cydia pomonella* with high densities of Ecodian sex pheromone dispensers, 131(5), 311-318 (2007).
20. Ramaswamy S B. Periodicity of oviposition, feeding, and calling by mated female *Heliothis virescens* in a field cage. Journal of Insect Behavior 3, 417-427 (1990).
21. Kumar, A. R. V. & Shivakumara, B. Variable response of male *Helicoverpa armigera* moth to sex pheromone blends: A case of behavioral polymorphism? Current Science, 84(5), 0-4 (2003).
22. Zhang, J.-P. et al. An overlooked component: (Z)-9-tetradecenal as a sex pheromone in *Helicoverpa armigera*. *Journal of Insect Physiology*, 58(9), 1209-16 (2012).
23. Klun, J. A., Plimmer, J. R., Bierl-Leonhardt, B. A., Sparks, A. N., Primiani, M., Chapman, O. L., Lepone, G. Sex Pheromone Chemistry of Female Corn Earworm Moth, *Heliothis zea*. *Journal of Chemical Ecology*, 6(1), 165-175 (1980).
24. Vetter, R. S., & Baker, T. C. Behavioral Responses of Male *Heliothis zea* Moths in Sustained-Flight Tunnel to Combinations of 4 Compounds Identified from Female Sex Pheromone Gland. *Journal of Chemical Ecology*, 10(2), 193-202 (1984).
25. Halfhill, J. E., & L. M. McDonough. *Heliothis zea* (Boddie): Formulation Parameters for Its Sex Pheromone in Rubber Septa. The Southwestern Entomologist, 10(3), 176-180 (1985).
26. Hutchinson, W. D., Burkness, E. C., Jensen, B., Leonard, B. R., Temple, J., Cook, D. R., Flood, B. R. Evidence for Decreasing *Helicoverpa zea* Susceptibility to Pyrethroid Insecticides in the Midwestern United States. In Plant Management Network. (pp. 1-9) (2007).
27. Mitchell, E. R., Baumhover, A. H., & Jacobson, M. Reduction of Mating Potential of Male *Heliothis* spp. and *Spodoptera frugiperda* in Field Plots Treated with Disruptants. Environmental Entomology, 5(3) (1976).
28. Del Socorro, A. P. et al. Development of a synthetic plant volatile-based attracticide for female noctuid moths. I. Potential sources of volatiles attractive to *Helicoverpa armigera* (Hübner) (Lepidoptera: Noctuidae). *Australian Journal of Entomology*, 49: 10-20 (2010).
29. Butter, N. S. and Singh, S. Ovipositional response of *Helicoverpa armigera* to different cotton genotypes, *Phytoparasitica*, 24(2): 97-102 (1996).
30. Tones, J. B. and Ruberson, J. R. Spatial and temporal dynamics of oviposition behavior of bollworm and three of its predators in Bt and non-Bt cotton fields, *Entomologia Experimentalis et Applicata* 120: 11-22 (2006).
31. Liu, M., et al. Oviposition deterrents from eggs of the cotton bollworm, *Helicoverpa armigera* (Lepidoptera: noctuidae): Chemical identification and analysis by electroantennogram. J. Insect Physiol. 54:656-662 (2008).
31. Deng et al. Enhancement of attraction to sex pheromones of *Spodoptera exigua* by volatile compounds produced by host plants. J. Chem. Ecol 30:2037-2045 (2004).
32. Fang, Y. and Zhang, Z. Influence of host-plant volatile components on oviposition behaviour and sex pheromone attractiveness to *H. armigera*. Acta Entomologica Sinica 45:63-67 (2002).
33. Jin, Z-Y. and Gong, H. Male accessory gland derived factors can stimulate oogenesis and enhance oviposition in *Helicoverpa armigera* (Lepidoptera: Noctuidae). Arch. Insect Biochem. Physiol. 46:175-185 (2001).
34. Sun, Y-L., Huang, L-Q., Pelosi, P. and Wang, C-Z. Expression in Antennae and Reproductive Organs Suggests a Dual Role of an Odorant-Binding Protein in Two Sibling *Helicoverpa* Species. PLoS ONE 7(1): e30040 (2012).
35. Malo, E. A., Rojas, J. C., Gago, R. and Guerrero, A. Inhibition of the responses to sex pheromone of the fall armyworm, *Spodoptera frugiperda*. Journal of Insect Science, 13: 134 (2013).
36. Kain, P., Boyle, S. M., Tharadra, S. K., Guda, T., Pham, C., Dahanukar, A. and Ray, A. Odour receptors and neurons for DEET and new insect repellents. Nature, 502: 507-512 (2013).
37. Dicke, M. Volatile spider-mite pheromone and host-plant kairomone, involved in spaced-out gregariousness in the spider mite *Tetranychus urticae*. Physiological Entomology 11: 251-262 (1986).
38. Hussey, N. W. and Parr, W. J. Dispersal of the glasshouse red spider mite *Tetranychus urticae* Koch (Acarina, Tetranychidae). Entomologia Experimentalis et Applicata, 6(3): 207-214 (2011).
39. Smitley, D. R. and Kennedy, G. G. Photo-oriented aerial-dispersal behavior of *Tetranychus urticae* (Acari:

40. Smitley, D. R. and Kennedy, G. G. Aerial dispersal of the two-spotted spider mite (*Tetranychus urticae*) from field corn. Experimental & Applied Acarology, 5(1): 33-46 (1988).
41. Li, J. and Margolies, D. C. Responses to direct and indirect selection on aerial dispersal behaviour in *Tetranychus urticae*. Heredity, 72: 10-22 (1994).
42. Boykin, L. S. and Campbell, W. V. Wind Dispersal of the Twospotted Spider Mite (Acari: Tetranychidae) in North Carolina Peanut Fields. Environmental Entomology, 13(1): 221-227 (1984).
43. Tabashnick, B E, J B J Van Rensburg, & Y Carriere. Field-Evolved Insect Resistance to Bt Crops: Definition, Theory, and Data. J Econ Entomol 102(6): 2011-2025 (2009).
44. Farias, J R, D A Andow, R J Horikoshi, R J Sorgatto, P Fresia, A C dos Santos, & C Omoto. Field—evolved resistance to Cry1F maize by *Spodoptera frugiperda* (Lepidoptera: Noctuidae) in Brazil. Crop Protection 64: 150-158 (2014).
45. Guerrero, A, E A Malo, J Coll, & C Quero. Semiochemical and natural product-based approaches to control *Spodoptera* spp. (Lepidoptera: Noctuidae). J Pest Sci 87: 231-247 (2014).
46. Young, J R & W W McMillian. Differential feeding by two strains of fall armyworm larvae on carbaryl surfaces. J Econ Entomol 72:202-203 (1979).
47. Yu, S J. Insecticide resistance in the fall armyworm, *Spodoptera frugiperda* (J E Smith). Pestic Biochem Physiol 39:84-91 (1991).
48. Yu, S J. Detection and biochemical characterization of insecticide resistance in fall armyworm (Lepidoptera: Noctuidae). J Econ Entomol 85: 675-682 (1992).
49. Carvalho, R A, C Omoto, L M Field, M S Williamson, & C Bass. Investigating the Molecular Mechanisms of Organophosphate and Pyrethroid Resistance in the Fall Armyworm *Spodoptera frugiperda*. PLoS ONE 8(4): e62268 (2013).
50. Bernardi, O, G S Malvestiti, P M Dourado, W S Oliveira, S Martinelli, G U Berger, G P Head, & C Omoto. Assessment of the high-dose concept and level of control provided by MON 87701×MON 89788 soybean against *Anticarsia gemmatalis* and *Pseudoplusia includens* (Lepidoptera: Noctuidae) in Brazil. Pest Manag Sci 68: 1083-1091 (2012).
51. Andow, D A The risk of resistance evolution in insects to transgenic insecticidal crops. Collection of Biosafety Reviews, Trieste, v. 4, p 142-199 (2008).
52. Caprio, M A & D M Suckling. Resistance Management in the 21st Century: An Entomologists Point of View. Proc 50th NZ Plant Protection Conf: 307-313 (1997).
53. Suckling, D M; Shaw, P W; Khoo, J G I; Cruickshank, V; Resistance management of lightbrown apple moth, *Epiphyas postvittana* (Lepidoptera: Tortricidae) by mating disruption. New Zealand Journal of Crop and Horticultural Science, Vol 18: 89-98 (1990).
54. Caprio, M A & Suckling, D M; Mating disruption reduces the risk of resistance development to transgenic apple orchards: simulations of the lightbrown apple moth. Proc. 48th N. Z. Plant Protection Conf: 52-58 (1995).
55. Caprio, M A Source-sink dynamics between transgenic and non-transgenic habitats and their role in the evolution of resistance. Insecticide Resistance and Resistance Management, Vol 94: 698-705 (2001).
56. Carrière, Y., C. Ellers-Kirk, B. Pederson, S. Haller, and L. Antilla. Predicting spring moth emergence in the pink bollworm: implications for managing resistance to transgenic cotton. Journal of Economic Entomology 94:1012-1021 (2001).
57. Andow, D. A., and A. R. Ives. Monitoring and adaptive resistance management. Ecological Applications 12:1378-1390 (2002).
58. Morin, S., Biggs, R. W., Sisterson, M. S., Shriver, L., Ellers-Kirk, C., Higginson, D., Holley, D., Gahan, L. J., Heckel, D. G., Carrière, Y., Dennehy, T. J., Brown, J. K. and Tabashnik, B. E. Three cadherin alleles associated with resistance to *Bacillus thuringiensis* in pink bollworm. Proc Natl Acad Sci USA 100: 5004-5009 (2003).
59. Baxter, S. W., Zhao, J.-Z., Gahan, L. J., Shelton, A. M., Tabashnik, B. E. and Heckel, D. G. Novel genetic basis of field-evolved resistance to Bt toxins in *Plutella xylostella*. Insect Molecular Biology 14:327-334 (2005).
60. Jessup, R. W., Renganayaki, K., Reinert, J. A., Genovesi, A. D., Engelke, M. C., Paterson, A. H., Kamps, T. L., Schulze, S., Howard, A. N., Giliberto, B., and Burson, B. L. Genetic Mapping of Fall Armyworm Resistance in Zoysiagrass, Crop Science 51(4): 1774-1783 (2011).
61. Ríos-Díez, J. D. and Saldamando-Benjumea, C. I. Susceptibility of *Spodoptera frugiperda* (Lepidoptera: Noctuidae) Strains From Central Colombia to Two Insecticides, Methomyl and Lambda-Cyhalothrin: A Study of the Genetic Basis of Resistance, J. Economic Entomology 104(5): 1698-1705 (2011).
62. Baxter, S. W., Badenes-Perez, F. R., Morrison, A., Vogel, H., Crickmore, N., Kain, W., Wang, P., Heckel D. G., and Jiggins, C. D. Parallel Evolution of *Bacillus thuringiensis* Toxin Resistance in Lepidoptera, Genetics 189: 675-679 (2011).
63. Arias, R. S., Portilla, M., Ray, J. D., Blanco, C. A., Simpson, S. A., and Scheffler, B. E. Ecology, Behavior and Bionomics First Genotyping of *Spodoptera frugiperda* (J. E. Smith) (Lepidoptera: Noctuidae) Progeny from Crosses between Bt-Resistant and Bt-Susceptible Populations, and 65-Locus Discrimination of Isofamilies, Research & Reviews: Journal of Botanical Sciences 4(1): 18-29 (2015).
64. Bernardi, D., Salmeron, E., Horikoshi, R. J., Bernardi, O., Dourado, P. M., Carvalho, R. A., Martinelli, S., Head, G. P., and Omoto, C. Cross-Resistance between Cry1 Proteins in Fall Armyworm (*Spodoptera frugiperda*) May Affect the Durability of Current Pyramided Bt Maize Hybrids in Brazil, PLoS ONE 10(10): e0140130 (2015).
65. B. E. Tabashnik and B. A. Croft, "Managing Pesticide Resistance in Crop-Arthropod Complexes: Interaction Between Biological and Operational Factors," Environmental Entomology, Vol. 11, No. 6, pgs. 1137-1144 (1982).
66. Hassell, M. P., J. H. Lawton, and R. M. May. Patterns of Dynamical Behaviour in Single-Species Populations. Journal of Animal Ecology. 45: 471-486 (1976).
67. Murúa, G. and E. Virla. Population parameters of *Spodoptera frugiperda* (Smith) (Lep.: Noctuidae) fed on corn and two predominant grasess in Tucuman (Argentina). Acta zoológica mexicana. 20: 199-210 (2004).
68. Varella, A. C., A. C. Menezes-Netto, J. D. de Souza Alonso, D. F. Caixeta, R. K. Peterson, and O. A. Fernandes. Mortality Dynamics of *Spodoptera frugiperda* (Lepidoptera: Noctuidae) Immatures in Maize. PloS one. 10: e0130437 (2015).

What is claimed is:

1. A method of delaying emergence of resistance to a transgenic insecticidal trait in a field plot system, said method comprising the steps of:
   a) providing a field plot system comprising:
      i) plants of one or more species, wherein each plant comprises a transgenic insecticidal trait;
      ii) a refuge comprising plants without a transgenic insecticidal trait; and
      iii) a population of an insect pest targeted by the transgenic insecticidal trait of (i); and
   b) applying mating disruption within the field plot system, wherein the mating disruption reduces the probability of a male insect pest successfully locating and mating with a female insect pest, thereby delaying the emergence of resistance to the transgenic insecticidal trait in the field plot system;
   wherein the refuge within the field plot system comprises at least about 2.5%, but less than 15%, of the field plot system's agricultural area;
      wherein the transgenic insecticidal trait is encoded by a Cry gene or a VIP gene;
      wherein the field plot system comprises corn, soybean, and/or cotton plants;
      wherein the insect pest comprises *Spodoptera frugiperda* or *Helicoverpa zea*; and
   wherein the mating disruption comprises application of a pheromone selected from the group consisting of: (E)-2-Decen-1-ol, (E)-2-Decenyl acetate, (E)-2-Decenal, (Z)-2-Decen-1-ol (Z)-2-Decenyl acetate, (Z)-2-Decenal, (E)-3-Decen-1-ol, (Z)-3-Decenyl acetate, (Z)-3-Decen-1-ol, (Z)-4-Decen-1-ol, (E)-4-Decenyl acetate, (Z)-4-Decenyl acetate, (Z)-4-Decenal, (E)-5-Decen-1-ol, (E)-5-Decenyl acetate, (Z)-5-Decen-1-ol, (Z)-5-Decenyl acetate, (Z)-5-Decenal, (E)-7-Decenyl acetate, (Z)-7-Decenyl acetate, (E)-8-Decen-1-ol, (E,E)-2,4-Decadienal, (E,Z)-2,4-Decadienal, (Z,Z)-2,4-Decadienal, (E,E)-3,5-Decadienyl acetate, (Z,E)-3,5-Decadienyl acetate, (Z,Z)-4,7-Decadien-1-ol, (Z,Z)-4,7-Decadienyl acetate, (E)-2-Undecenyl acetate, (E)-2-Undecenal, (Z)-5-Undecenyl acetate, (Z)-7-Undecenyl acetate, (Z)-8-Undecenyl acetate, (Z)-9-Undecenyl acetate, (E)-2-Dodecenal, (Z)-3-Dodecen-1-ol, (E)-3-Dodecenyl acetate, (Z)-3-Dodecenyl acetate, (E)-4-Dodecenyl acetate, (E)-5-Dodecen-1-ol, (Z,E)-5,7-Dodecadienal, (Z,Z)-5,7-Dodecadienyl acetate, (Z,Z)-5,7-Dodecadienal, (E,E)-7,9-Dodecadienyl acetate, (E,Z)-7,9-Dodecadien-1-ol, (E,Z)-7,9-Dodecadienyl acetate, (E,Z)-7,9-Dodecadienal, (Z,E)-7,9-Dodecadien-1-ol, (Z,E)-7,9-Dodecadienyl acetate, (Z,Z)-7,9-Dodecadien-1-ol, (Z,Z)-7,9-Dodecadienyl acetate, (E,E)-8,10-Dodecadien-1-ol, (E,E)-8,10-Dodecadienyl acetate, (E,E)-8,10-Dodecadienal, (E,Z)-8,10-Dodecadien-1-ol, (E,Z)-8,10-Dodecadienyl acetate, (E,Z)-8,10-Dodecadienal, (Z,E)-8,10-Dodecadien-1-ol, (Z,E)-8,10-Dodecadienyl acetate, (Z,E)-8,10-Dodecadienal, (Z,Z)-8,10-Dodecadien-1-ol, (Z,Z)-8,10-Dodecadienyl acetate, (Z,E,E)-3,6,8-Dodecatrien-1-ol, (Z,Z,E)-3,6,8-Dodecatrien-1-ol, (E)-2-Tridecenyl acetate, (Z)-2-Tridecenyl acetate, (E)-3-Tridecenyl acetate, (E)-4-Tridecenyl acetate, (Z)-4-Tridecenyl acetate, (Z)-4-Tridecenal, (E)-6-Tridecenyl acetate, (Z)-7-Tridecenyl acetate, (E)-8-Tridecenyl acetate, (Z)-8-Tridecenyl acetate, (E)-9-Tridecenyl acetate, (Z)-9-Tridecenyl acetate, (E)-10-Tridecenyl acetate, (E)-11-Tridecenyl acetate, (Z)-11-Tridecenyl acetate, (E,Z)-4,7-Tridecadienyl acetate, (Z)-11-Tetradecenal, (E)-12-Tetradecenyl acetate, (Z)-12-Tetradecenyl acetate, (E,E)-2,4-Tetradecadienal, (E,E)-3,5-Tetradecadienyl acetate, (E,Z)-3,5-Tetradecadienyl acetate, (Z,E)-3,5-Tetradecadienyl acetate, (E,Z)-3,7-Tetradecadienyl acetate, (E,Z)-3,8-Tetradecadienyl acetate, (E,Z)-4,9-Tetradecadienyl acetate, (E,Z)-4,9-Tetradecadienal, (E,Z)-4,10-Tetradecadienyl acetate, (E,E)-5,8-Tetradecadienal, (Z,Z)-5,8-Tetradecadien-1-ol, (Z,Z)-5,8-Tetradecadienyl acetate, (Z,Z)-5,8-Tetradecadienal, (E,E)-8,10-Tetradecadien-1-ol, (E,E)-8,10-Tetradecadienyl acetate, (E,E)-8,10-Tetradecadienal, (E,Z)-8,10-Tetradecadienyl acetate, (E,Z)-8,10-Tetradecadienal, (Z,E)-8,10-Tetradecadien-1-ol, (Z,E)-8,10-Tetradecadienyl acetate, (Z,Z)-8,10-Tetradecadienal, (E,E)-9,11-Tetradecadienyl acetate, (E,Z)-9,11-Tetradecadienyl acetate, (Z,E)-9,11-Tetradecadien-1-ol, (Z,E)-9,11-Tetradecadienyl acetate, (Z,E)-9,11-Tetradecadienal, (Z,Z)-9,11-Tetradecadien-1-ol, (Z,Z)-9,11-Tetradecadienyl acetate, (Z,Z)-9,11-Tetradecadienal, (E,E)-9,12-Tetradecadienyl acetate, (Z,E)-9,12-Tetradecadien-1-ol, (Z,E)-9,12-Tetradecadienyl acetate, (Z,E)-9,12-Tetradecadienal, (Z,Z)-9,12-Tetradecadien-1-ol, (Z,Z)-9,12-Tetradecadienyl acetate, (E,E)-10,12-Tetradecadien-1-ol, (E,E)-10,12-Tetradecadienyl acetate, (E)-9-Hexadecenyl acetate, (E)-9-Hexadecenal, (Z)-9-Hexadecen-1-ol, (Z)-9-Hexadecenyl acetate, (Z)-9-Hexadecenal, (E)-10-Hexadecen-1-ol, (E)-10-Hexadecenal, (Z)-10-Hexadecenyl acetate, (Z)-10-Hexadecenal, (E)-11-Hexadecen-1-ol, (E)-11-Hexadecenyl acetate, (E)-11-Hexadecenal, (Z)-11-Hexadecen-1-ol, (Z)-11-Hexadecenyl acetate, (Z)-11-Hexadecenal, (Z)-12-Hexadecenyl acetate, (Z)-12-Hexadecenal, (E)-14-Hexadecenal, (Z)-14-Hexadecenyl acetate, (E,E)-1,3-Hexadecadien-1-ol, (E,Z)-4,6-Hexadecadien-1-ol, (E,Z)-4,6-Hexadecadienyl acetate, (E,Z)-4,6-Hexadecadienal, (E,Z)-6,11-Hexadecadienyl acetate, (E,Z)-6,11-Hexadecadienal, (Z,Z)-7,10-Hexadecadien-1-ol, (Z,Z)-7,10-Hexadecadienyl acetate, (Z,E)-7,11-Hexadecadien-1-ol, (Z,E)-7,11-Hexadecadienyl acetate, (Z,E)-7,11-Hexadecadienal, (Z,Z)-7,11-Hexadecadien-1-ol, (Z,Z)-7,11-Hexadecadienyl acetate, (Z,Z)-7,11-Hexadecadienal, (Z,Z)-8,10-Hexadecadienyl acetate, (E,Z)-8,11-Hexadecadienal, (E,E)-9,11-Hexadecadienal, (E,Z)-9,11-Hexadecadienyl acetate, (E,Z)-9,11-Hexadecadienal, (Z,E)-9,11-Hexadecadienal, (Z,Z)-9,11-Hexadecadienal, (Z)-9-Heptadecenal, (E)-10-Heptadecenyl acetate, (Z)-11-Heptadecen-1-ol, (Z)-11-Heptadecenyl acetate, (E,E)-4,8-Heptadecadienyl acetate, (Z,Z)-8,10-Heptadecadien-1-ol, (Z,Z)-8,11-Heptadecadienyl acetate, (E)-2-Octadecenyl acetate, (E)-2-Octadecenal, (Z)-2-Octadecenyl acetate, (Z)-2-Octadecenal, (E)-9-Octadecen-1-ol, (E)-9-Octadecenyl acetate, (E)-9-Octadecenal, (Z)-9-Octadecen-1-ol, (Z)-9-Octadecenyl acetate, (Z)-9-Octadecenal, (E)-11-Octadecen-1-ol, (E)-11-Octadecenal, (Z)-11-Octadecen-1-ol, (Z)-11-Octadecenyl acetate, (Z)-11-Octadecenal, (E)-13-Octadecenyl acetate, (E)-13-Octadecenal, (Z)-13-Octadecen-1-ol, (Z)-13-Octadecenyl acetate, (Z)-13-Octadecenal, (E)-14-Octadecenal, (E,Z)-2,13-Octadecadien-1-ol, (E,Z)-2,13-Octadecadienyl acetate, (E,Z)-2,13-Octadecadienal, (Z,E)-2,13-Octadecadienyl acetate, (Z,Z)-2,13-Octadecadien-1-ol, (Z,Z)-2,13-Octadecadienyl acetate, (E,E)-3,13-Octadecadienyl acetate, (E,Z)-3,13-Octadecadienyl acetate, (E,Z)-3,13-Octadecadienal, (Z,E)-3,13-Octadecadienyl acetate, (Z,Z)-3,13-Octadecadienyl acetate, (Z,Z)-3,13-Octadecadienal, (E)-5-Dodecenyl acetate, (Z)-5-Dodecen-1-ol, (Z)-5-Dodecenyl acetate, (Z)-5-Dodecenal, (E)-6-Dodecen-1-ol, (Z)-6-Dodecenyl acetate, (E)-6-Dodecenal, (E)-7-Dodecen-1-ol, (E)-7-Dodecenyl acetate, (E)-7-Dodecenal, (Z)-7-Dodecen-1-ol, (Z)-7-Dodecenyl acetate, (Z)-7-Dodecenal, (E)-8-Dodecen-1-ol, (E)-8-Dodecenyl acetate, (E)-8-Dodecenal, (Z)-8-Dodecen-1-ol, (Z)-8-Dodecenyl acetate, (E)-9-Dodecen-1-ol, (E)-9-Dodecenyl acetate, (E)-9-Dodecenal, (Z)-9-Dodecen-1-ol, (Z)-9-Dodecenyl acetate, (Z)-9-Dodecenal, (E)-10-Dodecen-1-ol, (E)-10-Dodecenyl acetate, (E)-10-Dodecenal, (Z)-10-Dodecen-1-ol, (Z)-10-Dodecenyl acetate, (E,Z)-3,5-Dodecadienyl acetate, (Z,E)-3,5-Dodecadienyl acetate, (Z,Z)-3,6-Dodecadien-1-ol, (E,E)-4,10-Dodecadienyl acetate, (E,E)-5,7-Dodecadien-1-ol, (E,E)-5,7-Dodecadienyl acetate, (E,Z)-5,7-Dodecadien-1-ol, (E,Z)-5,7-Dodecadienyl acetate, (E,Z)-5,7-Dodecadienal, (Z,E)-5,7-Dodecadien-1-ol, (Z,E)-5,7-Dodecadienyl acetate, (Z,Z)-4,7-Tridecadien-1-ol, (Z,Z)-4,7-Tridecadienyl acetate, (E,Z)-5,9-Tridecadienyl acetate, (Z,E)-5,9-Tridecadienyl acetate, (Z,Z)-5,9-Tridecadienyl acetate, (Z,Z)-7,11-Tridecadienyl acetate, (E,Z,Z)-4,7,10-Tridecatrienyl acetate, (E)-3-Tetradecen-1-ol, (E)-3-Tetradecenyl acetate, (Z)-3-Tetradecen-1-ol, (Z)-3-Tetradecenyl acetate, (E)-5-Tetradecen-1-ol, (E)-5-Tetradecenyl acetate, (E)-5-Tetradecenal, (Z)-5-Tetradecen-1-ol, (Z)-5-Tetradecenyl acetate, (Z)-5-Tetradecenal, (E)-6-Tetradecenyl acetate, (Z)-6-Tetradecenyl acetate, (E)-7-Tetradecen-1-ol, (E)-7-Tetradecenyl acetate, (Z)-7-Tetradecen-1-ol, (Z)-7-Tetradecenyl acetate, (Z)-7-Tetradecenal, (E)-8-Tetradecenyl acetate, (Z)-8-Tetradecen-1-ol, (Z)-8-Tetradecenyl acetate, (Z)-8-Tetradecenal, (E)-9-Tetradecen-1-ol, (E)-9-Tetradecenyl acetate, (Z)-9-Tetradecen-1-ol, (Z)-9-Tetradecenyl acetate, (Z)-9-Tetradecenal, (E)-10-Tetradecenyl acetate, (Z)-10-Tetradecenyl acetate, (E)-11-Tetradecen-1-ol, (E)-11-Tetradecenyl acetate, (E)-11-Tetradecenal, (Z)-11-Tetradecen-1-ol, (Z)-11-Tetradecenyl acetate, (E,E)-10,12-Tetradecadienal, (E,Z)-10,12-Tetradecadienyl acetate, (Z,E)-10,12-Tetradecadienyl acetate, (Z,Z)-10,12-Tetradecadien-1-ol, (Z,Z)-10,12-Tetradecadienyl acetate, (E,Z,Z)-3,8,11-Tetradecatrienyl acetate, (E)-8-Pentadecen-1-ol, (E)-8-Pentadecenyl acetate, (Z)-8-Pentadecen-1-ol, (Z)-8-Pentadecenyl acetate, (Z)-9-Pentadecenyl acetate, (E)-9-Pentadecenyl acetate, (Z)-10-Pentadecenyl acetate, (Z)-10-Pentadecenal, (E)-12-Pentadecenyl acetate, (Z)-12-Pentadecenyl acetate, (Z,Z)-6,9-Pentadecadien-1-ol, (Z,Z)-6,9-Pentadecadienyl acetate, (Z,Z)-6,9-Pentadecadienal, (E,E)-8,10-Pentadecadienyl acetate, (E,Z)-8,10-Pentadecadien-1-ol, (E,Z)-8,10-Pentadecadienyl acetate, (Z,E)-8,10-Pentadecadienyl acetate, (Z,Z)-8,10-Pentadecadienyl acetate, (E,Z)-9,11-Pentadecadienal, (Z,Z)-9,11-Pentadecadienal, (Z)-3-Hexadecenyl acetate, (E)-5-Hexadecen-1-ol, (E)-5-Hexadecenyl acetate, (Z)-5-Hexadecen-1-ol, (Z)-5-Hexadecenyl acetate, (E)-6-Hexadecenyl acetate, (E)-7-Hexadecen-1-ol, (E)-7-Hexadecenyl acetate, (E)-7-Hexadecenal, (Z)-7-Hexadecen-1-ol, (Z)-7-Hexadecenyl acetate, (Z)-7-Hexadecenal, (E)-8-Hexadecenyl acetate, (E)-9-Hexadecen-1-ol, (E,E)-10,12-Hexadecadien-1-ol, (E,E)-10,12-Hexadecadienyl acetate, (E,E)-10,12-Hexadecadienal, (E,Z)-10,12-Hexadecadien-1-ol, (E,Z)-10,12-Hexadecadienyl acetate, (E,Z)-10,12-Hexadecadienal, (Z,E)-10,12-Hexadecadienyl acetate, (Z,E)-10,12-Hexadecadienal, (Z,Z)-10,12-Hexadecadienal, (E,E)-11,13-Hexadecadien-1-ol, (E,E)-11,13-Hexadecadienyl acetate, (E,E)-11,13-Hexadecadienal, (E,Z)-11,13-Hexadecadien-1-ol, (E,Z)-11,13-Hexadecadienyl acetate, (E,Z)-11,13-Hexadecadienal, (Z,E)-11,13-Hexadecadien-1-ol, (Z,E)-11,13-Hexadecadienyl acetate, (Z,E)-11,13-Hexadecadienal, (Z,Z)-11,13-Hexadecadien-1-ol, (Z,Z)-11,13-Hexadecadienyl acetate, (Z,Z)-11,13-Hexadecadienal, (E,E)-10,14-Hexadecadienal, (Z,E)-11,14-Hexadecadienyl acetate, (E,E,Z)-4,6,10-Hexadecatrien-1-ol, (E,E,Z)-4,6,10-Hexadecatrienyl acetate, (E,Z,Z)-4,6,10-Hexadecatrien-1-ol, (E,Z,Z)-4,6,10-Hexadecatrienyl acetate, (E,E,Z)-4,6,11-Hexadecatrienyl acetate, (E,E,Z)-4,6,11-Hexadecatrienal, (Z,Z,E)-7,11,13-Hexadecatrienal, (E,E,E)-10,12,14-Hexadecatrienyl acetate, (E,E,E)-10,12,14-Hexadecatrienal, (E,E,Z)-10,12,14-Hexadecatrienyl acetate, (E,E,Z)-10,12,14-Hexadecatrienal, (E,E,Z,Z)-4,6,11,13-Hexadecatetraenal, (E)-2-Heptadecenal, (Z)-2-Heptadecenal, (E)-8-Heptadecen-1-ol, (E)-8-Heptadecenyl acetate, (Z)-8-Heptadecen-1-ol, (E,E)-5,9-Octadecadien-1-ol, (E,E)-5,9-Octadecadienyl acetate, (E,E)-9,12-Octadecadien-1-ol, (Z,Z)-9,12-Octadecadienyl acetate, (Z,Z)-9,12-Octadecadienal, (Z,Z)-11,13-Octadecadienal, (E,E)-11,14-Octadecadienal, (Z,Z)-13,15-Octadecadienal, (Z,Z,Z)-3,6,9-Octadecatrienyl acetate, (E,E,E)-9,12,15-Octadecatrien-1-ol, (Z,Z,Z)-9,12,15-Octadecatrienyl acetate, and (Z,Z,Z)-9,12,15-Octadecatrienal, within the field plot system.

2. The method of claim 1, wherein the refuge comprises at least about 5% of the field plot system's agricultural area.

3. The method of claim 1, wherein the refuge is treated with a chemical insecticide.

4. The method of claim 1, wherein the refuge is not treated with a chemical insecticide.

5. The method of claim 1, wherein the method increases efficiency of the refuge as a result of the application of the mating disruption when compared to a control field plot system which is not exposed to mating disruption.

6. The method of claim 1, wherein the transgenic insecticidal trait is encoded by a Cry gene.

7. The method of claim 1, wherein the transgenic insecticidal trait is selected from the group consisting of: crylA, crylAal, crylAa2, crylAa3, crylAa4, crylAa5, crylAa6, crylAa7, crylAa8, crylAa9, crylAa10, crylAa11, crylAbl, crylAb2, crylAb3, crylAb4, crylAb5, crylAb6, crylAb7, crylAb8, crylAb9, crylAb10, crylAb11, crylAbl2, crylAbl3, crylAbl4, crylAcl, crylAc2, crylAc3, crylAc4, crylAc5, crylAc6, crylAc7, crylAc8, crylAc9, crylAc10, crylAc11, crylAcl2, crylAcl3, crylAdl, crylAd2, crylAel, crylAfl, crylAgl, crylB, crylBal, crylBa2, crylBbl, crylBcl, crylBdl, crylBel, crylC, crylCal, crylCa2, crylCa3, crylCa4, crylCa5, crylCa6, crylCa7, crylCbl, crylCb2, crylD, crylDal, crylDa2, crylDbl, crylE, crylEal, crylEa2, crylEa3, crylEa4, crylEa5, crylEa6, crylEbl, crylF, crylFal, crylFa2, crylFbl, crylFb2, crylFb3, crylFb4, crylG, crylGal, crylGa2, crylGbl, crylGb2, crylH, crylHal, crylHbl, cryll, cryllal, cryIIa2, cryIIa3, cryIIa4, cryIIa5, cryIIa6, cryllbl, cryllcl, cryllдl, cryllel, cryll-like, crylJ, crylJal, crylJbl, crylJcl, crylKal, cryl-like, cry2A, cry2Aal, cry2Aa2, cry2Aa3, cry2Aa4, cry2Aa5, cry2Aa6, cry2Aa7, cry2Aa8, cry2Aa9, cry2Abl, cry2Ab2, cry2Ab3, cry2Acl, cry2Ac2, cry2Adl, cry3A, cry3Aal, cry3Aa2, cry3Aa3, cry3Aa4, cry3Aa5, cry3Aa6, cry3Aa7, cry3B, cry3Bal, cry3Ba2, cry3Bbl, cry3Bb2, cry3Bb3, cry3Cal, cry4Aal, cry4Aa2, cry4Bal, cry4Ba2, cry4Ba3, cry4Ba4, cry5Aal, cry5Abl, cry5Acl, cry5Bal, cry6Aal, cry6Bal, cry7Aa1, cry7Ab1, cry7Ab2, cry8Aa1, cry8Ba1, cry8Ca1, cry9Aa1, cry9Aa2, cry9Ba1, cry9Ca1, cry9Da1, cry9Da2, cry9Ea1, cry9 like, cry10Aa1, cry10Aa2, cry11Aa1, cry11Aa2, cry11Ba1, cry11Bb1, cry12Aa1, cry13Aa1, cry14Aa1, cry15Aa1, cry16Aa1, cry17Aa1, cry18Aa1, cry18Ba1, cry18Ca1, cry19Aa1, cry19Ba1, cry20Aa1, cry21Aa1, cry21Aa2, cry22Aa1, cry23Aa1, cry24Aa1, cry25Aa1, cry26Aa1, cry27Aa1, cry28Aa1, cry28Aa2, cry29Aa1, cry30Aa1, cry31Aa1, cry34, cry35, cytlAa1, cytlAa2, cytlAa3, cytlAa4, cytlAb1, cytlBa1, cyt2Aa1, cyt2Ba1, cyt2Ba2, cyt2Ba3, cyt2Ba4, cyt2Ba5, cyt2Ba6, cyt2Ba7, cyt2Ba8, cyt2Bb1, and VIP3A.

8. The method of claim 1, wherein the insect pest population does not develop effective resistance to the transgenic insecticidal trait until a period of time that is after a control insect pest population in a control field plot develops resistance, wherein said control insect pest population was not exposed to the mating disruption.

9. The method of claim 1, wherein durability of the transgenic insecticidal trait in the plant species exposed to the mating disruption is increased compared to durability of an identical transgenic insecticidal trait in a control plant species that was not exposed to the mating disruption.

10. The method of claim 1, wherein each of the one or more species of plants comprises a shared transgenic insecticidal trait active against the insect pest.

11. The method of claim 1, wherein each of the one or more species of plants comprises two shared transgenic insecticidal traits active against the insect pest.

12. The method of claim 1, wherein the method applies at least 70% mating disruption to the insect pest population.

13. The method of claim 1, wherein the insect pest has a balanced reproductive growth rate or higher.

14. The method of claim 1, wherein the pheromone is applied within the field plot system by spraying.

15. The method of claim 1, wherein the pheromone is applied by placing a dispenser containing said pheromone within the field plot system.

16. The method of claim 1, wherein the method further comprises applying at least one chemical insecticide to the plants.

17. The method of claim 16, wherein the chemical insecticide is from at least one compound class selected from the group consisting of: a carbamate, organophosphate, cyclodiene organochlorine, phenylpyrazole, fiprole, pyrethroid, pyrethrin, DDT, methoxychlor, neonicotinoid, nicotine, sulfoximine, butenolides, spinosyn, avermectin, milbemycin, juvenile hormone analog, fenoxycarb, pyriproxyfen, alkyl halide, chloropicrin, fluoride, borate, tartar emetic, methyl isothiocyanate generator, pyridine azomethine derivative, clofentezine, diflovidazin, hexythiazox, etoxazole, Bt protein, diafenthiuron, oranotin miticide, propargite, tetradifon, chlorfenapyr, DNOC, sulfuramid, nereistoxin analog, benzolureas, buprofezin, cyromazine, diacylhdrazine, amitraz, hydramethylnon, acequinocyl, fluacrypyrim, bifenazate, meti acaricide, meti insecticide, rotenone, oxadiazine, semicarbazone, tetronic acid derivative, tetramic acid derivative, phosphide, cyanide, beta-ketonitrile derivative, carboxanilide, diamide, flonicamid, azadirachtin, benzoximate, bromopropylate, chinomethionat, dicofol, lime sulfur, pyridalyl, sulfur, and combinations thereof.

18. The method of claim 1, wherein the field plot system comprises corn or soybean plants.

19. The method of claim 1, wherein the field plot system comprises corn and soybean plants.

20. The method of claim 19, wherein the field plot system comprises more soybean plants than corn plants.

21. The method of claim 19, wherein the field plot system comprises at least about 75% soybean plants and less than about 25% corn plants.

* * * * *